(12) United States Patent
Loewenstern et al.

(10) Patent No.: US 12,738,888 B2
(45) Date of Patent: Sep. 15, 2026

(54) SAFETY SWITCH FOR PHOTOVOLTAIC SYSTEMS

(71) Applicant: Solaredge Technologies Ltd., Herzeliya (IL)

(72) Inventors: Yakir Loewenstern, Ariel (IL); Ilan Yoscovich, Givatayim (IL); David Braginsky, Yokne'am (IL); Tzachi Glovinsky, Petah Tikva (IL); Izak Assia, Shoham (IL); Roy Shkoury, Rehovot (IL)

(73) Assignee: Solaredge Technologies Ltd., Herzeliya (IL)

( * ) Notice: Subject to any disclaimer, the term of this patent is extended or adjusted under 35 U.S.C. 154(b) by 289 days.

(21) Appl. No.: 18/184,992

(22) Filed: Mar. 16, 2023

(65) Prior Publication Data

US 2023/0223897 A1 Jul. 13, 2023

Related U.S. Application Data

(63) Continuation of application No. 17/240,276, filed on Apr. 26, 2021, now Pat. No. 12,348,182, which is a (Continued)

(51) Int. Cl.
*H02S 40/34* (2014.01)
*H02H 7/20* (2006.01)

(Continued)

(52) U.S. Cl.
CPC ............... *H02S 40/34* (2014.12); *H02H 7/20* (2013.01); *H02H 9/02* (2013.01); *H02M 3/145* (2013.01);

(Continued)

(58) Field of Classification Search
CPC ................................ H02S 40/34; H02S 40/36
See application file for complete search history.

(56) References Cited

U.S. PATENT DOCUMENTS 2,367,925 A 1/1945 Brown
2,586,804 A 2/1952 Fluke (Continued)

FOREIGN PATENT DOCUMENTS

AU 2005262278 A1 1/2006
AU 2012225199 A1 10/2013

(Continued)

OTHER PUBLICATIONS

Wiles, John "Photovoltaic Power Systems and the National Electrical Code: Suggested Practices", 2001, Sandia, all pages (Year: 2001).*

(Continued)

*Primary Examiner* — Daniel C Puentes
(74) *Attorney, Agent, or Firm* — Banner & Witcoff, Ltd.

(57) ABSTRACT

Various implementations described herein are directed to a methods and apparatuses for disconnecting, by a device, elements at certain parts of an electrical system. The method may include measuring operational parameters at certain locations within the system and/or receiving messages from control devices indicating a potentially unsafe condition, disconnecting and/or short-circuiting system elements in response, and reconnection the system elements when it is safe to do so. Certain embodiments relate to methods and apparatuses for providing operational power to safety switches during different modes of system operation.

17 Claims, 23 Drawing Sheets

Related U.S. Application Data continuation of application No. 16/248,475, filed on Jan. 15, 2019, now Pat. No. 11,018,623, which is a continuation-in-part of application No. 15/250,068, filed on Aug. 29, 2016, now Pat. No. 10,230,310.

(60) Provisional application No. 62/341,147, filed on May 25, 2016, provisional application No. 62/318,303, filed on Apr. 5, 2016.

(51) Int. Cl.

*H02H 9/02* (2006.01)
*H02M 3/145* (2006.01)
*H02M 7/48* (2007.01)
*H02S 40/36* (2014.01)
*H02S 50/10* (2014.01)
*H02H 3/08* (2006.01)
*H02H 7/12* (2006.01)
*H02H 7/122* (2006.01)
*H02M 3/158* (2006.01)

(52) U.S. Cl.

CPC .............. *H02M 7/48* (2013.01); *H02S 40/36* (2014.12); *H02S 50/10* (2014.12); *H02H 3/08* (2013.01); *H02H 7/1213* (2013.01); *H02H 7/122* (2013.01); *H02M 3/158* (2013.01)

(56) References Cited

U.S. PATENT DOCUMENTS 2,758,219 A 8/1956 Miller
2,852,721 A 9/1958 Harders et al.
2,958,171 A 11/1960 J. Deckers
3,369,210 A 2/1968 Manickella
3,380,035 A 4/1968 Hecker
3,392,326 A 7/1968 Lamberton
3,496,029 A 2/1970 King et al.
3,566,143 A 2/1971 Paine et al.
3,569,784 A 3/1971 Carroll et al.
3,643,564 A 2/1972 Uchiyama
3,696,286 A 10/1972 Ule
3,740,652 A 6/1973 Burgener
3,958,136 A 5/1976 Schroeder
3,982,105 A 9/1976 Eberle
4,060,757 A 11/1977 McMurray
4,101,816 A 7/1978 Shepter
4,104,687 A 8/1978 Zulaski
4,127,797 A 11/1978 Perper
4,129,788 A 12/1978 Chavannes
4,129,823 A 12/1978 van der Pool et al.
4,146,785 A 3/1979 Neale
4,161,771 A 7/1979 Bates
4,171,861 A 10/1979 Hohorst
4,183,079 A 1/1980 Wachi
4,253,764 A 3/1981 Morrill
4,257,087 A 3/1981 Cuk
4,296,461 A 10/1981 Mallory et al.
4,321,581 A 3/1982 Tappeiner et al.
4,324,225 A 4/1982 Trihey
4,327,318 A 4/1982 Kwon et al.
4,346,341 A 8/1982 Blackburn et al.
4,363,040 A 12/1982 Inose
4,367,557 A 1/1983 Stern et al.
4,375,662 A 3/1983 Baker
4,384,321 A 5/1983 Rippel
4,404,472 A 9/1983 Steigerwald
4,412,142 A 10/1983 Ragonese et al.
4,452,867 A 6/1984 Conforti
4,453,207 A 6/1984 Paul
4,460,232 A 7/1984 Sotolongo
4,470,213 A 9/1984 Thompson
4,479,175 A 10/1984 Gille et al.
4,481,654 A 11/1984 Daniels et al.
4,488,136 A 12/1984 Hansen et al.
4,526,553 A 7/1985 Guerrero
4,533,986 A 8/1985 Jones
4,545,997 A 10/1985 Wong et al.
4,549,254 A 10/1985 Kissel
4,554,502 A 11/1985 Rohatyn
4,554,515 A 11/1985 Burson et al.
4,580,090 A 4/1986 Bailey et al.
4,591,965 A 5/1986 Dickerson
4,598,330 A 7/1986 Woodworth
4,602,322 A 7/1986 Merrick
4,604,567 A 8/1986 Chetty
4,611,090 A 9/1986 Catella et al.
4,623,753 A 11/1986 Feldman et al.
4,626,983 A 12/1986 Harada et al.
4,631,565 A 12/1986 Tihanyi
4,637,677 A 1/1987 Barkus
4,639,844 A 1/1987 Gallios et al.
4,641,042 A 2/1987 Miyazawa
4,641,079 A 2/1987 Kato et al.
4,644,458 A 2/1987 Harafuji et al.
4,649,334 A 3/1987 Nakajima
4,652,770 A 3/1987 Kumano
4,683,529 A 7/1987 Bucher, II
4,685,040 A 8/1987 Steigerwald et al.
4,686,617 A 8/1987 Colton
4,706,181 A 11/1987 Mercer
4,719,553 A 1/1988 Hinckley
4,720,667 A 1/1988 Lee et al.
4,720,668 A 1/1988 Lee et al.
4,736,151 A 4/1988 Dishner
4,746,879 A 5/1988 Ma et al.
4,772,994 A 9/1988 Harada et al.
4,783,728 A 11/1988 Hoffman
4,797,803 A 1/1989 Carroll
4,819,121 A 4/1989 Saito et al.
RE33,057 E 9/1989 Clegg et al.
4,864,213 A 9/1989 Kido
4,868,379 A 9/1989 West
4,873,480 A 10/1989 Lafferty
4,888,063 A 12/1989 Powell
4,888,702 A 12/1989 Gerken et al.
4,899,246 A 2/1990 Tripodi
4,899,269 A 2/1990 Rouzies
4,903,851 A 2/1990 Slough
4,906,859 A 3/1990 Kobayashi et al.
4,910,518 A 3/1990 Kim et al.
4,951,117 A 8/1990 Kasai
4,978,870 A 12/1990 Chen et al.
4,987,360 A 1/1991 Thompson
5,001,415 A 3/1991 Watkinson
5,027,051 A 6/1991 Lafferty
5,027,059 A 6/1991 de Montgolfier et al.
5,041,739 A 8/1991 Goto
5,045,988 A 9/1991 Gritter et al.
5,054,023 A 10/1991 Kronberg
5,081,558 A 1/1992 Mahler
5,097,196 A 3/1992 Schoneman
5,138,422 A 8/1992 Fujii et al.
5,143,556 A 9/1992 Matlin
5,144,222 A 9/1992 Herbert
5,155,670 A 10/1992 Brian
5,191,519 A 3/1993 Kawakami
5,196,781 A 3/1993 Jamieson et al.
5,210,519 A 5/1993 Moore
5,235,266 A 8/1993 Schaffrin
5,237,194 A 8/1993 Takahashi
5,268,832 A 12/1993 Kandatsu
5,280,133 A 1/1994 Nath
5,280,232 A 1/1994 Kohl et al.
5,287,261 A 2/1994 Ehsani
5,289,361 A 2/1994 Vinciarelli
5,289,998 A 3/1994 Bingley et al.
5,327,071 A 7/1994 Frederick et al.
5,329,222 A 7/1994 Gyugyi et al.
5,345,375 A 9/1994 Mohan
5,379,209 A 1/1995 Goff
5,381,327 A 1/1995 Yan
5,391,235 A 2/1995 Inoue

(56) References Cited

U.S. PATENT DOCUMENTS 5,402,060 A 3/1995 Erisman
5,404,059 A 4/1995 Loffler
5,412,558 A 5/1995 Sakurai et al.
5,413,313 A 5/1995 Mutterlein et al.
5,428,286 A 6/1995 Kha
5,446,645 A 8/1995 Shirahama et al.
5,460,546 A 10/1995 Kunishi et al.
5,472,614 A 12/1995 Rossi
5,475,296 A 12/1995 Vinsant et al.
5,477,091 A 12/1995 Fiorina et al.
5,493,154 A 2/1996 Smith et al.
5,497,289 A 3/1996 Sugishima et al.
5,501,083 A 3/1996 Kim
5,504,415 A 4/1996 Podrazhansky et al.
5,504,418 A 4/1996 Ashley
5,504,449 A 4/1996 Prentice
5,513,075 A 4/1996 Capper et al.
5,517,378 A 5/1996 Asplund et al.
5,530,335 A 6/1996 Decker et al.
5,539,238 A 7/1996 Malhi
5,548,504 A 8/1996 Takehara
5,563,780 A 10/1996 Goad
5,565,855 A 10/1996 Knibbe
5,566,022 A 10/1996 Segev
5,576,941 A 11/1996 Nguyen et al.
5,580,395 A 12/1996 Yoshioka et al.
5,585,749 A 12/1996 Pace et al.
5,604,430 A 2/1997 Decker et al.
5,616,913 A 4/1997 Litterst
5,625,539 A 4/1997 Nakata et al.
5,631,534 A 5/1997 Lewis
5,636,107 A 6/1997 Lu et al.
5,644,212 A 7/1997 Takahashi
5,644,219 A 7/1997 Kurokawa
5,646,501 A 7/1997 Fishman et al.
5,648,731 A 7/1997 Decker et al.
5,654,740 A 8/1997 Schulha
5,659,465 A 8/1997 Flack et al.
5,677,833 A 10/1997 Bingley
5,684,385 A 11/1997 Guyonneau et al.
5,686,766 A 11/1997 Tamechika
5,696,439 A 12/1997 Presti et al.
5,703,390 A 12/1997 Itoh
5,708,576 A 1/1998 Jones et al.
5,719,758 A 2/1998 Nakata et al.
5,722,057 A 2/1998 Wu
5,726,505 A 3/1998 Yamada et al.
5,726,615 A 3/1998 Bloom
5,731,603 A 3/1998 Nakagawa et al.
5,734,258 A 3/1998 Esser
5,734,259 A 3/1998 Sisson et al.
5,734,565 A 3/1998 Mueller et al.
5,747,967 A 5/1998 Muljadi et al.
5,751,120 A 5/1998 Zeitler et al.
5,773,963 A 6/1998 Blanc et al.
5,777,515 A 7/1998 Kimura
5,777,858 A 7/1998 Rodulfo
5,780,092 A 7/1998 Agbo et al.
5,793,184 A 8/1998 O'Connor
5,798,631 A 8/1998 Spee et al.
5,801,519 A 9/1998 Midya et al.
5,804,894 A 9/1998 Leeson et al.
5,812,045 A 9/1998 Ishikawa et al.
5,814,970 A 9/1998 Schmidt
5,821,734 A 10/1998 Faulk
5,822,186 A 10/1998 Bull et al.
5,838,148 A 11/1998 Kurokami et al.
5,847,549 A 12/1998 Dodson, III
5,859,772 A 1/1999 Hilpert
5,869,956 A 2/1999 Nagao et al.
5,873,738 A 2/1999 Shimada et al.
5,886,882 A 3/1999 Rodulfo
5,886,890 A 3/1999 Ishida et al.
5,892,354 A 4/1999 Nagao et al.
5,898,585 A 4/1999 Sirichote et al.
5,903,138 A 5/1999 Hwang et al.
5,905,645 A 5/1999 Cross
5,917,722 A 6/1999 Singh
5,919,314 A 7/1999 Kim
5,923,100 A 7/1999 Lukens et al.
5,923,158 A 7/1999 Kurokami et al.
5,929,614 A 7/1999 Copple
5,930,128 A 7/1999 Dent
5,930,131 A 7/1999 Feng
5,932,994 A 8/1999 Jo et al.
5,933,327 A 8/1999 Leighton et al.
5,945,806 A 8/1999 Faulk
5,946,206 A 8/1999 Shimizu et al.
5,949,668 A 9/1999 Schweighofer
5,955,885 A 9/1999 Kurokami et al.
5,959,438 A 9/1999 Jovanovic et al.
5,961,739 A 10/1999 Osborne
5,963,010 A 10/1999 Hayashi et al.
5,963,078 A 10/1999 Wallace
5,982,253 A 11/1999 Perrin et al.
5,986,909 A 11/1999 Hammond et al.
5,990,659 A 11/1999 Frannhagen
6,002,290 A 12/1999 Avery et al.
6,002,603 A 12/1999 Carver
6,008,971 A 12/1999 Duba et al.
6,021,052 A 2/2000 Unger et al.
6,031,736 A 2/2000 Takehara et al.
6,037,720 A 3/2000 Wong et al.
6,038,148 A 3/2000 Farrington et al.
6,046,470 A 4/2000 Williams et al.
6,046,919 A 4/2000 Madenokouji et al.
6,050,779 A 4/2000 Nagao et al.
6,058,035 A 5/2000 Madenokouji et al.
6,064,086 A 5/2000 Nakagawa et al.
6,078,511 A 6/2000 Fasullo et al.
6,081,104 A 6/2000 Kern
6,082,122 A 7/2000 Madenokouji et al.
6,087,738 A 7/2000 Hammond
6,091,329 A 7/2000 Newman
6,093,885 A 7/2000 Takehara et al.
6,094,129 A 7/2000 Baiatu
6,101,073 A 8/2000 Takehara
6,105,317 A 8/2000 Tomiuchi et al.
6,111,188 A 8/2000 Kurokami et al.
6,111,391 A 8/2000 Cullen
6,111,767 A 8/2000 Handleman
6,127,801 A 10/2000 Manor
6,130,458 A 10/2000 Takagi et al.
6,150,739 A 11/2000 Baumgartl et al.
6,151,234 A 11/2000 Oldenkamp
6,163,086 A 12/2000 Choo
6,166,455 A 12/2000 Li
6,166,527 A 12/2000 Dwelley et al.
6,169,678 B1 1/2001 Kondo et al.
6,175,219 B1 1/2001 Imamura et al.
6,175,512 B1 1/2001 Hagihara et al.
6,191,456 B1 2/2001 Stoisiek et al.
6,191,498 B1 2/2001 Chang
6,215,286 B1 4/2001 Scoones et al.
6,219,623 B1 4/2001 Wills
6,222,351 B1 4/2001 Fontanella et al.
6,225,793 B1 5/2001 Dickmann
6,255,360 B1 7/2001 Domschke et al.
6,255,804 B1 7/2001 Herniter et al.
6,256,234 B1 7/2001 Keeth et al.
6,259,234 B1 7/2001 Perol
6,262,558 B1 7/2001 Weinberg
6,268,559 B1 7/2001 Yamawaki
6,274,804 B1 8/2001 Psyk et al.
6,275,016 B1 8/2001 Ivanov
6,281,485 B1 8/2001 Siri
6,285,572 B1 9/2001 Onizuka et al.
6,291,764 B1 9/2001 Ishida et al.
6,292,379 B1 9/2001 Edevold et al.
6,297,621 B1 10/2001 Hui et al.
6,301,128 B1 10/2001 Jang et al.
6,304,065 B1 10/2001 Wittenbreder
6,307,749 B1 10/2001 Daanen et al.
6,311,137 B1 10/2001 Kurokami et al.

(56) References Cited

U.S. PATENT DOCUMENTS 6,316,716 B1 11/2001 Hilgrath
6,320,769 B2 11/2001 Kurokami et al.
6,329,808 B1 12/2001 Enguent
6,331,670 B2 12/2001 Takehara et al.
6,339,538 B1 1/2002 Handleman
6,344,612 B1 2/2002 Kuwahara et al.
6,346,451 B1 2/2002 Simpson et al.
6,348,781 B1 2/2002 Midya et al.
6,350,944 B1 2/2002 Sherif et al.
6,351,130 B1 2/2002 Preiser et al.
6,369,461 B1 4/2002 Jungreis et al.
6,369,462 B1 4/2002 Siri
6,380,719 B2 4/2002 Underwood et al.
6,396,170 B1 5/2002 Laufenberg et al.
6,396,239 B1 5/2002 Benn et al.
6,400,579 B2 6/2002 Cuk
6,425,248 B1 7/2002 Tonomura et al.
6,429,546 B1 8/2002 Ropp et al.
6,429,621 B1 8/2002 Arai
6,433,522 B1 8/2002 Siri
6,433,978 B1 8/2002 Neiger et al.
6,441,597 B1 8/2002 Lethellier
6,445,599 B1 9/2002 Nguyen
6,448,489 B2 9/2002 Kimura et al.
6,452,362 B1 9/2002 Choo
6,452,814 B1 9/2002 Wittenbreder
6,465,910 B2 10/2002 Young et al.
6,465,931 B2 10/2002 Knowles et al.
6,469,919 B1 10/2002 Bennett
6,472,254 B2 10/2002 Cantarini et al.
6,479,963 B1 11/2002 Manor et al.
6,483,203 B1 11/2002 McCormack
6,493,246 B2 12/2002 Suzui et al.
6,501,362 B1 12/2002 Hoffman et al.
6,507,176 B2 1/2003 Wittenbreder, Jr.
6,509,712 B1 1/2003 Landis
6,512,444 B1 1/2003 Morris, Jr. et al.
6,515,215 B1 2/2003 Mimura
6,515,217 B1 2/2003 Aylaian
6,519,165 B2 2/2003 Koike
6,528,977 B2 3/2003 Arakawa
6,531,848 B1 3/2003 Chitsazan et al.
6,545,211 B1 4/2003 Mimura
6,548,205 B2 4/2003 Leung et al.
6,560,131 B1 5/2003 vonBrethorst
6,587,051 B2 7/2003 Takehara et al.
6,590,793 B1 7/2003 Nagao et al.
6,590,794 B1 7/2003 Carter
6,593,520 B2 7/2003 Kondo et al.
6,593,521 B2 7/2003 Kobayashi
6,600,100 B2 7/2003 Ho et al.
6,603,672 B1 8/2003 Deng et al.
6,608,468 B2 8/2003 Nagase
6,611,130 B2 8/2003 Chang
6,611,441 B2 8/2003 Kurokami et al.
6,628,011 B2 9/2003 Droppo et al.
6,633,824 B2 10/2003 Dollar
6,636,431 B2 10/2003 Seki et al.
6,650,031 B1 11/2003 Goldack
6,650,560 B2 11/2003 MacDonald et al.
6,653,549 B2 11/2003 Matsushita et al.
6,655,987 B2 12/2003 Higashikozono et al.
6,657,419 B2 12/2003 Renyolds
6,664,762 B2 12/2003 Kutkut
6,672,018 B2 1/2004 Shingleton
6,678,174 B2 1/2004 Suzui et al.
6,690,590 B2 2/2004 Stamenic et al.
6,693,327 B2 2/2004 Priefert et al.
6,693,781 B1 2/2004 Kroker
6,708,507 B1 3/2004 Sem et al.
6,709,291 B1 3/2004 Wallace et al.
6,724,593 B1 4/2004 Smith
6,731,136 B2 5/2004 Knee
6,738,692 B2 5/2004 Schienbein et al.
6,744,643 B2 6/2004 Luo et al.
6,750,391 B2 6/2004 Bower et al.
6,765,315 B2 7/2004 Hammerstrom et al.
6,768,047 B2 7/2004 Chang et al.
6,768,180 B2 7/2004 Salama et al.
6,788,033 B2 9/2004 Vinciarelli
6,788,146 B2 9/2004 Forejt et al.
6,795,318 B2 9/2004 Haas et al.
6,800,964 B2 10/2004 Beck
6,801,442 B2 10/2004 Suzui et al.
6,807,069 B2 10/2004 Nieminen et al.
6,809,942 B2 10/2004 Madenokouji et al.
6,810,339 B2 10/2004 Wills
6,812,396 B2 11/2004 Makita et al.
6,828,503 B2 12/2004 Yoshikawa et al.
6,828,901 B2 12/2004 Birchfield et al.
6,835,491 B2 12/2004 Gartstein et al.
6,837,739 B2 1/2005 Gorringe et al.
6,838,611 B2 1/2005 Kondo et al.
6,838,856 B2 1/2005 Raichle
6,842,354 B1 1/2005 Tallam et al.
6,844,739 B2 1/2005 Kasai et al.
6,850,074 B2 2/2005 Adams et al.
6,856,102 B1 2/2005 Lin et al.
6,882,131 B1 4/2005 Takada et al.
6,888,728 B2 5/2005 Takagi et al.
6,894,911 B2 5/2005 Telefus et al.
6,897,370 B2 5/2005 Kondo et al.
6,914,418 B2 7/2005 Sung
6,919,714 B2 7/2005 Delepaut
6,927,955 B2 8/2005 Suzui et al.
6,933,627 B2 8/2005 Wilhelm
6,933,714 B2 8/2005 Fasshauer et al.
6,936,995 B2 8/2005 Kapsokavathis et al.
6,940,735 B2 9/2005 Deng et al.
6,949,843 B2 9/2005 Dubovsky
6,950,323 B2 9/2005 Achleitner et al.
6,963,147 B2 11/2005 Kurokami et al.
6,966,184 B2 11/2005 Toyomura et al.
6,970,365 B2 11/2005 Turchi
6,980,783 B2 12/2005 Liu et al.
6,984,967 B2 1/2006 Notman
6,984,970 B2 1/2006 Capel
6,985,967 B1 1/2006 Hipp
6,987,444 B2 1/2006 Bub et al.
6,996,741 B1 2/2006 Pittelkow et al.
7,030,597 B2 4/2006 Bruno et al.
7,031,176 B2 4/2006 Kotsopoulos et al.
7,038,430 B2 5/2006 Itabashi et al.
7,039,941 B1 5/2006 Caporizzo et al.
7,042,195 B2 5/2006 Tsunetsugu et al.
7,045,991 B2 5/2006 Nakamura et al.
7,046,531 B2 5/2006 Zocchi et al.
7,053,506 B2 5/2006 Alonso et al.
7,061,211 B2 6/2006 Satoh et al.
7,061,214 B2 6/2006 Mayega et al.
7,064,967 B2 6/2006 Ichinose et al.
7,068,017 B2 6/2006 Willner et al.
7,072,194 B2 7/2006 Nayar et al.
7,078,883 B2 7/2006 Chapman et al.
7,079,406 B2 7/2006 Kurokami et al.
7,087,332 B2 8/2006 Harris
7,088,595 B2 8/2006 Nino
7,089,780 B2 8/2006 Sunshine et al.
7,090,509 B1 8/2006 Gilliland et al.
7,091,707 B2 8/2006 Cutler
7,097,516 B2 8/2006 Werner et al.
7,099,169 B2 8/2006 West et al.
7,126,053 B2 10/2006 Kurokami et al.
7,126,294 B2 10/2006 Minami et al.
7,138,786 B2 11/2006 Ishigaki et al.
7,142,997 B1 11/2006 Widner
7,148,669 B2 12/2006 Maksimovic et al.
7,150,938 B2 12/2006 Munshi et al.
7,157,888 B2 1/2007 Chen et al.
7,158,359 B2 1/2007 Bertele et al.
7,158,395 B2 1/2007 Deng et al.
7,161,082 B2 1/2007 Matsushita et al.
7,174,973 B1 2/2007 Lysaght
7,176,667 B2 2/2007 Chen et al.

(56) References Cited

U.S. PATENT DOCUMENTS 7,183,667 B2 2/2007 Colby et al.
7,193,872 B2 3/2007 Siri
7,202,653 B2 4/2007 Pai
7,208,674 B2 4/2007 Aylaian
7,218,541 B2 5/2007 Price et al.
7,248,946 B2 7/2007 Bashaw et al.
7,256,566 B2 8/2007 Bhavaraju et al.
7,259,474 B2 8/2007 Blanc
7,262,979 B2 8/2007 Wai et al.
7,276,886 B2 10/2007 Kinder et al.
7,277,304 B2 10/2007 Stancu et al.
7,281,141 B2 10/2007 Elkayam et al.
7,282,814 B2 10/2007 Jacobs
7,282,924 B1 10/2007 Wittner
7,291,036 B1 11/2007 Daily et al.
7,298,113 B2 11/2007 Orikasa
RE39,976 E 1/2008 Schiff et al.
7,315,052 B2 1/2008 Alter
7,319,313 B2 1/2008 Dickerson et al.
7,324,361 B2 1/2008 Siri
7,336,004 B2 2/2008 Lai
7,336,056 B1 2/2008 Dening
7,339,287 B2 3/2008 Jepsen et al.
7,348,802 B2 3/2008 Kasanyal et al.
7,352,154 B2 4/2008 Cook
7,361,952 B2 4/2008 Miura et al.
7,371,963 B2 5/2008 Suenaga et al.
7,372,712 B2 5/2008 Stancu et al.
7,385,380 B2 6/2008 Ishigaki et al.
7,385,833 B2 6/2008 Keung
7,388,348 B2 6/2008 Mattichak
7,391,190 B1 6/2008 Rajagopalan
7,394,237 B2 7/2008 Chou et al.
7,405,117 B2 7/2008 Zuniga et al.
7,414,870 B2 8/2008 Rottger et al.
7,420,354 B2 9/2008 Cutler
7,420,815 B2 9/2008 Love
7,432,691 B2 10/2008 Cutler
7,435,134 B2 10/2008 Lenox
7,435,897 B2 10/2008 Russell
7,443,052 B2 10/2008 Wendt et al.
7,443,152 B2 10/2008 Utsunomiya
7,450,401 B2 11/2008 Iida
7,456,510 B2 11/2008 Ito et al.
7,456,523 B2 11/2008 Kobayashi
7,463,500 B2 12/2008 West
7,466,566 B2 12/2008 Fukumoto
7,471,014 B2 12/2008 Lum et al.
7,471,524 B1 12/2008 Batarseh et al.
7,479,774 B2 1/2009 Wai et al.
7,482,238 B2 1/2009 Sung
7,485,987 B2 2/2009 Mori et al.
7,495,419 B1 2/2009 Ju
7,504,811 B2 3/2009 Watanabe et al.
7,518,346 B2 4/2009 Prexl et al.
7,538,451 B2 5/2009 Nomoto
7,560,915 B2 7/2009 Ito et al.
7,589,437 B2 9/2009 Henne et al.
7,595,616 B2 9/2009 Prexl et al.
7,596,008 B2 9/2009 Wata et al.
7,599,200 B2 10/2009 Tomonaga
7,600,349 B2 10/2009 Liebendorfer
7,602,080 B1 10/2009 Hadar et al.
7,602,626 B2 10/2009 Iwata et al.
7,605,498 B2 10/2009 Ledenev et al.
7,612,283 B2 11/2009 Toyomura et al.
7,615,981 B2 11/2009 Wong et al.
7,626,834 B2 12/2009 Chisenga et al.
7,634,667 B2 12/2009 Weaver et al.
7,646,116 B2 1/2010 Batarseh et al.
7,649,434 B2 1/2010 Xu et al.
7,659,701 B1 2/2010 Metsker et al.
7,701,083 B2 4/2010 Savage
7,709,727 B2 5/2010 Roehrig et al.
7,719,140 B2 5/2010 Edenev et al.
7,723,865 B2 5/2010 Kitanaka
7,733,069 B2 6/2010 Toyomura et al.
7,748,175 B2 7/2010 Liebendorfer
7,759,575 B2 7/2010 Jones et al.
7,763,807 B2 7/2010 Richter
7,772,716 B2 8/2010 Shaver et al.
7,777,570 B2 8/2010 Lai
7,780,472 B2 8/2010 Lenox
7,782,031 B2 8/2010 Qiu et al.
7,783,389 B2 8/2010 Yamada et al.
7,787,273 B2 8/2010 Lu et al.
7,804,282 B2 9/2010 Bertele
7,807,919 B2 10/2010 Powell et al.
7,808,125 B1 10/2010 Sachdeva et al.
7,812,592 B2 10/2010 Prior et al.
7,812,701 B2 10/2010 Lee et al.
7,821,225 B2 10/2010 Chou et al.
7,824,189 B1 11/2010 Lauermann et al.
7,839,022 B2 11/2010 Wolfs
7,843,085 B2 11/2010 Ledenev et al.
7,864,497 B2 1/2011 Quardt et al.
7,868,599 B2 1/2011 Rahman et al.
7,880,334 B2 2/2011 Evans et al.
7,883,808 B2 2/2011 Norimatsu et al.
7,884,278 B2 2/2011 Powell et al.
7,893,346 B2 2/2011 Nachamkin et al.
7,898,112 B2 3/2011 Powell et al.
7,900,361 B2 3/2011 Adest et al.
7,906,007 B2 3/2011 Gibson et al.
7,906,870 B2 3/2011 Phm
7,919,952 B1 4/2011 Fahrenbruch
7,919,953 B2 4/2011 Porter et al.
7,925,552 B2 4/2011 Tarbell et al.
7,944,191 B2 5/2011 Ku
7,945,413 B2 5/2011 Krein
7,948,221 B2 5/2011 Watanabe et al.
7,952,897 B2 5/2011 Nocentini et al.
7,960,650 B2 6/2011 Richter et al.
7,960,950 B2 6/2011 Glovinsky
7,962,249 B1 6/2011 Zhang et al.
7,969,043 B2 6/2011 Caraghiorghiopol et al.
7,969,133 B2 6/2011 Zhang et al.
7,977,810 B2 7/2011 Choi et al.
8,003,885 B2 8/2011 Richter et al.
8,004,113 B2 8/2011 Sander et al.
8,004,116 B2 8/2011 Ledenev et al.
8,004,117 B2 8/2011 Adest et al.
8,004,237 B2 8/2011 Manor et al.
8,004,866 B2 8/2011 Bucella et al.
8,013,472 B2 9/2011 Adest et al.
8,018,748 B2 9/2011 Leonard
8,035,249 B2 10/2011 Shaver et al.
8,039,730 B2 10/2011 Hadar et al.
8,049,363 B2 11/2011 McLean et al.
8,050,804 B2 11/2011 Kernahan
8,058,747 B2 11/2011 Avrutsky et al.
8,058,752 B2 11/2011 Erickson, Jr. et al.
8,067,855 B2 11/2011 Mumtaz et al.
8,077,437 B2 12/2011 Mumtaz et al.
8,080,986 B2 12/2011 Lai et al.
8,089,780 B2 1/2012 Mochikawa et al.
8,089,785 B2 1/2012 Rodriguez
8,090,548 B2 1/2012 Abdennadher et al.
8,093,756 B2 1/2012 Porter et al.
8,093,757 B2 1/2012 Wolfs
8,097,818 B2 1/2012 Gerull et al.
8,098,055 B2 1/2012 Avrutsky et al.
8,102,074 B2 1/2012 Hadar et al.
8,102,144 B2 1/2012 Capp et al.
8,111,052 B2 2/2012 Glovinsky
8,116,103 B2 2/2012 Zacharias et al.
8,138,631 B2 3/2012 Allen et al.
8,138,914 B2 3/2012 Wong et al.
8,139,335 B2 3/2012 Quardt et al.
8,139,382 B2 3/2012 Zhang et al.
8,148,849 B2 4/2012 Zanarini et al.
8,158,877 B2 4/2012 Klein et al.
8,169,252 B2 5/2012 Fahrenbruch et al.
8,179,147 B2 5/2012 Dargatz et al.

(56) References Cited

U.S. PATENT DOCUMENTS 8,184,460 B2 5/2012 O'Brien et al.
8,188,610 B2 5/2012 Scholte-Wassink
8,204,709 B2 6/2012 Presher, Jr. et al.
8,212,408 B2 7/2012 Fishman
8,212,409 B2 7/2012 Bettenwort et al.
8,232,790 B2 7/2012 Leong et al.
8,233,301 B1 7/2012 Guo
8,248,804 B2 8/2012 Han et al.
8,271,599 B2 9/2012 Eizips et al.
8,274,172 B2 9/2012 Hadar et al.
8,279,644 B2 10/2012 Zhang et al.
8,284,574 B2 10/2012 Chapman et al.
8,289,183 B1 10/2012 Foss
8,289,742 B2 10/2012 Adest et al.
8,294,451 B2 10/2012 Hasenfus
8,299,757 B2 10/2012 Yamauchi et al.
8,299,773 B2 10/2012 Jang et al.
8,304,932 B2 11/2012 Ledenev et al.
8,310,101 B2 11/2012 Amaratunga et al.
8,310,102 B2 11/2012 Raju
8,314,375 B2 11/2012 Arditi et al.
8,319,471 B2 11/2012 Adest et al.
8,324,921 B2 12/2012 Adest et al.
8,325,059 B2 12/2012 Rozenboim
8,344,548 B2 1/2013 Stern
8,355,563 B2 1/2013 Kasahara et al.
8,369,113 B2 2/2013 Rodriguez
8,378,656 B2 2/2013 De Rooij et al.
8,379,418 B2 2/2013 Falk
8,391,031 B2 3/2013 Garrity
8,391,032 B2 3/2013 Garrity et al.
8,395,366 B2 3/2013 Uno
8,405,248 B2 3/2013 Mumtaz et al.
8,405,349 B2 3/2013 Kikinis et al.
8,405,367 B2 3/2013 Chisenga et al.
8,410,359 B2 4/2013 Richter
8,410,889 B2 4/2013 Garrity et al.
8,410,950 B2 4/2013 Takehara et al.
8,415,552 B2 4/2013 Hadar et al.
8,415,937 B2 4/2013 Hester
8,427,009 B2 4/2013 Shaver et al.
8,436,592 B2 5/2013 Saitoh
8,461,809 B2 6/2013 Rodriguez
8,466,789 B2 6/2013 Muhlberger et al.
8,472,220 B2 6/2013 Garrity et al.
8,473,250 B2 6/2013 Adest et al.
8,509,032 B2 8/2013 Rakib
8,526,205 B2 9/2013 Garrity
8,531,055 B2 9/2013 Adest et al.
8,542,512 B2 9/2013 Garrity
8,570,017 B2 10/2013 Perichon et al.
8,581,441 B2 11/2013 Rotzoll et al.
8,587,151 B2 11/2013 Adest et al.
8,618,692 B2 12/2013 Adest et al.
8,624,443 B2 1/2014 Mumtaz
8,653,689 B2 2/2014 Rozenboim
8,669,675 B2 3/2014 Capp et al.
8,670,255 B2 3/2014 Gong et al.
8,674,548 B2 3/2014 Mumtaz
8,674,668 B2 3/2014 Chisenga et al.
8,686,333 B2 4/2014 Arditi et al.
8,710,351 B2 4/2014 Robbins
8,751,053 B2 6/2014 Hadar et al.
8,773,236 B2 7/2014 Makhota et al.
8,791,598 B2 7/2014 Jain
8,796,884 B2 8/2014 Naiknaware et al.
8,809,699 B2 8/2014 Funk
8,811,047 B2 8/2014 Rodriguez
8,816,535 B2 8/2014 Adest et al.
8,823,212 B2 9/2014 Garrity et al.
8,823,218 B2 9/2014 Hadar et al.
8,823,342 B2 9/2014 Williams
8,835,748 B2 9/2014 Frolov et al.
8,841,916 B2 9/2014 Avrutsky
8,842,397 B2 9/2014 Fahrenbruch et al.
8,853,886 B2 10/2014 Avrutsky et al.
8,854,193 B2 10/2014 Makhota et al.
8,859,884 B2 10/2014 Dunton et al.
8,860,241 B2 10/2014 Hadar et al.
8,860,246 B2 10/2014 Hadar et al.
8,872,439 B2 10/2014 Cohen
8,878,563 B2 11/2014 Robbins
8,917,156 B2 12/2014 Garrity et al.
8,922,061 B2 12/2014 Arditi
8,933,321 B2 1/2015 Hadar et al.
8,934,269 B2 1/2015 Garrity
8,947,194 B2 2/2015 Sella et al.
8,963,375 B2 2/2015 DeGraaff
8,963,378 B1 2/2015 Fornage et al.
8,963,501 B2 2/2015 Shigemizu et al.
8,963,518 B2 2/2015 Wolfs
8,972,765 B1 3/2015 Krolak et al.
9,010,645 B2 4/2015 Arnouse
9,018,892 B2 4/2015 Agarwal et al.
9,041,339 B2 5/2015 Adest et al.
9,088,178 B2 7/2015 Adest et al.
9,130,401 B2 9/2015 Adest et al.
9,142,965 B2 9/2015 Grana
9,257,848 B2 2/2016 Coccia et al.
9,291,696 B2 3/2016 Adest et al.
9,362,743 B2 6/2016 Gazit et al.
9,397,497 B2 7/2016 Ledenev
9,401,664 B2 7/2016 Perreault et al.
9,407,161 B2 8/2016 Adest et al.
9,466,737 B2 10/2016 Ledenev
9,577,454 B2 2/2017 Seymour et al.
9,647,442 B2 5/2017 Yoscovich et al.
9,660,527 B2 5/2017 Glovinski
9,673,630 B2 6/2017 Ledenev et al.
9,819,178 B2 11/2017 Gazit et al.
9,831,916 B2 11/2017 Behrends
9,843,193 B2 12/2017 Getsla
9,853,490 B2 12/2017 Adest et al.
9,865,411 B2 1/2018 Friebe et al.
9,869,701 B2 1/2018 Sella et al.
9,923,516 B2 3/2018 Har-Shai et al.
9,991,717 B1 6/2018 Rowe et al.
9,995,796 B1 6/2018 Johnson
10,032,939 B2 7/2018 Ledenev et al.
10,256,770 B2 4/2019 Hadar et al.
10,432,139 B2 10/2019 Chaintreuil et al.
10,457,159 B1 10/2019 Castelaz et al.
10,666,045 B2 5/2020 Gemin et al.
10,673,253 B2 6/2020 Adest et al.
10,778,025 B2 9/2020 Gazit
10,931,119 B2 2/2021 Har-Shai et al.
10,969,412 B2 4/2021 Sella et al.
11,018,623 B2 5/2021 Loewenstern et al.
11,205,946 B2 12/2021 Yoscovich et al.
11,276,786 B2 3/2022 Hopf et al.
11,476,799 B2 10/2022 Sella et al.
11,682,918 B2 6/2023 Adest et al.
11,728,724 B2 8/2023 Braginsky et al.
12,191,668 B2 1/2025 Yoscovich et al.
2001/0000957 A1 5/2001 Birchfield et al.
2001/0011881 A1 8/2001 Emori et al.
2001/0013767 A1 8/2001 Takemoto
2001/0023703 A1 9/2001 Kondo et al.
2001/0032664 A1 10/2001 Takehara et al.
2001/0034982 A1 11/2001 Nagao et al.
2001/0035180 A1 11/2001 Kimura et al.
2001/0048605 A1 12/2001 Kurokami et al.
2001/0050102 A1 12/2001 Matsumi et al.
2001/0054881 A1 12/2001 Watanabe
2002/0002040 A1 1/2002 Kline et al.
2002/0014262 A1 2/2002 Matsushita et al.
2002/0017900 A1 2/2002 Takeda et al.
2002/0034083 A1 3/2002 Ayyanar et al.
2002/0038667 A1 4/2002 Kondo et al.
2002/0041505 A1 4/2002 Suzui et al.
2002/0044473 A1 4/2002 Toyomura et al.
2002/0047309 A1 4/2002 Droppo et al.
2002/0047693 A1 4/2002 Chang
2002/0056089 A1 5/2002 Houston

(56) References Cited

U.S. PATENT DOCUMENTS

2002/0059035 A1 5/2002 Yagi et al.
2002/0063552 A1 5/2002 Arakawa
2002/0063625 A1 5/2002 Takehara et al.
2002/0078991 A1 6/2002 Nagao et al.
2002/0080027 A1 6/2002 Conley
2002/0085397 A1 7/2002 Suzui et al.
2002/0105765 A1 8/2002 Kondo et al.
2002/0113689 A1 8/2002 Gehlot et al.
2002/0118559 A1 8/2002 Kurokami et al.
2002/0127980 A1 9/2002 Amanullah et al.
2002/0134567 A1 9/2002 Rasmussen et al.
2002/0148497 A1 10/2002 Sasaoka et al.
2002/0149950 A1 10/2002 Takebayashi
2002/0162585 A1 11/2002 Sugawara et al.
2002/0165458 A1 11/2002 Carter et al.
2002/0177401 A1 11/2002 Judd et al.
2002/0179140 A1 12/2002 Toyomura
2002/0180408 A1 12/2002 McDaniel et al.
2002/0190696 A1 12/2002 Darshan
2003/0001709 A1 1/2003 Visser
2003/0002303 A1 1/2003 Riggio et al.
2003/0025594 A1 2/2003 Akiyama et al.
2003/0038615 A1 2/2003 Elbanhawy
2003/0043597 A1 3/2003 Betts-Lacroix
2003/0047207 A1 3/2003 Aylaian
2003/0058593 A1 3/2003 Bertele et al.
2003/0058662 A1 3/2003 Baudelot et al.
2003/0062078 A1 4/2003 Mimura
2003/0066076 A1 4/2003 Minahan
2003/0066555 A1 4/2003 Hui et al.
2003/0075211 A1 4/2003 Makita et al.
2003/0080741 A1 5/2003 LeRow et al.
2003/0085621 A1 5/2003 Potega
2003/0090233 A1 5/2003 Browe
2003/0090246 A1 5/2003 Shenai et al.
2003/0094931 A1 5/2003 Renyolds
2003/0098056 A1 5/2003 Fronek et al.
2003/0107352 A1 6/2003 Downer et al.
2003/0111103 A1 6/2003 Bower et al.
2003/0116154 A1 6/2003 Butler et al.
2003/0121514 A1 7/2003 Davenport et al.
2003/0127126 A1 7/2003 Yang
2003/0140960 A1 7/2003 Baum et al.
2003/0156439 A1 8/2003 Ohmichi et al.
2003/0164695 A1 9/2003 Fasshauer et al.
2003/0185026 A1 10/2003 Matsuda et al.
2003/0193821 A1 10/2003 Krieger et al.
2003/0201674 A1 10/2003 Droppo et al.
2003/0206424 A1 11/2003 Jungreis et al.
2003/0214274 A1 11/2003 Lethellier
2003/0223257 A1 12/2003 Onoe
2004/0004402 A1 1/2004 Kippley
2004/0027101 A1 2/2004 Vinciarelli et al.
2004/0027112 A1 2/2004 Kondo et al.
2004/0041548 A1 3/2004 Perry
2004/0056642 A1 3/2004 Nebrigic et al.
2004/0056768 A1 3/2004 Matsushita et al.
2004/0061527 A1 4/2004 Knee
2004/0076028 A1 4/2004 Achleitner et al.
2004/0117676 A1 6/2004 Kobayashi et al.
2004/0118446 A1 6/2004 Toyomura
2004/0123894 A1 7/2004 Erban
2004/0124816 A1 7/2004 DeLepaut
2004/0125618 A1 7/2004 De Rooij et al.
2004/0140719 A1 7/2004 Vulih et al.
2004/0141345 A1 7/2004 Cheng et al.
2004/0144043 A1 7/2004 Stevenson et al.
2004/0150410 A1 8/2004 Schoepf et al.
2004/0164718 A1 8/2004 McDaniel et al.
2004/0165408 A1 8/2004 West et al.
2004/0167676 A1 8/2004 Mizumaki
2004/0169499 A1 9/2004 Huang et al.
2004/0170038 A1 9/2004 Ichinose et al.
2004/0189090 A1 9/2004 Yanagida et al.
2004/0189432 A1 9/2004 Yan et al.
2004/0201279 A1 10/2004 Templeton
2004/0201933 A1 10/2004 Blanc
2004/0207366 A1 10/2004 Sung
2004/0211456 A1 10/2004 Brown et al.
2004/0211458 A1 10/2004 Gui et al.
2004/0211459 A1 10/2004 Suenaga et al.
2004/0213169 A1 10/2004 Allard et al.
2004/0223351 A1 11/2004 Kurokami et al.
2004/0230343 A1 11/2004 Zalesski
2004/0233685 A1 11/2004 Matsuo et al.
2004/0246226 A1 12/2004 Moon
2004/0255999 A1 12/2004 Matsushita et al.
2004/0258141 A1 12/2004 Tustison et al.
2004/0262998 A1 12/2004 Kunow et al.
2004/0263119 A1 12/2004 Meyer et al.
2004/0263183 A1 12/2004 Naidu et al.
2004/0264225 A1 12/2004 Bhavaraju et al.
2005/0002214 A1 1/2005 Deng et al.
2005/0005785 A1 1/2005 Poss et al.
2005/0006958 A1 1/2005 Dubovsky
2005/0017697 A1 1/2005 Capel
2005/0017701 A1 1/2005 Hsu
2005/0030772 A1 2/2005 Phadke
2005/0040800 A1 2/2005 Sutardja
2005/0041442 A1 2/2005 Balakrishnan
2005/0057214 A1 3/2005 Matan
2005/0057215 A1 3/2005 Matan
2005/0068012 A1 3/2005 Cutler
2005/0068820 A1 3/2005 Radosevich et al.
2005/0077879 A1 4/2005 Near
2005/0099138 A1 5/2005 Wilhelm
2005/0103376 A1 5/2005 Matsushita et al.
2005/0105224 A1 5/2005 Nishi
2005/0105306 A1 5/2005 Deng et al.
2005/0109386 A1 5/2005 Marshall
2005/0110454 A1 5/2005 Tsai et al.
2005/0121067 A1 6/2005 Toyomura et al.
2005/0122747 A1 6/2005 Gaksch
2005/0135031 A1 6/2005 Colby et al.
2005/0139258 A1 6/2005 Liu et al.
2005/0140335 A1 6/2005 Lee et al.
2005/0162018 A1 7/2005 Realmuto et al.
2005/0163063 A1 7/2005 Kuchler et al.
2005/0172995 A1 8/2005 Rohrig et al.
2005/0179420 A1 8/2005 Satoh et al.
2005/0191528 A1 9/2005 Cortes et al.
2005/0194937 A1 9/2005 Jacobs
2005/0201397 A1 9/2005 Petite
2005/0213272 A1 9/2005 Kobayashi
2005/0218876 A1 10/2005 Nino
2005/0225090 A1 10/2005 Wobben
2005/0226017 A1 10/2005 Kotsopoulos et al.
2005/0231183 A1 10/2005 Li et al.
2005/0242795 A1 11/2005 Al-Kuran et al.
2005/0248428 A1 11/2005 Coleman et al.
2005/0252545 A1 11/2005 Nowlan et al.
2005/0257827 A1 11/2005 Gaudiana et al.
2005/0269988 A1 12/2005 Thrap
2005/0275386 A1 12/2005 Jepsen et al.
2005/0275527 A1 12/2005 Kates
2005/0275979 A1 12/2005 Ku
2005/0281064 A1 12/2005 Olsen et al.
2005/0286510 A1 12/2005 Nakajima et al.
2005/0287402 A1 12/2005 Maly et al.
2006/0001406 A1 1/2006 Matan
2006/0017327 A1 1/2006 Siri et al.
2006/0034106 A1 2/2006 Johnson
2006/0038692 A1 2/2006 Schnetker
2006/0043792 A1 3/2006 Hjort et al.
2006/0043942 A1 3/2006 Cohen
2006/0053447 A1 3/2006 Krzyzanowski et al.
2006/0055384 A1 3/2006 Jordan et al.
2006/0066349 A1 3/2006 Murakami
2006/0068239 A1 3/2006 Norimatsu et al.
2006/0077046 A1 4/2006 Endo
2006/0085167 A1 4/2006 Warfield et al.
2006/0091958 A1 5/2006 Bhatti et al.
2006/0103360 A9 5/2006 Cutler
2006/0108979 A1 5/2006 Daniel et al.

(56) References Cited

U.S. PATENT DOCUMENTS

2006/0109009 A1 5/2006 Banke et al.
2006/0113843 A1 6/2006 Beveridge
2006/0113979 A1 6/2006 Ishigaki et al.
2006/0116968 A1 6/2006 Arisawa
2006/0118162 A1 6/2006 Saelzer et al.
2006/0125449 A1 6/2006 Unger
2006/0132102 A1 6/2006 Harvey
2006/0149396 A1 7/2006 Templeton
2006/0152085 A1 7/2006 Flett et al.
2006/0162772 A1 7/2006 Presher et al.
2006/0163946 A1 7/2006 Henne et al.
2006/0164065 A1 7/2006 Hoouk et al.
2006/0167762 A1 7/2006 Hahn-Carlson
2006/0171182 A1 8/2006 Siri et al.
2006/0174939 A1 8/2006 Matan
2006/0176029 A1 8/2006 McGinty et al.
2006/0176031 A1 8/2006 Forman et al.
2006/0176036 A1 8/2006 Flatness et al.
2006/0176716 A1 8/2006 Balakrishnan et al.
2006/0185727 A1 8/2006 Matan
2006/0192540 A1 8/2006 Balakrishnan et al.
2006/0208660 A1 9/2006 Shinmura et al.
2006/0222912 A1 10/2006 Smith
2006/0222916 A1 10/2006 Norimatsu et al.
2006/0225781 A1 10/2006 Locher
2006/0227577 A1 10/2006 Horiuchi et al.
2006/0227578 A1 10/2006 Datta et al.
2006/0231132 A1 10/2006 Neussner
2006/0232220 A1 10/2006 Melis
2006/0235717 A1 10/2006 Sharma et al.
2006/0237058 A1 10/2006 McClintock et al.
2006/0238750 A1 10/2006 Shimotomai
2006/0243318 A1 11/2006 Feldmeier et al.
2006/0261751 A1 11/2006 Okabe et al.
2006/0266408 A1 11/2006 Horne et al.
2006/0267515 A1 11/2006 Burke et al.
2006/0290317 A1 12/2006 McNulty et al.
2007/0001653 A1 1/2007 Ku
2007/0013349 A1 1/2007 Bassett
2007/0019613 A1 1/2007 Frezzolini
2007/0024257 A1 2/2007 Boldo
2007/0027644 A1 2/2007 Bettenwort et al.
2007/0029468 A1 2/2007 Sinton et al.
2007/0029636 A1 2/2007 Kanemaru et al.
2007/0030068 A1 2/2007 Motonobu et al.
2007/0035975 A1 2/2007 Dickerson et al.
2007/0040540 A1 2/2007 Cutler
2007/0044837 A1 3/2007 Simburger et al.
2007/0075689 A1 4/2007 Kinder et al.
2007/0075711 A1 4/2007 Blanc et al.
2007/0081364 A1 4/2007 Andreycak
2007/0085523 A1 4/2007 Scoones et al.
2007/0089778 A1 4/2007 Horne et al.
2007/0103108 A1 5/2007 Capp et al.
2007/0103297 A1 5/2007 Armstrong et al.
2007/0107767 A1 5/2007 Hayden et al.
2007/0115635 A1 5/2007 Low et al.
2007/0119718 A1 5/2007 Gibson et al.
2007/0121648 A1 5/2007 Hahn
2007/0133241 A1 6/2007 Mumtaz et al.
2007/0133421 A1 6/2007 Young
2007/0147075 A1 6/2007 Bang
2007/0158185 A1 7/2007 Andelman et al.
2007/0159866 A1 7/2007 Siri
2007/0164612 A1 7/2007 Wendt et al.
2007/0164750 A1 7/2007 Chen et al.
2007/0165347 A1 7/2007 Wendt et al.
2007/0205778 A1 9/2007 Fabbro et al.
2007/0209656 A1 9/2007 Lee
2007/0211888 A1 9/2007 Corcoran et al.
2007/0217178 A1 9/2007 Johnson et al.
2007/0223165 A1 9/2007 Itri et al.
2007/0227574 A1 10/2007 Cart
2007/0235071 A1 10/2007 Work et al.
2007/0236187 A1 10/2007 Wai et al.
2007/0241720 A1 10/2007 Sakamoto et al.
2007/0246546 A1 10/2007 Yoshida
2007/0247135 A1 10/2007 Koga
2007/0247877 A1 10/2007 Kwon et al.
2007/0262802 A1 11/2007 Huard et al.
2007/0271006 A1 11/2007 Golden et al.
2007/0273240 A1 11/2007 Steele et al.
2007/0273339 A1 11/2007 Haines
2007/0273342 A1 11/2007 Kataoka et al.
2007/0273351 A1 11/2007 Matan
2007/0284451 A1 12/2007 Uramoto
2007/0290636 A1 12/2007 Beck et al.
2007/0290656 A1 12/2007 Lee Tai Keung
2008/0021707 A1 1/2008 Bou-Ghazale et al.
2008/0023061 A1 1/2008 Clemens et al.
2008/0024098 A1 1/2008 Hojo
2008/0030198 A1 2/2008 Kawata et al.
2008/0036440 A1 2/2008 Garmer
2008/0042709 A1 2/2008 Chen et al.
2008/0055941 A1 3/2008 Victor et al.
2008/0072091 A1 3/2008 Hanson et al.
2008/0080177 A1 4/2008 Chang
2008/0088184 A1 4/2008 Tung et al.
2008/0088829 A1 4/2008 Fuyuki
2008/0089277 A1 4/2008 Alexander et al.
2008/0097655 A1 4/2008 Hadar et al.
2008/0106250 A1 5/2008 Prior et al.
2008/0111529 A1 5/2008 Shah et al.
2008/0115823 A1 5/2008 Kinsey
2008/0121272 A1 5/2008 Besser et al.
2008/0122449 A1 5/2008 Besser et al.
2008/0122518 A1 5/2008 Besser et al.
2008/0136367 A1 6/2008 Adest et al.
2008/0142071 A1 6/2008 Dorn et al.
2008/0143188 A1 6/2008 Adest et al.
2008/0143462 A1 6/2008 Belisle et al.
2008/0144294 A1 6/2008 Adest et al.
2008/0147335 A1 6/2008 Adest et al.
2008/0149167 A1 6/2008 Liu
2008/0150366 A1 6/2008 Adest et al.
2008/0150484 A1 6/2008 Kimball et al.
2008/0156551 A1 7/2008 Kawahara et al.
2008/0164766 A1 7/2008 Adest et al.
2008/0179949 A1 7/2008 Besser et al.
2008/0186004 A1 8/2008 Williams
2008/0191560 A1 8/2008 Besser et al.
2008/0191675 A1 8/2008 Besser et al.
2008/0192510 A1 8/2008 Falk
2008/0192519 A1 8/2008 Wata et al.
2008/0198523 A1 8/2008 Schmidt et al.
2008/0205096 A1 8/2008 Lai et al.
2008/0218152 A1 9/2008 Bo
2008/0224652 A1 9/2008 Zhu et al.
2008/0236647 A1 10/2008 Gibson et al.
2008/0236648 A1 10/2008 Klein et al.
2008/0238195 A1 10/2008 Shaver et al.
2008/0238372 A1 10/2008 Cintra et al.
2008/0246460 A1 10/2008 Smith
2008/0246463 A1 10/2008 Sinton et al.
2008/0252273 A1 10/2008 Woo et al.
2008/0264470 A1 10/2008 Masuda et al.
2008/0266913 A1 10/2008 Brotto et al.
2008/0266919 A1 10/2008 Mallwitz
2008/0283118 A1 11/2008 Rotzoll et al.
2008/0291707 A1 11/2008 Fang
2008/0294472 A1 11/2008 Yamada
2008/0297963 A1 12/2008 Lee et al.
2008/0298608 A1 12/2008 Wilcox
2008/0303503 A1 12/2008 Wolfs
2008/0304296 A1 12/2008 NadimpalliRaju et al.
2008/0304298 A1 12/2008 Toba et al.
2009/0010035 A1 1/2009 Williams
2009/0012917 A1 1/2009 Thompson et al.
2009/0014050 A1 1/2009 Haaf
2009/0014057 A1 1/2009 Croft et al.
2009/0014058 A1 1/2009 Croft et al.
2009/0015071 A1 1/2009 Wata et al.
2009/0020151 A1 1/2009 Fornage
2009/0021877 A1 1/2009 Fornage et al.

(56) References Cited

U.S. PATENT DOCUMENTS

2009/0029468 A1 1/2009 Barbas et al.
2009/0039833 A1 2/2009 Kitagawa
2009/0039852 A1 2/2009 Fishelov et al.
2009/0064252 A1 3/2009 Howarter et al.
2009/0066357 A1 3/2009 Fornage
2009/0066382 A1 3/2009 Yousefzadeh et al.
2009/0066399 A1 3/2009 Chen et al.
2009/0069950 A1 3/2009 Kurokami et al.
2009/0073726 A1 3/2009 Babcock
2009/0078300 A1 3/2009 Ang et al.
2009/0080226 A1 3/2009 Fornage
2009/0084570 A1 4/2009 Gherardini et al.
2009/0097172 A1 4/2009 Bremicker et al.
2009/0097283 A1 4/2009 Krein et al.
2009/0101191 A1 4/2009 Beck et al.
2009/0102440 A1 4/2009 Coles
2009/0114263 A1 5/2009 Powell et al.
2009/0120485 A1 5/2009 Kikinis
2009/0121549 A1 5/2009 Leonard
2009/0127448 A1 5/2009 Fuyuki
2009/0133736 A1 5/2009 Powell et al.
2009/0140715 A1 6/2009 Adest et al.
2009/0141522 A1 6/2009 Adest et al.
2009/0145480 A1 6/2009 Adest et al.
2009/0146667 A1 6/2009 Adest et al.
2009/0146671 A1 6/2009 Gazit
2009/0147554 A1 6/2009 Adest et al.
2009/0150005 A1 6/2009 Hadar et al.
2009/0160258 A1 6/2009 Allen et al.
2009/0167097 A1 7/2009 Seymour et al.
2009/0179500 A1 7/2009 Ragonese et al.
2009/0179662 A1 7/2009 Moulton et al.
2009/0182532 A1 7/2009 Stoeber et al.
2009/0183763 A1 7/2009 Meyer
2009/0184746 A1 7/2009 Fahrenbruch
2009/0189456 A1 7/2009 Skutt
2009/0190275 A1 7/2009 Gilmore et al.
2009/0195081 A1 8/2009 Quardt et al.
2009/0206666 A1 8/2009 Sella et al.
2009/0207543 A1 8/2009 Boniface et al.
2009/0217965 A1 9/2009 Dougal et al.
2009/0224817 A1 9/2009 Nakamura et al.
2009/0234692 A1 9/2009 Powell et al.
2009/0237042 A1 9/2009 Glovinski
2009/0237043 A1 9/2009 Glovinsky
2009/0238444 A1 9/2009 Su et al.
2009/0242011 A1 10/2009 Proisy et al.
2009/0243385 A1 10/2009 Ichikawa
2009/0243547 A1 10/2009 Andelfinger
2009/0273241 A1 11/2009 Gazit et al.
2009/0278496 A1 11/2009 Nakao et al.
2009/0282755 A1 11/2009 Abbott et al.
2009/0283129 A1 11/2009 Foss
2009/0283130 A1 11/2009 Gilmore et al.
2009/0284078 A1 11/2009 Zhang et al.
2009/0284232 A1 11/2009 Zhang et al.
2009/0284240 A1 11/2009 Zhang et al.
2009/0284998 A1 11/2009 Zhang et al.
2009/0295225 A1 12/2009 Asplund et al.
2009/0296434 A1 12/2009 De Rooij et al.
2009/0322494 A1 12/2009 Lee
2009/0325003 A1 12/2009 Aberle et al.
2010/0001587 A1 1/2010 Casey et al.
2010/0002349 A1 1/2010 La Scala et al.
2010/0013452 A1 1/2010 Tang et al.
2010/0020576 A1 1/2010 Falk
2010/0026097 A1 2/2010 Avrutsky et al.
2010/0026736 A1 2/2010 Plut
2010/0038907 A1 2/2010 Hunt et al.
2010/0043781 A1 2/2010 Jones et al.
2010/0052735 A1 3/2010 Burkland et al.
2010/0057267 A1 3/2010 Liu et al.
2010/0060000 A1 3/2010 Scholte-Wassink
2010/0071742 A1 3/2010 De Rooij et al.
2010/0085670 A1 4/2010 Palaniswami et al.
2010/0103579 A1 4/2010 Carkner et al.
2010/0115093 A1 5/2010 Rice
2010/0124027 A1 5/2010 Handelsman et al.
2010/0124087 A1 5/2010 Falk
2010/0126550 A1 5/2010 Foss
2010/0127570 A1 5/2010 Hadar et al.
2010/0127571 A1 5/2010 Hadar et al.
2010/0131108 A1 5/2010 Meyer
2010/0132757 A1 6/2010 He et al.
2010/0132758 A1 6/2010 Gilmore
2010/0132761 A1 6/2010 Echizenya et al.
2010/0133911 A1 6/2010 Williams et al.
2010/0139734 A1 6/2010 Hadar et al.
2010/0139743 A1 6/2010 Hadar et al.
2010/0141041 A1 6/2010 Bose et al.
2010/0141153 A1 6/2010 Recker et al.
2010/0147362 A1 6/2010 King et al.
2010/0154858 A1 6/2010 Jain
2010/0176773 A1 7/2010 Capel
2010/0181957 A1 7/2010 Goeltner
2010/0191383 A1 7/2010 Gaul
2010/0195357 A1 8/2010 Fornage et al.
2010/0195361 A1 8/2010 Stem
2010/0206378 A1 8/2010 Erickson, Jr. et al.
2010/0207764 A1 8/2010 Muhlberger et al.
2010/0207770 A1 8/2010 Thiemann
2010/0208501 A1 8/2010 Matan et al.
2010/0213897 A1 8/2010 Tse
2010/0214808 A1 8/2010 Rodriguez
2010/0217551 A1 8/2010 Goff et al.
2010/0219687 A1 9/2010 Oh
2010/0229915 A1 9/2010 Ledenev et al.
2010/0241375 A1 9/2010 Kumar et al.
2010/0244575 A1 9/2010 Coccia et al.
2010/0246223 A1 9/2010 Xuan
2010/0253286 A1 10/2010 Sutardja
2010/0264736 A1 10/2010 Mumtaz et al.
2010/0269430 A1 10/2010 Haddock
2010/0275971 A1 11/2010 Zingher
2010/0277001 A1 11/2010 Wagoner
2010/0282290 A1 11/2010 Schwarze et al.
2010/0286836 A1 11/2010 Shaver, II et al.
2010/0288327 A1 11/2010 Lisi et al.
2010/0289337 A1 11/2010 Stauth et al.
2010/0294528 A1 11/2010 Sella et al.
2010/0294903 A1 11/2010 Shmukler et al.
2010/0295680 A1 11/2010 Dumps
2010/0297860 A1 11/2010 Shmukler et al.
2010/0301677 A1 12/2010 Tomita
2010/0301991 A1 12/2010 Sella et al.
2010/0308662 A1 12/2010 Schatz et al.
2010/0309692 A1 12/2010 Chisenga et al.
2010/0315043 A1 12/2010 Chau
2010/0321148 A1 12/2010 Gevorkian
2010/0326809 A1 12/2010 Lang et al.
2010/0327657 A1 12/2010 Kuran
2010/0327659 A1 12/2010 Isi et al.
2010/0332047 A1 12/2010 Arditi et al.
2011/0006743 A1 1/2011 Fabbro
2011/0012430 A1 1/2011 Cheng et al.
2011/0019444 A1 1/2011 Dargatz et al.
2011/0025130 A1 2/2011 Hadar et al.
2011/0026282 A1 2/2011 Chapman et al.
2011/0027626 A1 2/2011 Lattin
2011/0031816 A1 2/2011 Buthker et al.
2011/0031946 A1 2/2011 Egan et al.
2011/0037600 A1 2/2011 Takehara et al.
2011/0043172 A1 2/2011 Dearn
2011/0045802 A1 2/2011 Bland et al.
2011/0049990 A1 3/2011 Amaratunga et al.
2011/0050002 A1 3/2011 De Luca
2011/0050190 A1 3/2011 Avrutsky
2011/0056533 A1 3/2011 Kuan
2011/0061705 A1 3/2011 Croft et al.
2011/0061713 A1 3/2011 Powell et al.
2011/0062784 A1 3/2011 Wolfs
2011/0068633 A1 3/2011 Quardt et al.
2011/0079263 A1 4/2011 Avrutsky
2011/0080147 A1 4/2011 Schoenlinner et al.

(56) References Cited

U.S. PATENT DOCUMENTS

2011/0083733 A1 4/2011 Marroquin et al.
2011/0084553 A1 4/2011 Adest et al.
2011/0088741 A1 4/2011 Dunton et al.
2011/0101949 A1 5/2011 Lopata et al.
2011/0108087 A1 5/2011 Croft et al.
2011/0109158 A1 5/2011 Olsen
2011/0114154 A1 5/2011 Lichy et al.
2011/0115295 A1 5/2011 Moon et al.
2011/0115393 A1 5/2011 He
2011/0116294 A1 5/2011 Wolf
2011/0121441 A1 5/2011 Halstead et al.
2011/0121652 A1 5/2011 Sella et al.
2011/0125431 A1 5/2011 Adest et al.
2011/0132424 A1 6/2011 Rakib
2011/0133552 A1 6/2011 Binder et al.
2011/0133556 A1 6/2011 Choi
2011/0139213 A1 6/2011 Lee
2011/0140535 A1 6/2011 Choi et al.
2011/0140536 A1 6/2011 Adest et al.
2011/0141644 A1 6/2011 Hastings et al.
2011/0144822 A1 6/2011 Choi
2011/0161722 A1 6/2011 Makhota et al.
2011/0172842 A1 7/2011 Makhota et al.
2011/0173276 A1 7/2011 Eizips et al.
2011/0179726 A1 7/2011 Pao et al.
2011/0181251 A1 7/2011 Porter et al.
2011/0181340 A1 7/2011 Gazit
2011/0183537 A1 7/2011 Fornage et al.
2011/0198935 A1 8/2011 Hinman et al.
2011/0210610 A1 9/2011 Mitsuoka et al.
2011/0210611 A1 9/2011 Ledenev et al.
2011/0210612 A1 9/2011 Leutwein
2011/0218687 A1 9/2011 Hadar et al.
2011/0227411 A1 9/2011 Arditi
2011/0232714 A1 9/2011 Bhavaraju et al.
2011/0240100 A1 10/2011 Lu et al.
2011/0245989 A1 10/2011 Makhota et al.
2011/0246338 A1 10/2011 Eich
2011/0254372 A1 10/2011 Haines et al.
2011/0260866 A1 10/2011 Avrutsky et al.
2011/0267721 A1 11/2011 Chaintreuil et al.
2011/0267859 A1 11/2011 Chapman
2011/0271611 A1 11/2011 Maracci et al.
2011/0273015 A1 11/2011 Adest et al.
2011/0273016 A1 11/2011 Adest et al.
2011/0273017 A1 11/2011 Borup et al.
2011/0273024 A1 11/2011 Butzmann
2011/0273302 A1 11/2011 Fornage et al.
2011/0278955 A1 11/2011 Signorelli et al.
2011/0285205 A1 11/2011 Edenev et al.
2011/0285375 A1 11/2011 Deboy
2011/0290317 A1 12/2011 Naumovitz et al.
2011/0291486 A1 12/2011 Adest et al.
2011/0298288 A1 12/2011 Cho et al.
2011/0301772 A1 12/2011 Zuercher et al.
2011/0304204 A1 12/2011 Avrutsky et al.
2011/0304213 A1 12/2011 Avrutsky et al.
2011/0304215 A1 12/2011 Avrutsky et al.
2011/0316346 A1 12/2011 Porter et al.
2012/0007434 A1 1/2012 Perreault et al.
2012/0007558 A1 1/2012 Pigott
2012/0007613 A1 1/2012 Gazit
2012/0019966 A1 1/2012 DeBoer
2012/0026763 A1 2/2012 Humphrey et al.
2012/0026769 A1 2/2012 Schroeder et al.
2012/0032515 A1 2/2012 Ledenev et al.
2012/0033392 A1 2/2012 Golubovic et al.
2012/0033463 A1 2/2012 Rodriguez
2012/0039099 A1 2/2012 Rodriguez
2012/0042588 A1 2/2012 Erickson, Jr.
2012/0043818 A1 2/2012 Stratakos et al.
2012/0043823 A1 2/2012 Stratakos et al.
2012/0044014 A1 2/2012 Stratakos et al.
2012/0044717 A1 2/2012 Suntio et al.
2012/0048325 A1 3/2012 Matsuo et al.
2012/0049627 A1 3/2012 Matsuo et al.
2012/0049801 A1 3/2012 Chang
2012/0049819 A1 3/2012 Mao et al.
2012/0056483 A1 3/2012 Capp et al.
2012/0056591 A1 3/2012 Abe et al.
2012/0063177 A1 3/2012 Garrity
2012/0080943 A1 4/2012 Phadke
2012/0081009 A1 4/2012 Shteynberg et al.
2012/0081933 A1 4/2012 Garrity
2012/0081934 A1 4/2012 Garrity et al.
2012/0081937 A1 4/2012 Phadke
2012/0087159 A1 4/2012 Chapman et al.
2012/0091810 A1 4/2012 Aiello et al.
2012/0091817 A1 4/2012 Seymour et al.
2012/0098344 A1 4/2012 Bergveld et al.
2012/0104861 A1 5/2012 Kojori et al.
2012/0104863 A1 5/2012 Yuan
2012/0113554 A1 5/2012 Paoletti et al.
2012/0119584 A1 5/2012 Hadar et al.
2012/0126624 A1 5/2012 Hester et al.
2012/0127764 A1 5/2012 Phadke et al.
2012/0133372 A1 5/2012 Tsai et al.
2012/0134058 A1 5/2012 Pamer et al.
2012/0138123 A1 6/2012 Newdoll et al.
2012/0139343 A1 6/2012 Adest et al.
2012/0146420 A1 6/2012 Wolfs
2012/0146583 A1 6/2012 Gaul et al.
2012/0153729 A1 6/2012 Song et al.
2012/0161526 A1 6/2012 Huang et al.
2012/0161528 A1 6/2012 Mumtaz et al.
2012/0169124 A1 7/2012 Nakashima et al.
2012/0169291 A1 7/2012 Abe et al.
2012/0174961 A1 7/2012 Larson et al.
2012/0175961 A1 7/2012 Har-Shai et al.
2012/0175963 A1 7/2012 Adest et al.
2012/0187769 A1 7/2012 Spannhake et al.
2012/0194003 A1 8/2012 Schmidt et al.
2012/0199172 A1 8/2012 Avrutsky
2012/0200311 A1 8/2012 Chaintreuil
2012/0212066 A1 8/2012 Adest et al.
2012/0215367 A1 8/2012 Eizips et al.
2012/0217797 A1 8/2012 Butzmann
2012/0217973 A1 8/2012 Avrutsky
2012/0228931 A1 9/2012 Butzmann
2012/0240490 A1 9/2012 Gangemi
2012/0242156 A1 9/2012 Butzmann et al.
2012/0253533 A1 10/2012 Eizips et al.
2012/0253541 A1 10/2012 Arditi et al.
2012/0255591 A1 10/2012 Arditi et al.
2012/0268969 A1 10/2012 Cuk
2012/0271576 A1 10/2012 Kamel et al.
2012/0274145 A1 11/2012 Taddeo
2012/0274264 A1 11/2012 Mun et al.
2012/0280571 A1 11/2012 Hargis
2012/0299380 A1 11/2012 Haupt
2012/0318320 A1 12/2012 Robbins
2013/0002335 A1 1/2013 DeGraaff
2013/0026839 A1 1/2013 Grana
2013/0026840 A1 1/2013 Arditi et al.
2013/0026842 A1 1/2013 Arditi et al.
2013/0026843 A1 1/2013 Arditi et al.
2013/0038124 A1 2/2013 Newdoll et al.
2013/0039028 A1 2/2013 Korman et al.
2013/0049710 A1 2/2013 Kraft et al.
2013/0057223 A1 3/2013 Lee
2013/0062956 A1 3/2013 Meyer et al.
2013/0062958 A1 3/2013 Erickson, Jr. et al.
2013/0063119 A1 3/2013 Lubomirsky
2013/0069438 A1 3/2013 Liu et al.
2013/0082724 A1 4/2013 Noda et al.
2013/0094112 A1 4/2013 Burghardt et al.
2013/0094262 A1 4/2013 Avrutsky
2013/0134790 A1 5/2013 Amaratunga et al.
2013/0175971 A1 7/2013 Har-Shai et al.
2013/0181533 A1 7/2013 Capp et al.
2013/0192657 A1 8/2013 Hadar et al.
2013/0193765 A1 8/2013 Yoscovich
2013/0194706 A1 8/2013 Har-Shai et al.
2013/0200709 A1 8/2013 Kirchner et al.

(56) References Cited

U.S. PATENT DOCUMENTS

2013/0200710 A1* 8/2013 Robbins .................... H02J 1/06 307/77
2013/0214607 A1 8/2013 Harrison
2013/0222144 A1 8/2013 Hadar et al.
2013/0229834 A1 9/2013 Garrity et al.
2013/0229842 A1 9/2013 Garrity
2013/0234518 A1 9/2013 Mumtaz et al.
2013/0235637 A1 9/2013 Rodriguez
2013/0269181 A1 10/2013 McBride et al.
2013/0271096 A1 10/2013 Nagaki
2013/0279210 A1 10/2013 Chisenga et al.
2013/0285459 A1 10/2013 Jaoui et al.
2013/0294126 A1 11/2013 Garrity et al.
2013/0307556 A1 11/2013 Ledenev et al.
2013/0313909 A1 11/2013 Storbeck et al.
2013/0320778 A1 12/2013 Hopf et al.
2013/0321013 A1 12/2013 Pisklak et al.
2013/0328541 A1 12/2013 Euler et al.
2013/0332093 A1 12/2013 Adest et al.
2013/0335861 A1 12/2013 Laschinski et al.
2014/0052305 A1 2/2014 Kearns et al.
2014/0062206 A1 3/2014 Bryson
2014/0062209 A1 3/2014 Liu et al.
2014/0062396 A1 3/2014 Reddy
2014/0077756 A1 3/2014 Kataoka et al.
2014/0097808 A1 4/2014 Clark et al.
2014/0119072 A1 5/2014 Behrends et al.
2014/0119076 A1 5/2014 Chang et al.
2014/0167715 A1 6/2014 Wu et al.
2014/0169053 A1 6/2014 Tic et al.
2014/0191583 A1 7/2014 Chisenga et al.
2014/0210485 A1 7/2014 Lang et al.
2014/0233136 A1 8/2014 Heerdt
2014/0246915 A1 9/2014 Mumtaz
2014/0246927 A1 9/2014 Mumtaz
2014/0252859 A1 9/2014 Chisenga et al.
2014/0265551 A1 9/2014 Willis
2014/0265579 A1 9/2014 Mumtaz
2014/0265629 A1 9/2014 Gazit et al.
2014/0265638 A1 9/2014 Orr et al.
2014/0268913 A1 9/2014 Zheng et al.
2014/0277796 A1 9/2014 Peskin et al.
2014/0293491 A1 10/2014 Robbins
2014/0306543 A1 10/2014 Garrity et al.
2014/0327313 A1 11/2014 Arditi et al.
2014/0327995 A1 11/2014 Panjwani et al.
2014/0354245 A1 12/2014 Batikoff et al.
2015/0022006 A1 1/2015 Garrity et al.
2015/0028683 A1 1/2015 Hadar et al.
2015/0028692 A1 1/2015 Makhota et al.
2015/0061409 A1 3/2015 Dunton et al.
2015/0069844 A1 3/2015 Wu et al.
2015/0100265 A1 4/2015 Duchemin
2015/0103572 A1 4/2015 Jean
2015/0131187 A1* 5/2015 Krein ...................... H02S 50/00 361/67
2015/0161872 A1 6/2015 Beaulieu et al.
2015/0171789 A1 6/2015 Har-Shai et al.
2015/0183328 A1 7/2015 Kusch et al.
2015/0188415 A1 7/2015 Abido et al.
2015/0214889 A1 7/2015 Nam et al.
2015/0236589 A1 8/2015 Baba
2015/0263609 A1 9/2015 Weida et al.
2015/0318410 A1 11/2015 Higuma
2015/0318721 A1 11/2015 Watanabe et al.
2015/0351264 A1 12/2015 Linderman
2015/0364918 A1 12/2015 Singh et al.
2015/0372490 A1 12/2015 Bakas et al.
2015/0381108 A1* 12/2015 Höft ........................ H02S 50/00 361/91.1
2015/0381111 A1 12/2015 Nicolescu et al.
2016/0006392 A1 1/2016 Hoft
2016/0036235 A1 2/2016 Getsla
2016/0126367 A1 5/2016 Dunton et al.
2016/0172900 A1 6/2016 Welch, Jr.
2016/0181802 A1 6/2016 Jacobson et al.
2016/0190931 A1 6/2016 Zhang
2016/0211841 A1 7/2016 Harrison
2016/0226252 A1 8/2016 Kravtiz et al.
2016/0226257 A1 8/2016 Porter et al.
2016/0241039 A1 8/2016 Cheng et al.
2016/0268809 A1 9/2016 Ledenev et al.
2016/0270245 A1 9/2016 Linderman
2016/0276820 A1 9/2016 Olivas et al.
2016/0293115 A1 10/2016 Yamashita et al.
2016/0329715 A1 11/2016 Orr et al.
2016/0336899 A1 11/2016 Ledenev et al.
2016/0380436 A1 12/2016 Porter et al.
2017/0104413 A1 4/2017 Busch et al.
2017/0138804 A1 5/2017 Lebental et al.
2017/0179876 A1 6/2017 Freeman et al.
2017/0179886 A1 6/2017 Oishi et al.
2017/0184343 A1 6/2017 Freer et al.
2017/0207746 A1 7/2017 Yoscovich et al.
2017/0211190 A1 7/2017 Glasscock et al.
2017/0222542 A1 8/2017 Adest et al.
2017/0271879 A1 9/2017 Ledenev et al.
2017/0278375 A1 9/2017 Galin et al.
2017/0288384 A1 10/2017 Loewenstern et al.
2017/0331325 A1 11/2017 Ristau
2018/0034411 A1 2/2018 Charles et al.
2018/0145593 A1 5/2018 Ki et al.
2018/0191292 A1 7/2018 Ehlmann
2018/0248513 A1 8/2018 Höft
2018/0278206 A1 9/2018 Tan et al.
2018/0351401 A1 12/2018 Binder et al.
2019/0379279 A1 12/2019 Adest et al.
2019/0393834 A1 12/2019 Har-Shai et al.
2020/0176937 A1 6/2020 Azad
2020/0279963 A1 9/2020 Yoscovich et al.
2020/0373841 A1 11/2020 Xie et al.
2021/0036557 A1 2/2021 Haug et al.
2021/0135455 A1 5/2021 Marinopoulos et al.

FOREIGN PATENT DOCUMENTS

CA 1183574 A 3/1985
CA 2063243 A1 12/1991
CA 2301657 A1 3/1999
CA 2394761 A1 6/2001
CA 2658087 A1 6/2001
CA 2443450 A1 3/2005
CA 2572452 A1 1/2006
CA 2613038 A1 1/2007
CA 2704605 A1 5/2009
CA 2702392 C 9/2015
CA 2895545 A1 12/2015
CN 2071396 U 2/1991
CN 1106523 A 8/1995
CN 2284479 Y 6/1998
CN 1188453 A 7/1998
CN 2305016 Y 1/1999
CN 1236213 A 11/1999
CN 1244745 A 2/2000
CN 1064487 C 4/2001
CN 1309451 A 8/2001
CN 1362655 A 8/2002
CN 2514538 Y 10/2002
CN 1122905 C 10/2003
CN 2579063 Y 10/2003
CN 1474492 A 2/2004
CN 1523726 A 8/2004
CN 1551377 A 12/2004
CN 1185782 C 1/2005
CN 2672668 Y 1/2005
CN 2672938 Y 1/2005
CN 1588773 A 3/2005
CN 1614854 A 5/2005
CN 2706955 Y 6/2005
CN 1245795 C 3/2006
CN 1787717 A 6/2006
CN 1794537 A 6/2006
CN 1838191 A 9/2006
CN 1841254 A 10/2006

(56) References Cited

FOREIGN PATENT DOCUMENTS

| | | | |
|---|---|---|---|
| CN | 1841823 | A | 10/2006 |
| CN | 1848588 | A | 10/2006 |
| CN | 1892239 | A | 1/2007 |
| CN | 1902809 | A | 1/2007 |
| CN | 1929276 | A | 3/2007 |
| CN | 1930925 | A | 3/2007 |
| CN | 1933315 | A | 3/2007 |
| CN | 2891438 | Y | 4/2007 |
| CN | 101030752 | A | 9/2007 |
| CN | 101050770 | A | 10/2007 |
| CN | 101107712 | A | 1/2008 |
| CN | 101128974 | A | 2/2008 |
| CN | 101136129 | A | 3/2008 |
| CN | 101180781 | A | 5/2008 |
| CN | 101257221 | A | 9/2008 |
| CN | 201167381 | Y | 12/2008 |
| CN | 201203438 | Y | 3/2009 |
| CN | 101488271 | A | 7/2009 |
| CN | 101521459 | A | 9/2009 |
| CN | 101523230 | A | 9/2009 |
| CN | 101647172 | A | 2/2010 |
| CN | 101672252 | A | 3/2010 |
| CN | 101697462 | A | 4/2010 |
| CN | 101779291 | A | 7/2010 |
| CN | 101847939 | A | 9/2010 |
| CN | 201601477 | U | 10/2010 |
| CN | 201623478 | U | 11/2010 |
| CN | 201623651 | U | 11/2010 |
| CN | 101902051 | A | 12/2010 |
| CN | 101902171 | A | 12/2010 |
| CN | 101904015 | A | 12/2010 |
| CN | 201663167 | U | 12/2010 |
| CN | 101939660 | A | 1/2011 |
| CN | 101951011 | A | 1/2011 |
| CN | 101951190 | A | 1/2011 |
| CN | 101953051 | A | 1/2011 |
| CN | 101953060 | A | 1/2011 |
| CN | 101976952 | A | 2/2011 |
| CN | 101980409 | A | 2/2011 |
| CN | 102084584 | A | 6/2011 |
| CN | 102089883 | A | 6/2011 |
| CN | 102117815 | A | 7/2011 |
| CN | 102148584 | A | 8/2011 |
| CN | 201956938 | U | 8/2011 |
| CN | 202034903 | U | 11/2011 |
| CN | 102273039 | A | 12/2011 |
| CN | 202103601 | U | 1/2012 |
| CN | 102362550 | A | 2/2012 |
| CN | 102386259 | A | 3/2012 |
| CN | 202178274 | U | 3/2012 |
| CN | 102474112 | A | 5/2012 |
| CN | 102565635 | A | 7/2012 |
| CN | 102771017 | A | 11/2012 |
| CN | 102845136 | A | 12/2012 |
| CN | 202871823 | U | 4/2013 |
| CN | 103227475 | A | 7/2013 |
| CN | 103280768 | A | 9/2013 |
| CN | 103299501 | A | 9/2013 |
| CN | 203367304 | U | 12/2013 |
| CN | 103548226 | A | 1/2014 |
| CN | 103580463 | A | 2/2014 |
| CN | 103875144 | A | 6/2014 |
| CN | 104143916 | A | 11/2014 |
| CN | 104158482 | A | 11/2014 |
| CN | 104253585 | A | 12/2014 |
| CN | 104488155 | A | 4/2015 |
| CN | 104685785 | A | 6/2015 |
| CN | 104779636 | A | 7/2015 |
| CN | 105075046 | A | 11/2015 |
| CN | 105164915 | A | 12/2015 |
| CN | 105490298 | A | 4/2016 |
| CN | 105553422 | A | 5/2016 |
| CN | 205609261 | U | 9/2016 |
| CN | 106093721 | A | 11/2016 |
| CN | 207304483 | U | 5/2018 |
| DE | 1161639 | B | 1/1964 |
| DE | 3236071 | A1 | 1/1984 |
| DE | 3525630 | A1 | 1/1987 |
| DE | 3729000 | A1 | 3/1989 |
| DE | 4019710 | A1 | 1/1992 |
| DE | 4032569 | A1 | 4/1992 |
| DE | 4041672 | A1 | 6/1992 |
| DE | 9312710 | U1 | 10/1993 |
| DE | 4232356 | A1 | 3/1994 |
| DE | 4325436 | A1 | 2/1995 |
| DE | 4328511 | A1 | 3/1995 |
| DE | 19515786 | A1 | 11/1995 |
| DE | 19502762 | A1 | 8/1996 |
| DE | 19614861 | A1 | 7/1997 |
| DE | 19609189 | A1 | 9/1997 |
| DE | 19618882 | A1 | 11/1997 |
| DE | 19701897 | A1 | 7/1998 |
| DE | 19718046 | A1 | 11/1998 |
| DE | 19732218 | C1 | 3/1999 |
| DE | 19737286 | A1 | 3/1999 |
| DE | 19838230 | A1 | 2/2000 |
| DE | 19846818 | A1 | 4/2000 |
| DE | 19859732 | A1 | 6/2000 |
| DE | 19904561 | C1 | 8/2000 |
| DE | 19928809 | A1 | 1/2001 |
| DE | 019937410 | A1 | 2/2001 |
| DE | 19961705 | A1 | 7/2001 |
| DE | 10064039 | A1 | 12/2001 |
| DE | 10060108 | A1 | 6/2002 |
| DE | 10103431 | A1 | 8/2002 |
| DE | 10136147 | A1 | 2/2003 |
| DE | 10219956 | A1 | 4/2003 |
| DE | 10222621 | A1 | 11/2003 |
| DE | 202004001246 | U1 | 4/2004 |
| DE | 10345302 | A1 | 4/2005 |
| DE | 102004043478 | A1 | 4/2005 |
| DE | 102004053942 | A1 | 5/2006 |
| DE | 102004037446 | A1 | 6/2006 |
| DE | 69735169 | T2 | 8/2006 |
| DE | 102005018173 | A1 | 10/2006 |
| DE | 20 2005 020161 | U1 | 11/2006 |
| DE | 102005036153 | A1 | 12/2006 |
| DE | 102005030907 | A1 | 1/2007 |
| DE | 102005032864 | A1 | 1/2007 |
| DE | 102006023563 | A1 | 11/2007 |
| DE | 102006026073 | A1 | 12/2007 |
| DE | 202007002077 | U1 | 4/2008 |
| DE | 102006060815 | A1 | 6/2008 |
| DE | 602004011201 | T2 | 12/2008 |
| DE | 102007051134 | A1 | 3/2009 |
| DE | 202008012345 | U1 | 3/2009 |
| DE | 102007037130 | B3 | 4/2009 |
| DE | 102007050031 | B3 | 4/2009 |
| DE | 202009007318 | U1 | 8/2009 |
| DE | 102008042199 | A1 | 4/2010 |
| DE | 102008057874 | A1 | 5/2010 |
| DE | 102009051186 | A1 | 5/2010 |
| DE | 102009022569 | A1 | 12/2010 |
| DE | 102010023549 | A1 | 12/2011 |
| DE | 202011109688 | U1 | 3/2012 |
| DE | 102013101314 | A1 | 8/2014 |
| DE | 102013106255 | A1 | 12/2014 |
| DE | 102013106808 | A1 | 12/2014 |
| DE | 102016117229 | A1 | 3/2018 |
| EP | 0027405 | A1 | 4/1981 |
| EP | 0178757 | A2 | 4/1986 |
| EP | 0206253 | A1 | 12/1986 |
| EP | 0231211 | A1 | 8/1987 |
| EP | 0293219 | A2 | 11/1988 |
| EP | 0340006 | A2 | 11/1989 |
| EP | 0418612 | A1 | 3/1991 |
| EP | 419093 | A2 | 3/1991 |
| EP | 420295 | A1 | 4/1991 |
| EP | 0521467 | A2 | 1/1993 |
| EP | 0576271 | A2 | 12/1993 |
| EP | 0577334 | A2 | 1/1994 |
| EP | 604777 | A1 | 7/1994 |
| EP | 0628901 | A2 | 12/1994 |
| EP | 0642199 | A1 | 3/1995 |

(56) References Cited

FOREIGN PATENT DOCUMENTS

| | | | |
|---|---|---|---|
| EP | 653692 | A2 | 5/1995 |
| EP | 0670915 | A1 | 9/1995 |
| EP | 677749 | A2 | 10/1995 |
| EP | 756178 | A2 | 1/1997 |
| EP | 0756372 | A1 | 1/1997 |
| EP | 0780750 | A2 | 6/1997 |
| EP | 0809293 | A1 | 11/1997 |
| EP | 824273 | A2 | 2/1998 |
| EP | 827254 | A2 | 3/1998 |
| EP | 0895146 | A1 | 2/1999 |
| EP | 0906660 | A1 | 4/1999 |
| EP | 0947904 | A2 | 10/1999 |
| EP | 0947905 | A2 | 10/1999 |
| EP | 964415 | A1 | 12/1999 |
| EP | 0978884 | A3 | 3/2000 |
| EP | 1012886 | A1 | 6/2000 |
| EP | 1024575 | A2 | 8/2000 |
| EP | 1034465 | A1 | 9/2000 |
| EP | 1035640 | A1 | 9/2000 |
| EP | 1039361 | A1 | 9/2000 |
| EP | 1039620 | A2 | 9/2000 |
| EP | 1039621 | A2 | 9/2000 |
| EP | 1047179 | A1 | 10/2000 |
| EP | 1130770 | A2 | 9/2001 |
| EP | 1143594 | A2 | 10/2001 |
| EP | 1187291 | A2 | 3/2002 |
| EP | 1235339 | A2 | 8/2002 |
| EP | 1239573 | A1 | 9/2002 |
| EP | 1239576 | A2 | 9/2002 |
| EP | 1254505 | A2 | 11/2002 |
| EP | 1271742 | A2 | 1/2003 |
| EP | 1291997 | A2 | 3/2003 |
| EP | 1330009 | A2 | 7/2003 |
| EP | 1339153 | A2 | 8/2003 |
| EP | 1369983 | A1 | 12/2003 |
| EP | 1376706 | A2 | 1/2004 |
| EP | 1388774 | A1 | 2/2004 |
| EP | 1400988 | A2 | 3/2004 |
| EP | 1407534 | A2 | 4/2004 |
| EP | 1120895 | A3 | 5/2004 |
| EP | 1418482 | A1 | 5/2004 |
| EP | 1429393 | A2 | 6/2004 |
| EP | 1442473 | A2 | 8/2004 |
| EP | 1447561 | A1 | 8/2004 |
| EP | 1457857 | A2 | 9/2004 |
| EP | 1463188 | A2 | 9/2004 |
| EP | 1475882 | A2 | 11/2004 |
| EP | 1503490 | A1 | 2/2005 |
| EP | 1521345 | A1 | 4/2005 |
| EP | 1526633 | A2 | 4/2005 |
| EP | 1531542 | A2 | 5/2005 |
| EP | 1531545 | A2 | 5/2005 |
| EP | 1532727 | A2 | 5/2005 |
| EP | 1552563 | A2 | 7/2005 |
| EP | 1580862 | A1 | 9/2005 |
| EP | 1603212 | A2 | 12/2005 |
| EP | 1610571 | A2 | 12/2005 |
| EP | 1623495 | A1 | 2/2006 |
| EP | 1642355 | A2 | 4/2006 |
| EP | 0964457 | A3 | 5/2006 |
| EP | 1657557 | A1 | 5/2006 |
| EP | 1657797 | A1 | 5/2006 |
| EP | 1684397 | A2 | 7/2006 |
| EP | 1691246 | A2 | 8/2006 |
| EP | 1706937 | A1 | 10/2006 |
| EP | 1708070 | A1 | 10/2006 |
| EP | 1716272 | A1 | 11/2006 |
| EP | 1728413 | A1 | 12/2006 |
| EP | 1734373 | A2 | 12/2006 |
| EP | 1750193 | A1 | 2/2007 |
| EP | 1766490 | A1 | 3/2007 |
| EP | 1782146 | A2 | 5/2007 |
| EP | 1785800 | A1 | 5/2007 |
| EP | 1837985 | A2 | 9/2007 |
| EP | 1842121 | A2 | 10/2007 |
| EP | 1609250 | B1 | 1/2008 |
| EP | 1887675 | A2 | 2/2008 |
| EP | 1901419 | A2 | 3/2008 |
| EP | 1902349 | A2 | 3/2008 |
| EP | 1911101 | A1 | 4/2008 |
| EP | 1914857 | A1 | 4/2008 |
| EP | 2048679 | A1 | 4/2009 |
| EP | 2054944 | A2 | 5/2009 |
| EP | 2061088 | A2 | 5/2009 |
| EP | 2092631 | A2 | 8/2009 |
| EP | 2130286 | A1 | 12/2009 |
| EP | 2135296 | A2 | 12/2009 |
| EP | 2144133 | A1 | 1/2010 |
| EP | 2179451 | A1 | 4/2010 |
| EP | 2232690 | A1 | 9/2010 |
| EP | 2234237 | A1 | 9/2010 |
| EP | 2249457 | A1 | 11/2010 |
| EP | 2256819 | A1 | 12/2010 |
| EP | 2315328 | A2 | 4/2011 |
| EP | 2355268 | A1 | 8/2011 |
| EP | 2374190 | A1 | 10/2011 |
| EP | 2386122 | A2 | 11/2011 |
| EP | 2393178 | A2 | 12/2011 |
| EP | 2395648 | A2 | 12/2011 |
| EP | 2495766 | A1 | 9/2012 |
| EP | 2515424 | A2 | 10/2012 |
| EP | 2533299 | A1 | 12/2012 |
| EP | 2549635 | A1 | 1/2013 |
| EP | 2561596 | A2 | 2/2013 |
| EP | 2581941 | A2 | 4/2013 |
| EP | 2615644 | A2 | 7/2013 |
| EP | 2621045 | A2 | 7/2013 |
| EP | 2666222 | A1 | 11/2013 |
| EP | 2722979 | A1 | 4/2014 |
| EP | 2779251 | A1 | 9/2014 |
| EP | 3176933 | A1 | 6/2017 |
| EP | 2139104 | B1 | 10/2017 |
| EP | 3252909 | A1 | 12/2017 |
| EP | 3382871 | A1 | 10/2018 |
| ES | 2249147 | A1 | 3/2006 |
| ES | 2249149 | A1 | 3/2006 |
| FR | 2796216 | A1 | 1/2001 |
| FR | 2819653 | A1 | 7/2002 |
| FR | 2894401 | A1 | 6/2007 |
| GB | 310362 | A | 9/1929 |
| GB | 612859 | A | 11/1948 |
| GB | 1211885 | A | 11/1970 |
| GB | 1231961 | A | 5/1971 |
| GB | 1261838 | A | 1/1972 |
| GB | 1571681 | A | 7/1980 |
| GB | 1597508 | A | 9/1981 |
| GB | 2128017 | A | 4/1984 |
| GB | 2327208 | A | 1/1999 |
| GB | 2339465 | A | 1/2000 |
| GB | 2376801 | A | 12/2002 |
| GB | 2399463 | A | 9/2004 |
| GB | 2399465 | A | 9/2004 |
| GB | 2415841 | A | 1/2006 |
| GB | 2419968 | A | 5/2006 |
| GB | 2421847 | A | 7/2006 |
| GB | 2434490 | A | 7/2007 |
| GB | 2476508 | A | 6/2011 |
| GB | 2480015 | B | 12/2011 |
| GB | 2482653 | A | 2/2012 |
| GB | 2483317 | A | 3/2012 |
| GB | 2485527 | A | 5/2012 |
| GB | 2486408 | A | 6/2012 |
| GB | 2487368 | A | 7/2012 |
| GB | 2497275 | A | 6/2013 |
| GB | 2498365 | A | 7/2013 |
| GB | 2498790 | A | 7/2013 |
| GB | 2498791 | A | 7/2013 |
| GB | 2499991 | A | 9/2013 |
| IN | 101976855 | A | 2/2011 |
| IN | 201926948 | U | 8/2011 |
| JP | S56042365 | A | 4/1981 |
| JP | 860027964 | A | 2/1985 |
| JP | S60148172 | A | 8/1985 |
| JP | 61065320 | A | 4/1986 |

(56) References Cited

FOREIGN PATENT DOCUMENTS

| | | | |
|---|---|---|---|
| JP | 862154121 | A | 7/1987 |
| JP | 862154122 | A | 7/1987 |
| JP | H04219982 | A | 8/1992 |
| JP | H04364378 | A | 12/1992 |
| JP | H05003678 | A | 1/1993 |
| JP | H06035555 | A | 2/1994 |
| JP | H06141261 | A | 5/1994 |
| JP | H107026849 | A | 1/1995 |
| JP | H07058843 | A | 3/1995 |
| JP | 107-222436 | A | 8/1995 |
| JP | H07322529 | A | 12/1995 |
| JP | 8009557 | A | 1/1996 |
| JP | H08033347 | A | 2/1996 |
| JP | H08066050 | A | 3/1996 |
| JP | H0897460 | A | 4/1996 |
| JP | 08138754 | A | 5/1996 |
| JP | H08116628 | A | 5/1996 |
| JP | 108185235 | A | 7/1996 |
| JP | H08181343 | A | 7/1996 |
| JP | H08204220 | A | 8/1996 |
| JP | H08227324 | A | 9/1996 |
| JP | H08316517 | A | 11/1996 |
| JP | H08317664 | A | 11/1996 |
| JP | 097644 | A | 1/1997 |
| JP | H094692 | A | 1/1997 |
| JP | H09097918 | A | 4/1997 |
| JP | H09148611 | A | 6/1997 |
| JP | H09148613 | A | 6/1997 |
| JP | H09275644 | A | 10/1997 |
| JP | 2676789 | B2 | 11/1997 |
| JP | H1017445 | A | 1/1998 |
| JP | 11075580 | A | 3/1998 |
| JP | H10201086 | A | 7/1998 |
| JP | H10201105 | A | 7/1998 |
| JP | H10308523 | A | 11/1998 |
| JP | 11041832 | A | 2/1999 |
| JP | H1146457 | A | 2/1999 |
| JP | 11103538 | A | 4/1999 |
| JP | 2892183 | B2 | 5/1999 |
| JP | 11206038 | A | 7/1999 |
| JP | H11266545 | A | 9/1999 |
| JP | 11289891 | A | 10/1999 |
| JP | 11318042 | A | 11/1999 |
| JP | H11332088 | A | 11/1999 |
| JP | 2000020150 | A | 1/2000 |
| JP | 3015512 | B2 | 3/2000 |
| JP | 2000-112545 | A | 4/2000 |
| JP | 2000-116010 | A | 4/2000 |
| JP | 2000160789 | A | 6/2000 |
| JP | 2000166097 | A | 6/2000 |
| JP | 2000174307 | A | 6/2000 |
| JP | 2000232791 | A | 8/2000 |
| JP | 2000232793 | A | 8/2000 |
| JP | 2000316282 | A | 11/2000 |
| JP | 2000324852 | A | 11/2000 |
| JP | 2000341974 | A | 12/2000 |
| JP | 2000347753 | A | 12/2000 |
| JP | 200185716 | A | 3/2001 |
| JP | 2001075662 | A | 3/2001 |
| JP | 2001086765 | A | 3/2001 |
| JP | 2001178145 | A | 6/2001 |
| JP | 2001189476 | A | 7/2001 |
| JP | 2001224142 | A | 8/2001 |
| JP | 2001238466 | A | 8/2001 |
| JP | 2001250964 | A | 9/2001 |
| JP | 2001255949 | A | 9/2001 |
| JP | 2001-320827 | A | 11/2001 |
| JP | 2002073184 | A | 3/2002 |
| JP | 2002231578 | A | 8/2002 |
| JP | 2002238246 | A | 8/2002 |
| JP | 2002-262461 | A | 9/2002 |
| JP | 2002270876 | A | 9/2002 |
| JP | 2002300735 | A | 10/2002 |
| JP | 2002339591 | A | 11/2002 |
| JP | 2002354677 | A | 12/2002 |
| JP | 2003068312 | A | 3/2003 |
| JP | 2003102134 | A | 4/2003 |
| JP | 2003124492 | A | 4/2003 |
| JP | 2003132959 | A | 5/2003 |
| JP | 2003132960 | A | 5/2003 |
| JP | 2003134667 | A | 5/2003 |
| JP | 2003168487 | A | 6/2003 |
| JP | 2003282916 | A | 10/2003 |
| JP | 2003289674 | A | 10/2003 |
| JP | 2004047279 | A | 2/2004 |
| JP | 2004-096090 | A | 3/2004 |
| JP | 2004111754 | A | 4/2004 |
| JP | 2004-147465 | A | 5/2004 |
| JP | 2004194500 | A | 7/2004 |
| JP | 2004260944 | A | 9/2004 |
| JP | 2004-334704 | A | 11/2004 |
| JP | 2004312994 | A | 11/2004 |
| JP | 2005-151662 | A | 6/2005 |
| JP | 3656531 | B2 | 6/2005 |
| JP | 2005192314 | A | 7/2005 |
| JP | 2005-235082 | A | 9/2005 |
| JP | 2005-276942 | A | 10/2005 |
| JP | 2005283516 | A | 10/2005 |
| JP | 2005-312287 | A | 11/2005 |
| JP | 2006041440 | A | 2/2006 |
| JP | 2006262619 | A | 9/2006 |
| JP | 2006271083 | A | 10/2006 |
| JP | 2006278755 | A | 10/2006 |
| JP | 2007058845 | A | 3/2007 |
| JP | 2007104872 | A | 4/2007 |
| JP | 2007225625 | A | 9/2007 |
| JP | 2010-146047 | A | 7/2010 |
| JP | 2010245532 | A | 10/2010 |
| JP | 2011-055634 | A | 3/2011 |
| JP | 2011-249790 | A | 12/2011 |
| JP | 2012-60714 | A | 3/2012 |
| JP | 2012511299 | A | 5/2012 |
| JP | 2012178535 | A | 9/2012 |
| JP | 2015-233386 | A | 12/2015 |
| KR | 20010044490 | A | 6/2001 |
| KR | 20030050390 | A | 6/2003 |
| KR | 20040086088 | A | 10/2004 |
| KR | 20060060825 | A | 6/2006 |
| KR | 20070036528 | A | 4/2007 |
| KR | 100725755 | B1 | 5/2007 |
| KR | 20080092747 | A | 10/2008 |
| KR | 100912892 | B1 | 8/2009 |
| NL | 1011483 | C2 | 9/2000 |
| NO | 2006048688 | A1 | 5/2006 |
| NO | 2006117551 | A2 | 11/2006 |
| TW | 200913291 | A | 3/2009 |
| WO | 8202134 | A1 | 6/1982 |
| WO | 1984003402 | A1 | 8/1984 |
| WO | 1988004801 | A1 | 6/1988 |
| WO | 9003680 | A1 | 4/1990 |
| WO | 1992007418 | A1 | 4/1992 |
| WO | 1993013587 | A1 | 7/1993 |
| WO | 95/25374 | A1 | 9/1995 |
| WO | 95/34121 | A1 | 12/1995 |
| WO | 1996007130 | A1 | 3/1996 |
| WO | 1996013093 | A1 | 5/1996 |
| WO | 1998023021 | A2 | 5/1998 |
| WO | 1999028801 | A1 | 6/1999 |
| WO | 00/00839 | A1 | 1/2000 |
| WO | 00/21178 | A1 | 4/2000 |
| WO | 0042689 | A1 | 7/2000 |
| WO | 0077522 | A1 | 12/2000 |
| WO | 01/13502 | A1 | 2/2001 |
| WO | 01047095 | A2 | 6/2001 |
| WO | 02/17469 | A1 | 2/2002 |
| WO | 0231517 | | 4/2002 |
| WO | 02056126 | A1 | 7/2002 |
| WO | 2002073785 | A1 | 9/2002 |
| WO | 02078164 | A1 | 10/2002 |
| WO | 02093655 | A1 | 11/2002 |
| WO | 03012569 | A1 | 2/2003 |
| WO | 03/026114 | A2 | 3/2003 |
| WO | 2003036688 | A2 | 5/2003 |
| WO | 2003050938 | A2 | 6/2003 |

(56) References Cited

FOREIGN PATENT DOCUMENTS

WO 2003071655 A1 8/2003
WO 03084041 A1 10/2003
WO 2003098703 11/2003
WO 2004001942 A1 12/2003
WO 2004006342 A1 1/2004
WO 2004008619 A2 1/2004
WO 2004023278 A2 3/2004
WO 2004053993 A1 6/2004
WO 2004090993 A2 10/2004
WO 2004098261 A2 11/2004
WO 2004100344 A2 11/2004
WO 2004100348 A1 11/2004
WO 2004107543 A2 12/2004
WO 2005015584 A2 2/2005
WO 2005027300 A1 3/2005
WO 2005036725 A1 4/2005
WO 2005053189 A1 6/2005
WO 2005069096 A1 7/2005
WO 2005076444 A1 8/2005
WO 2005076445 A1 8/2005
WO 2005089030 A1 9/2005
WO 2005112551 A2 12/2005
WO 2005119278 A1 12/2005
WO 2005119609 A2 12/2005
WO 2005124498 A1 12/2005
WO 2006002380 A2 1/2006
WO 2006005125 A1 1/2006
WO 2006007198 A1 1/2006
WO 2006011071 A2 2/2006
WO 2006011359 A1 2/2006
WO 2006013600 A2 2/2006
WO 2006033143 A1 3/2006
WO 2006045016 A2 4/2006
WO 2006048689 A2 5/2006
WO 2006/074561 A1 7/2006
WO 2006071436 A2 7/2006
WO 2006078685 A2 7/2006
WO 2006079503 A2 8/2006
WO 2006089778 A2 8/2006
WO 2006110613 A2 10/2006
WO 2006/125664 A1 11/2006
WO 2006130520 A2 12/2006
WO 2006137948 A2 12/2006
WO 2007006564 A2 1/2007
WO 2007007360 A2 1/2007
WO 2007010326 A1 1/2007
WO 2007/020419 A1 2/2007
WO 2007048421 A2 5/2007
WO 2007072517 A1 6/2007
WO 2007073951 A1 7/2007
WO 2007080429 A2 7/2007
WO 2007084196 A2 7/2007
WO 2007090476 A2 8/2007
WO 2006124130 A9 10/2007
WO 2007113358 A1 10/2007
WO 2007124518 A1 11/2007
WO 2007129808 A1 11/2007
WO 2007142693 A2 12/2007
WO 2008008528 A2 1/2008
WO 2008026207 A2 3/2008
WO 2008/046370 A1 4/2008
WO 2008077473 A2 7/2008
WO 2008069926 A3 8/2008
WO 2008097591 A2 8/2008
WO 2008119034 A1 10/2008
WO 2008121266 A2 10/2008
WO 2008125915 A2 10/2008
WO 2008132551 A2 11/2008
WO 2008132553 A2 11/2008
WO 2008142480 A2 11/2008
WO 2009003680 A1 1/2009
WO 2009006879 A2 1/2009
WO 2009007782 A2 1/2009
WO 2009011780 A2 1/2009
WO 2009020917 A2 2/2009
WO 2009/026602 A1 3/2009
WO 2009046533 A1 4/2009
WO 2009051221 A1 4/2009
WO 2009051222 A1 4/2009
WO 2009051853 A1 4/2009
WO 2009051854 A1 4/2009
WO 2009051870 A1 4/2009
WO 2009055474 A1 4/2009
WO 2009/059877 A1 5/2009
WO 2009056957 A2 5/2009
WO 2009059028 A2 5/2009
WO 2009064683 A2 5/2009
WO 2009/072075 A2 6/2009
WO 2009/073867 A1 6/2009
WO 2009072076 A2 6/2009
WO 2009072077 A1 6/2009
WO 2009073868 A1 6/2009
WO 2009073995 A1 6/2009
WO 2009075985 A2 6/2009
WO 2009098729 A1 8/2009
WO 2009114341 A2 9/2009
WO 2009118682 A2 10/2009
WO 2009118683 A2 10/2009
WO 2009136358 A1 11/2009
WO 2009140539 A2 11/2009
WO 2009140543 A2 11/2009
WO 2009140551 A2 11/2009
WO 2009155392 A1 12/2009
WO 2010/002960 A1 1/2010
WO 2010/003941 A2 1/2010
WO 2009/140536 A3 2/2010
WO 2009/140551 A3 2/2010
WO 2010014116 A1 2/2010
WO 2010020385 A2 2/2010
WO 2010/042124 A1 4/2010
WO 2010037393 A1 4/2010
WO 2010056777 A1 5/2010
WO 2010/071855 A2 6/2010
WO 2010062410 A1 6/2010
WO 2010062662 A2 6/2010
WO 2010065043 A1 6/2010
WO 2010065388 A1 6/2010
WO 2010072717 A1 7/2010
WO 2010080672 A2 7/2010
WO 2010091025 A2 8/2010
WO 2010094012 A1 8/2010
WO 2010118503 A1 10/2010
WO 2010120315 A1 10/2010
WO 2010/132369 A1 11/2010
WO 2010134057 A1 11/2010
WO 20100134057 A1 11/2010
WO 2011005339 A1 1/2011
WO 2011011711 A2 1/2011
WO 2011014275 A1 2/2011
WO 2011017721 A1 2/2011
WO 2011019936 A1 2/2011
WO 2011023732 A2 3/2011
WO 2011028456 A2 3/2011
WO 2011028457 A2 3/2011
WO 2011044641 A1 4/2011
WO 2011049985 A1 4/2011
WO 2011059067 A1 5/2011
WO 2011074025 A1 6/2011
WO 2011076707 A2 6/2011
WO 2011085259 A2 7/2011
WO 2011089607 A1 7/2011
WO 2011109746 A2 9/2011
WO 2011119587 A2 9/2011
WO 2011133843 A2 10/2011
WO 2011133928 A2 10/2011
WO 2011151672 A1 12/2011
WO 2012024538 A3 5/2012
WO 2012100263 A2 7/2012
WO 2013015921 A1 1/2013
WO 2013019899 A2 2/2013
WO 2013064828 A1 5/2013
WO 2013130563 A1 9/2013

(56) References Cited

FOREIGN PATENT DOCUMENTS

WO 2014143021 A1 9/2014
WO 2017/125375 A1 7/2017

OTHER PUBLICATIONS

Jan. 18, 2024—Chinese Notice of Allowance—CN App. No. 202010044554.7.
Jan. 30, 2024—CN Office Action—CN 202110858752.1.
Summons to Oral Proceedings Pursuant to Rule 115(1) EPC, dated Feb. 26, 2024 regarding EP Patent No. 2557650.
Jul. 7, 2023—European Search Report—EP App. No. 22191698.4.
Subudhi et al., "A Comparative Study on Maximum Power Point Tracking Techniques for Photovoltaic Power Systems," IEEE Transactions on Sustainable Energy, vol. 4, No. 1, Jan. 2013.
QT Technical Application Papers, "ABB Circuit Breakers for Direct current Applications", Abb Sace S.p.A., An ABB Group Company, L.V. Breakers, Via Baioni, 35, 24123 Bergamo-Italy, Tel .: +39 035.395.111 - Telefax: +39 035.395.306-433, Sep. 2007.
Woyte, et al., "Mains Monitoring and Protection in a European Context", 17th European Photovoltaic Solar Energy Conference and Exhibition, Munich, Germany, Oct. 22-26, 2001, Achim, Woyte, et al., pp. 1-4.
"Implementation and testing of Anti-Islanding Algorithms for IEEE 929-2000 Compliance of Single Phase Photovoltaic Inverters", Raymond M. Hudson, Photovoltaic Specialists Conference, 2002. Conference Record of the Twenty-Ninth EEE, May 19-24, 2002.
Fairchild Semiconductor, Application Note 9016, IGBT Basics 1, by K.S. Oh Feb. 1, 2001.
"Disconnect Switches in Photovoltaic Applications", ABB, Inc., Low Voltage Control Products & Systems, 1206 Hatton Road, Wichita Falls, TX 86302, Phone 888-385-1221, 940-397-7000, Fax: 940-397-7085, 1SXU301197B0201, Nov. 2009.
Walker, "A DC Circuit Breaker for an Electric Vehicle Battery Pack", Australasian Universities Power Engineering Conference and IEAust Electric Energy Conference, Sep. 26-29, 1999.
Combined Search and Examination Report for GB1018872.0 dated Apr. 15, 2011, 2 pages.
International Search Report and Opinion of International Patent Application PCT/2009/051221, dated Oct. 19, 2009.
International Search Report and Opinion of International Patent Application PCT/2009/051222, dated Oct. 7, 2009.
Communication in EP07874025.5 dated Aug. 17, 2011.
IPRP for PCT/IB2008/055095 dated Jun. 8, 2010, with Written Opinion.
ISR for PCT/IB2008/055095 dated Apr. 30, 2009.
ISR for PCT/IL07/01064 dated Mar. 25, 2008.
IPRP for PCT/IB2007/004584 dated Jun. 10, 2009, with Written Opinion.
IPRP for PCT/IB2007/004591 dated Jul. 13, 2010, with Written Opinion.
IPRP for PCT/IB2007/004643 dated Jun. 10, 2009, with Written Opinion.
Written Opinion for PCT/IB2008/055092 submitted with IPRP dated Jun. 8, 2010.
IPRP for PCT/US2008/085754 dated Jun. 8, 2010, with Written Opinion dated Jan. 21, 2009.
IPRP for PCT/US2008/085755 dated Jun. 8, 2010, with Written Opinion dated Jan. 20, 2009.
IPRP for PCT/IB2009/051221 dated Sep. 28, 2010, with Written Opinion.
IPRP for PCT/IB2009/051222 dated Sep. 28, 2010, with Written Opinion.
IPRP for PCT/IB2009/051831 dated Nov. 9, 2010, with Written Opinion.
IPRP for PCT/US2008/085736 dated Jun. 7, 2011, with Written Opinion.
IPRP for PCT/IB2010/052287 dated Nov. 22, 2011, with Written Opinion.
ISR for PCT/IB2010/052413 dated Sep. 7, 2010.
UK Intellectual Property Office, Application No. GB1109618.7, Patents Act 1977, Examination Report Under Section 18(3), Sep. 16, 2011.
UK Intellectual Property Office, Patents Act 1977: Patents Rules Notification of Grant: Patent Serial No. GB2480015, Nov. 29, 2011.
Walker, et al. "PV String Per-Module Maximum Power Point Enabling Converters", School of Information Technology and Electrical Engineering The University of Queensland, Sep. 28, 2003.
Walker, "Cascaded DC-DC Converter Connection of Photovoltaic Modules", 33rd Annual IEEE Power Electronics Specialists Conference. PESC 2002. Conference Proceedings. CAIRNS, Queensland, Australia, Jun. 23-27, 2002; [Annual Power Electronics Specialists Conference], New York, NY: IEEE US, vol. 1, Jun. 23, 2002, pp. 24-29, XP010596060 ISBN: 978-0-7803-7262-7, figure 1.
Baggio, "Quasi-ZVS Activity Auxiliary Commutation Circuit for Two Switches Forward Converter", 32nd Annual IEEE Power Electronics Specialists Conference. PESC 2001. Conference Proceedings. Vancouver, Canada, Jun. 17-21, 2001; [Annual Power Electronics Specialists Conference] New York, Ny: IEEE, US.
Ilic, "Interleaved Zero-Current-Transition Buck Converter", IEEE Transactions on Industry Applications, IEEE Service Center, Piscataway, NJ, US, vol. 43, No. 6, Nov. 1, 2007, pp. 1619-1627, XP011197477 ISSN: 0093-9994, pp. 1619-1922.
Lee: "Novel Zero-Voltage-Transition and Zero-Current-Transition Pulse-Width-Modulation Converters", Power Electronics Specialists Conference, 1997, PESC '97, Record, 28th Annual IEEE St. Louis, Mo, USA, Jun. 22-27, 1997, New York, NY, USA IEEE, US, vol. 1, Jun. 22, 1997, pp. 233-239, XP010241553, ISBN: 978-0-7803-3840-1 pp. 233-236.
Sakamoto, "Switched Snubber for High-Frequency Switching Converters", Electronics & Communications in Japan, Part 1—Communications, Wiley, Hoboken, NJ, US, vol. 76, No. 2, Feb. 1, 1993, pp. 30-38, XP000403018 ISSN: 8756-6621, pp. 30-35.
Duarte, "A Family of ZVX-PWM Active-Clamping DC-to-DC Converters: Synthesis, Analysis and Experimentation", Telecommunications Energy Conference, 1995, INTELEC '95, 17th International The Hague, Netherlands, Oct. 29-Nov. 1, 1995, New York, NY, US, IEEE, US, Oct. 29, 1995, pp. 502-509, XP010161283 ISBN: 978-0-7803-2750-4 p. 503-504.
IPRP for PCT/IL2007/001064 dated Mar. 17, 2009, with Written Opinion dated Mar. 25, 2008.
IPRP for PCT/IB2007/004586 dated Jun. 10, 2009, with Written Opinion.
Gao, et al., "Parallel-Connected Solar PV System to Address Partial and Rapidly Fluctuating Shadow Conditions", IEEE Transactions on Industrial Electronics, vol. 56, No. 5, May 2009, pp. 1548-1556.
IPRP PCT/IB2007/004610—date of issue Jun. 10, 2009.
Extended European Search Report—EP12176089.6—Mailing date: Nov. 8, 2012.
Gwon-Jong Yu et al: "Maximum power point tracking with temperature compensation of photovoltaic for air conditioning system with fuzzy controller", May 13, 1996; May 13, 1996-May 17, 1996, May 13, 1996 (May 13, 1996), pp. 1429-1432, XP010208423.
Extended European Search Report—EP12177067.1—Mailing Date: Dec. 7, 2012.
GB Combined Search and Examination Report—GB1200423.0—Mailing date: Apr. 30, 2012.
GB Combined Search and Examination Report—GB1201499.9—Mailing date: May 28, 2012.
GB Combined Search and Examination Report—GB1201506.1—Mailing date: May 22, 2012.
"Study of Energy Storage Capacitor Reduction for Single Phase PWM Rectifier", Ruxi Wang et al., Virginia Polytechnic Institute and State University, Feb. 2009.
"Multilevel Inverters: A Survey of Topologies, Controls, and Applications", Jose Rodriguez et al., IEEE Transactions On Industrial Electronics, vol. 49, No. 4, Aug. 2002.
Extended European Search Report—EP 08878650.4—Mailing date: Mar. 28, 2013.
Satcon Solstice—Satcon Solstice 100 KW System Solution Sheet—2010.

(56) References Cited

OTHER PUBLICATIONS

John Xue, "PV Module Series String Balancing Converters", University of Queensland—School of Information Technology & Electrical Engineering, Nov. 6, 2002.

Robert W. Erickson, "Future of Power Electronics for Photovoltaics", IEEE Applied Power Electronics Conference, Feb. 2009.

Dec. 1, 20232—Japanese Office Action—JP App. No. 2020-004452.

GB Combined Search and Examination Report—GB1203763.6—Mailing date: Jun. 25, 2012.

Mohammad Reza Amini et al., "Quasi Resonant DC Link Inverter with a Simple Auxiliary Circuit", Journal of Power Electronics, vol. 11, No. 1, Jan. 2011.

Khairy Fathy et al., "A Novel Quasi-Resonant Snubber-Assisted ZCS-PWM DC-DC Converter with High Frequency Link", Journal of Power Electronics, vol. 7, No. 2, Apr. 2007.

May 22, 1998—Cheng K.W.E., "New Generation of Switched Capacitor Converters", Department of Electrical Engineering, The Hong Kong Polytechnic University, Hung Hom, Hong Kong, Power Electronics Conference, PESC 98.

1999—Per Karlsson, "Quasi Resonant DC Link Converters—Analysis and Design for a Battery Charger Application", Universitetstryckeriet, Lund University, 1999, ISBN 91-88934-14-4; Added to Lund University Publications on Jun. 4, 2012.

Hsiao Sung-Hsin et al., "ZCS Switched-Capacitor Bidirectional Converters with Secondary Output Power Amplifier for Biomedical Applications", Power Electronics Conference (IPEC) Jun. 21, 2010.

Nov. 27-30, 2007—Yuang-Shung Lee et al., "A Novel QR ZCS Switched-Capacitor Bidirectional Converter", IEEE, 2007.

Antti Tolvanen et al., "Seminar on Solar Simulation Standards and Measurement Principles", May 9, 2006 Hawaii.

J.A. Eikelboom and M.J. Jansen, "Characterisation of PV Modules of New Generations—Results of tests and simulations", Jun. 2000.

Yeong-Chau Kuo et al., "Novel Maximum-Power-Point-Tracking Controller for Photovoltaic Energy Conversion System", IEEE Transactions On Industrial Electronics, vol. 48, No. 3, Jun. 2001.

C. Liu et al., "Advanced Algorithm for Mppt Control of Photovoltaic Systems", Canadian Solar Buildings Conference, Montreal, Aug. 20-24, 2004.

May 2, 19982 - Chihchiang Hua and Chihming Shen, "Study of Maximum Power Tracking Techniques and Control of DC/DC Converters for Photovoltaic Power System", IEEE.

Tore Skjellnes et al., "Load sharing for parallel inverters without communication", Nordic Workshop in Power and Industrial Electronics, Aug. 12-14, 2002.

Jun. 23, 2000—Giorgio Spiazzi at el., "A New Family of Zero-Current-Switching Variable Frequency dc-dc Converters", IEEE.

Nayar, C.V., M. Ashari and W.W.L Keerthiphala, "A Grid Interactive Photovoltaic Uninterruptible Power Supply System Using Battery Storage and a Back up Diesel Generator", IEEE Transactions on Energy Conversion, vol. 15, No. 3, Sep. 2000, p. 348?353.

Ph. Strauss et al., "AC coupled PV Hybrid systems and Micro Grids-state of the art and future trends", 3rd World Conference on Photovoltaic Energy Conversion, Osaka, Japan May 11-18, 2003.

Jul. 16-20, 2000—Nayar, C.V., abstract, Power Engineering Society Summer Meeting, 2000. IEEE, 2000, pp. 1280-1282 vol. 2.

Mar. 15, 2004—D. C. Martins et al., "Analysis of Utility Interactive Photovoltaic Generation System using a Single Power Static Inverter", Asian J. Energy Environ., vol. 5, Issue 2, (2004), pp. 115-137.

Rafael C. Beltrame et al., "Decentralized Multi String PV System With Integrated ZVT Cell", Congresso Brasileiro de Automática / 12 a 16-setembro-2010, Bonito-MS.

Sergio Busquets-Monge et al., "Multilevel Diode-clamped Converter for Photovoltaic Generators With Independent Voltage Control of Each Solar Array", IEEE Transactions On Industrial Electronics, vol. 55, No. 7, Jul. 2008.

Soeren Baekhoej Kjaer et al., "A Review of Single-Phase Grid-Connected Inverters for Photovoltaic Modules", IEEE Transactions On Industry Applications, vol. 41, No. 5, Sep./Oct. 2005.

Office Action—JP 2011-539491—Mailing date: Mar. 26, 2013.

Supplementary European Search Report—EP08857456—Mailing Date Dec. 6, 2013.

Extended European Search Report—EP14151651.8—Mailing date: Feb. 25, 2014.

Yomori H et al.: "Three-phase bridge power block module type auxiliary resonant AC link snubber-assisted soft switching inverter for distributed AC power supply", INTELEC 2003. 25th. International Telecommunications Energy Conference. Yokohama, Japan, Oct. 19-23, 2003; Tokyo, IEICE, Jp, Oct. 23, 2003 (Oct. 23, 2023), pp. 650-656, XP031895550, ISBN: 978-4-88552-196-6.

Yuqing Tang: "High Power Inverter EMI characterization and Improvement Using Auxiliary Resonant Snubber Inverter", Dec. 17, 1998 (Dec. 17, 1998), XP055055241, Blacksburg, Virginia Retrieved from the Internet: URL:http: ijscholar.lib.vt.edu/theses/available/etd-012299-165108/unrestricted/THESIS. PDF, [retrieved on Mar. 5, 2013].

Yoshida M et al.: "Actual efficiency and electromagnetic noises evaluations of a single inductor resonant AC link snubber-assisted three-phase soft-switching inverter", INTELEC 2003. 25TH. International Telecommunications Energy Conference. Yokohama, Japan, Oct. 19-23, 2003; Tokyo, IEICE, JP, Oct. 23, 2003 (Oct. 23, 2003), pp. 721-726, XP031895560, ISBN: 978-4-88552-196-6.

Third party observation—EP07874025.5—Mailing date: Aug. 6, 2011.

Extended European Search Report—EP 13152967.9—Mailing date: Aug. 28, 2014.

Extended European Search Report—EP 14159696—Mailing Date: Jun. 20, 2014.

Gow Ja A et al.: "A Modular DC-DC Converter and Maximum Power Tracking Controller For Medium to Large Scale Photovoltaic Generating Plant"8<SUP>th </SUP> European Conference on Power Electronics and Applications. ausaane, CH, Sep. 7-9, 1999, EPE. European Conference on Power Electronics and Applications, Brussls: EPE Association, BE, vol. Conf. 8, Sep. 7, 1999, pp. 1-8, XP000883026.

Chihchiang Hua et al.: "Comparative Study of Peak Power Tracking Techniques for Solar Storage System" Applied Power Electronics Conference and Exposition, 1998. APEC '98. Conference Proceedings 1998, Thirteenth Annual Anaheim, CA USA Feb. 15-19, 1998, New York, NY, USA, IEEE, US, Feb. 15, 1998, pp. 679-685, XP010263666.

Matsuo H et al.: "Novel Solar Cell Power Supply System Using the Multiple-input DC-DC Converter" 20<SUP>th</ SUP> International telecommunications Energy Conference. Intelec '98 San Francisco, CA, Oct. 4-8, 1998, Intelec International Telecommunications Energy Conference, New York, NY: IEEE, US, Oct. 4, 1998, pp. 797-802, XP000896384.

Chihchiang Hua et al.: "DSP-based controller application in battery storage of photovoltaic system" Industrial Electronics, Control, and Instrumentation, 1996, Proceedings of the 1996 IEEE IECON 22<SUP>nd</SUP> International Conference on Taipei, Taiwan Aug. 5-10, 1996, New York, NY, USA, IEEE, US, Aug. 5, 1996, pp. 1705-1710, XP010203239.

Hua C et al.: "Implementation of a DSP-Controlled Photovoltaic System with Peak Power Tracking"IEEE Transactions on industrial Electronics, IEEE, Inc. New York, US, vol. 45, No. 1, Feb. 1, 1998, pp. 99-107, XP000735209.

I. Weiss et al.: "A new PV system technology-the development of a magnetic power transmission from the PV module to the power bus" 16th European Photovoltaic Solar Energy Conference, vol. III, May 1-5, 2000, pp. 2096-2099, XP002193468 Glasgow, UK cited in the application.

Basso, Tim, "IEEE Standard for Interconnecting Distributed Resources With the Electric Power System," IEEE PES Meeting, Jun. 9, 2004.

Feb. 11, 2003—Boostbuck.com, "The Four Boostbuck Topologies," located at http://www.boostbuck.com/TheFourTopologies.html.

Apr. 2002—Gautam, Nalin K et al., "An Efficient Algorithm to Simulate the Electrical Performance of Solar Photovoltaic Arrays," Energy, vol. 27, No. 4, pp. 347-361, 2002.

Nordmann, T et al., "Performance of PV Systems Under Real Conditions," European Workshop on Life Cycle Analysis and Recycling of Solar Modules, The "Waste" Challenge, Brussels, Belgium, Mar. 18-19, 2004.

(56) References Cited

OTHER PUBLICATIONS

Wiles, John, "Photovoltaic Power Systems and the National Electrical Code: Suggested Practices," Sandia National Laboratories, document No. SAND2001-0674, Mar. 2001.
Hewes, J. "Relays," located at http://web.archive.org/web/20030816010159/www.kpsec.freeuk.com/components/relay. htm, Aug. 16, 2003.
Jan. 1, 1993.—Definition of "remove" from Webster's Third New International Dictionary, Unabridged, 1993.
Jan. 1, 1993.—Definition of "removable" from Webster's Third New International Dictionary, Unabridged, 1993.
Advanced Energy Group, "The Basics of Solar Power Systems," located at http://web.archive.org/web/20010331044156/http://www.solar4power.com/solar-power-basics.html, Mar. 31, 2001.
International Patent Application No. PCT/AU2005/001017, International Search Report and Written Opinion, Aug. 18, 2005.
Baek, Ju-Won et al., "High Boost Converter using Voltage Multiplier," 2005 IEEE Conference, IECON 05, pp. 567-572, Nov. 2005.
Wikimedia Foundation, Inc., "Electric Power Transmission," located at http://web.archive.org/web/20041210095723/en.wikipedia.org/wiki/Electric-power-transmission, Nov. 17, 2004.
Jacobsen, K.S., "Synchronized Discrete Multi-Tone (SDMT) Modulation for Cable Modems: Making the Most of the Scarce Reverse Channel Bandwidth," Conference Proceedings of Wescon/97, pp. 374-380, Nov. 4, 1997.
Loyola, L. et al., "A Multi-Channel Infrastructure based on DCF Access Mechanism for Wireless LAN Mesh Networks Compliant with IEEE 802.11," 2005 Asia-Pacific Conference on Communications, pp. 497-501, Oct. 5, 2005.
Oct. 5, 2023—European Search Report—EP App. No. 23180721.5.
Dec. 3, 20201 - CN Invalidation Decision - CN 200780045351.2.
Dec. 3, 20201 - CN Invalidation Decision - CN 201210253614.1.
Mar. 3, 2021 - EP Office Action - EP 17188365.5.
May 7, 2021 - Chinese Office Action - CN 20181025083.8.
Jun. 2, 20211 - Japanese Office Action - JP 2017-158887.
Zhao Junjian & al .: "Analysis of high efficiency DC/DC converter processing partial input/output power", 14th Workshop on Control and Modeling for Power Electronics, Jun. 23, 2013 (2013-06-23), DOI: 10.1109/ COMPEL.2013.6626440.
Apr. 14, 2021—European Summons to Oral Proceedings—EP 17724234.4.
PV Balancers: Concept, Architectures, and Realization—Huimmin Zhou—IEEE Transactions on Power Electronics vol. 30 No. 7—Jul. 7, 2015.
Nov. 17, 2021.—CN Office Action—CN App No. 201810025083.8.
Dec. 16, 2021—EP Office Action—EP App. No. 19178054.3.
Noguchi, Short-Current Pulse-Based Maximum-Power-Point Tracking Method for Multiple Photovoltaic-and-Converter Module System, IECON, Feb. 2002.
Siri, Maximum Power Tracking in Parallel Connected Converters, IEEE, Jul. 1993.
Solero, Performance of A 10 kW Power Electronic Interface For Combined Wind/PV Isolated Generating Systems, PESC, 1996.
Wu, An Improved Dynamic Power Distribution Control Scheme for Pwm Controlled Converter Modules, IEEE, 1992.
Jun. 3, 20220 - Extended EP Search Report - EP App. No .: 22150308.9.
Jun. 1, 2024—Chinese Office Action—CN App. No. 202110496807.9.
Jan. 1, 2005; Linear Technology Specification Sheet, LTC3780—"High Efficiency Synchronous, 4-Switch Buck-Boost Controller".
Dec. 19, 2005; Edelmoser, K.H et al.; High Efficiency DC-to-AC Power Inverter with Special DC Interface; Professional Paper, ISSN 0005-1144, Automatika 46 (2005) 3-4, 143-148, 6 pages.
Jan. 29, 2019—European Search Report for EP App No. 18199117.5.
Jul. 12, 2019—European Search Report—EP 19170538.3.
Sep. 4, 2019—Extended European Search Report—EP 19181247.8.
Aug. 6, 2019—Notice of Opposition of European Patent 2232663—Fronius International GmbH.
Sep. 5, 2019 - Notice of Opposition of European Patent 2549635 - Huawei Technologies Co.
Sep. 5, 2019 - Notice of Opposition of European Patent 2549635 - Fronius International GmbH.
Solide Arbeit, Heinz Neuenstein, Dec. 2007.
Spitzenwirkungsgrad mit drei Spitzen, Heinz Neuenstien and Andreas Schlumberger, Jan. 2007.
Technical Information, Temperature Derating for Sunny Boy, Sunny Mini Central, Sunny Tripower, Aug. 9, 2019.
Prinout from Energy Matters online Forum, Jul. 2011.
Wayback Machine Query for Energy Matters Online Forum Jul. 2011.
Nov. 2, 20197 - European Search Report - 3567562.
Baocheng, DC to AC Inverter with Improved One Cycle Control, 2003.
Brekken, Utility-Connected Power Converter for Maximizing Power Transfer From a Photovoltaic Source While Drawing Ripple-Free Current, 2002.
Cramer, Modulorientierter Stromrichter Geht In Serienfertigung , SPVSE, 1994.
Cramer, Modulorientierter Stromrichter, Juelich, Dec. 31, 1995.
Cramer, String-Wechselrichter Machen Solarstrom Billiger, Elektronik, Sep. 1996.
Dehbonei, A Combined Voltage Controlled and Current Controlled "Dual Converter" for a Weak Grid Connected Photovoltaic System with Battery Energy Storage, 2002.
Engler, Begleitende Untersuchungen zur Entwicklung eines Multi-String-Wechselrichters, SPVSE, Mar. 2002.
Geipel, Untersuchungen zur Entwicklung modulorientierter Stromrichter Modulorientierter Stromrichter für hetzgekoppelte Photovoltaik-Anlagen, SPVSE, 1995.
Hoor, DSP-Based Stable Control Loops Design for a Single Stage Inverter, 2006.
Soda, Battery Charging Characteristics in Small Scaled Photovoltaic System Using Resonant Dc-Dc Converter With Electric Isolation, 1990.
Jones, Communication Over Aircraft Power lines, Dec. 2006/ Jan. 2007.
Kalaivani, A Novel Control Strategy for the Boost DC - AC Inverter, 2006.
Lee, Powering The Dream, IET Computing & Control Engineering, Dec. 2006/ Jan. 2007.
Lee, A Novel Topology for Photovoltaic Series Connected DC/DC Converter with High Efficiency Under Wide Load Range, Jun. 2007.
Lin, Llc Dc/Dc Resonant Converter with PLL Control Scheme, 2007.
Niebauer, Solarenergie Optimal Nutzen, Stromversorgung, Elektronik, 1996.
Rodrigues, Experimental Study of Switched Modular Series Connected DC-DC Converters, 2001.
Sanchis, Buck-Boost DC-AC Inverter: Proposal for a New Control Strategy, 2004.
Sen, A New Dc-To-Ac Inverter With Dynamic Robust Performance, 1998.
Shaojun, Research on a Novel Inverter Based on DC/DC Converter Topology, 2003.
Biri, Sequentially Controlled Distributed Solar-Array Power System with Maximum Power Tracking, 2004.
Walko, Poised For Power, IEE Power Engineer, February/ Mar. 2005.
White, Electrical Isolation Requirements In Power-Over-Ethernet (POE) Power Sourcing Equipment (PSE), 2006.
Yu, Power Conversion and Control Methods for Renewable Energy Sources, May 2005.
Zacharias, Modularisierung in der PV-Systemtechnik -Schnittstellen zur Standardisierung der Komponenten, Institut für Solare Energieversorgungstechnik (ISET), 1996.
Dec. 2, 20194 - CN Office Action - CN Application 201610946835.5.
Jan. 3, 20200 - EP Office Action - EP 18204177.2.
Feb. 3, 2020 - Chinese Office Action - 201710749388.9.
Mar. 2, 20204 - Non-Final Rejection - U.S. Appl. No. 15/593,761.
Apr. 2, 20200 - European Search Report - EP 20151729.9.

(56) References Cited

OTHER PUBLICATIONS

Apr. 2, 20203 - European Search Report - EP 19217486.0.
May 12, 2020 - Extended European Search Report - EP 20161381.7.
Jul. 8, 2020 - CN Office Action - CN 201710362679.2.
Sep. 1, 20207 - Extended European Search Report - EP Application 20176744.9.
Oct. 1, 20202 - CN Office Action - CN 201610946835.5.
Nov. 12, 2020 - Preliminary Opinion by EPO - EP 12188944.8.
International Search Report for corresponding PCT/GB2004/001965, completed Aug. 16, 2004 by A. Roider.
Mar. 5-9, 1995 - Naik et al., A Novel Grid Interface for Photovoltaic, Wind-Electric, and Fuel-Cell Systems With a Controllable Power Factor or Operation, IEEE, 1995, pp. 995-998.
Petkanchin, Processes following changes of phase angle between current and voltage in electric circuits, Aug. 1999, Power Engineering Review, IEEE vol. 19, Issue 8, pp. 59-60.
Mumtaz, Asim, et al., "Grid Connected PV Inverter Using a Commercially Available Power Ic," Pv in Europe Conference, Oct. 2002, 3 pages, Rome, Italy.
Koutroulis, Eftichios, et al., "Development of a Microcontroller-Based, Photovoltaic Maximum Power Point Tracking Control System," IEEE Transactions on Power Electronics, Jan. 2001, pp. 46-54, vol. 16, No. 1, IEEE.
European Search Report - EP App. 14159457.2 - mailed Jun. 12, 2015.
European Search Report and Written Opinion - EP Appl. 12150819.6 - dated Jul. 6, 2015.
Alonso, O et al. "Cascaded H-Bridge Multilevel Converter for Grid Connected Photovoltaic Generators With Independent Maximum Power Point Tracking of Each Solar Array." IEEE 34th Annual Power Electronics Specialists Conference. Vol. 2, Jun. 15, 2003.
Alonso, et al., "Cascaded H-Bridge Multilevel Converter for Grid Connected Photovoltaic Generators with Independent Maximum Power Point Tracking of Each Solar Array", 2003 IEEE 34th, Annual Power Electronics Specialists Conference, Acapulco, Mexico, Jun. 15-19, 2003, pp. 731-735, vol. 2.
Chinese Office Action - CN Appl. 201280006369.2 - dated Aug. 4, 2015.
Chinese Office Action - CN Appl. 201210253614.1 - dated Aug. 18, 2015.
Extended European Search Report, EP Application 04753488.8, mailed Apr. 29, 2015.
International Search Report from PCT/US04/16668, form PCT/ISA/220, filing date May 27, 2004.
Office Action U.S. Appl. No. 13/785,857, dated Jun. 6, 2013.
Partial Extended European Search Report, EP Application 04753488.8, mailed Feb. 2, 2015.
The International Search Report (Form PCT /ISA/220) Issued in corresponding international application No. PCT/ JS04/16668, filed May 27, 2004.
International Search Report - PCT/US2004/016668, form PCT/ISA/220 - filing date May 27, 2004 - mailed Jan. 19, 2005.
Written Opinion of the International Searching Authority - PCT/US2004/016668, form PCT/ISA/220 - filing date May 27, 2004 - mailed Jan. 19, 2005.
Extended European Search Report - EP Appl. 04753488.8 - mailed Apr. 29, 2015.
Supplementary Partial European Search Report - EP Appl. 04753488.8 - mailed Feb. 2, 2015.
US Office Action - U.S. Appl. No. 13/785,857 - mailed Jun. 6, 2013.
European Office Action - EP Appl. 09725443.7 - dated Aug. 18, 2015.
Definition of Isomorphism by Merriam-Webster, <http://www.merriaum-webster.com/dictionary/isomorphism, dated Oct. 20, 2015.
Definition of Isomorphic by Merriam-Webster, <http://www.merriam-webster.com/dictionary/isomorphic, dated Oct. 20, 2015.
Chinese Office Action - CN Appl. 201110349734.7 - dated Oct. 13, 2015.
Chinese Office Action - CN Appl. 201210007491.3 - dated Nov. 23, 2015.
European Office Action - EP Appl. 12176089.6 - dated Dec. 16, 2015.
Chinese Office Action - CN Appl. 201310035223.7 - dated Dec. 29, 2015.
Chinese Office Action - CN Application 201210334311.2 - dated Jan. 20, 2016.
European Search Report - EP Appl. 13800859.4 - mailed Feb. 15, 2016.
Chinese Office Action - CN App. 201310035221.8 - mailed Mar. 1, 2016.
PCT/2008/058473 International Preliminary Report, 6 pages, Nov. 2, 2009.
International Search Report and Written Opinion, WO 2010080672, dated Aug. 19, 2010.
PCT/US2010/045352 International Search Report and Written Opinion; 12 pages; Oct. 26, 2010.
International Search Report and Written Opinion mailed Feb. 6, 2009,. In counteprart PCT/US2008/008451, 13 pages.
European Search Report: dated Jan. 10, 2013 in corresponding EP application No. 09838022.3, 7 pages.
D. Ton and W. Bower; Summary Report of the DOE High-Tech Inverter Workshop; Jan. 2005.
First Action Interview Pre-Interview Communication from U.S. Appl. No. 13/174,495 mailed Jun. 18, 2014, 7 pgs.
Johnson et al., "Arc-fault detector algorithm evaluation method utilizing prerecorded arcing signatures", Photovoltaic Specialists Conference (PVSC), Jun. 2012.
Aug. 2007. 6 - Philippe Welter, et al. "Electricity at 32 kHz," Photon International, The Photovoltaic Magazine, Http:// www.photon-magazine.com/archiv/articles.aspx?criteria=4&HeftNr=0807&Title=Elec ... printed May 27, 2011).
PCT/US2009/069582 Int. Search Report—dated Aug. 19, 2010.
Chinese Office Action—CN Appl. 201210007491.3—mailed Apr. 25, 2016.
CN Office Action—CN Appl. 201310004123.8—dated May 5, 2016.
Law et al., "Design and Analysis of Switched-Capacitor-Based Step-Up Resonant Converters," IEEE Transactions on Circuits and Systems, vol. 52, No. 5, published May 2005.
CN Office Action—CN Appl. 201310066888.4—dated May 30, 2016.
European Search Report—EP Appl. 13152966.1—dated Jul. 21, 2016.
European Search Report—EP Appl. 12183811.4—dated Aug. 4, 2016.
European Notice of Opposition—EP Patent 2374190—dated Jul. 19, 2016.
"Es werde Dunkelheit. Freischaltung von Solarmodulen im Brandfall"—"Let there be Darkness: Quality control of Solar Modules in Case of Fire"; Photon, May 2005, 75-77, ISSN 1430-5348, English translation provided.
Chinese Office Action—CN Appl. 201380029450.7—dated Jul. 28, 2016.
Chinese Office Action—CN Appl. 201310035221.8—dated Aug. 11, 2016.
Zhou, Wilson and Theo Phillips—"Industry's First 4-Switch Buck-Boost Controller Achieves Highest Efficiency Using a Single Inducutor—Design Note 369"—Linear Technology Corporation—www.linear.com—2005.
"Micropower Synchronous Buck-Boost DC/DC Converter"—Linear Technology Corporation—www.linear.com/LTC3440—2001.
Mar. 5-9, 1995—Caricchi, F et al.—20 KW Water-Cooled Prototype of a Buck-Boost Bidirectional DC-DC Converter Topology for Electrical Vehicle Motor Drives—University of Rome—IEEE 1995—pp. 887-892.
Roy, Arunanshu et al.—"Battery Charger using Bicycle"—EE318 Electronic Design Lab Project Report, EE Dept, IIT Bombay, Apr. 2006.
Jun. 20-25, 2004—Viswanathan, K et al.—Dual-Mode Control of Cascade Buck-Boost PFC Converter—35th Annual EEE Power Electronics Specialists Conference—Aachen, Germany, 2004.

(56) References Cited

OTHER PUBLICATIONS

Zhang, Pei et al.—"Hardware Design Experiences in ZebraNet"—Department of Electrical Engineering, Princeton University—SenSys '04, Nov. 3-5, 2004.
"High Efficiency, Synchronous, 4-Switch Buck-Boost Controller"—Linear Technology Corporation—www.linear.com/ LTC3780—2005.
May 19-24, 2002—Chomsuwan, Komkrit et al. "Photovoltaic Grid-Connected Inverter Using Two-Switch Buck-Boost Converter"—Department of Electrical Engineering, King Mongkut's Institute of Technology Ladkrabang, Thailand, National Science and Technology Development Agency, Thailand—IEEE—2002.
Midya, Pallab et al.—"Buck or Boost Tracking Power Converter"—IEEE Power Electronics Letters, vol. 2, No. 4—Dec. 2004.
Chinese Office Action—CN Appl. 201510111948.9—dated Sep. 14, 2016.
Chinese Office Action—CN Appl. 201310066888.4—dated Nov. 2, 2016.
"Power-Switching Converters—the Principle, Simulation and Design of the Switching Power (the Second Edition)", Ang, Oliva, et al., translated by Xu Dehong, et al., China Machine Press, Aug. 2010, earlier publication 2005.
European Notice of Opposition—EP Patent 2092625—mailed Nov. 29, 2016.
Mar. 8, 2003—Vishay Siliconix "Si 7884DP—n-Channel 40-V (D-S) Mosfet" (2003).
Chinese Office Action—CN 201510423458.2—mailed Jan. 3, 2017 (english translation provided).
Chinese Office Action—CN 201410098154.9—mailed Mar. 3, 2017 (english translation provided).
European Search Report—EP Appl. 13150911.9—Apr. 7, 2017.
Howard et al., "Relaxation on a Mesh: a Formalism for Generalized Localization." Proceedings of the IEEE/RSJ International Conference on Intelligent Robots and Systems (IROS 2001). Wailea, Hawaii, Oct. 2001.
Chinese Office Action and Search Report—CN 201510578586.4—mailed Apr. 19, 2017.
Jul. 13, 2017—Chinese Office Action—CN201210007491.3.
Jul. 31, 2014—Huimin Zhou et al.—"PV Balancers: Concept, Architectures, and Realization"—IEEE Transactions on Power Electronics, vol. 30, No. 7, pp. 3479-3487.
Sep. 15, 2012—Huimin Zhou et al.—"PV balancers: Concept, architectures, and realization"—Energy Conversion Congress and Exposition (ECCE), 2012 IEEE, IEEE pp. 3749-3755.
Jul. 17, 2017—International Search Report—PCT/US2017/031571.
Aug. 4, 2017—European Search Report—EP 17165027.
Jul. 19, 2016—Notice of Opposition—EP 2374190—EP App No. 08878650.4.
Sep. 28 2017—European Office Action—EP 08857835.6.
Nov. 2, 2017.—EP Search Report App No. 13157876.7.
Nov. 11, 2017.—EP Search Report—App No. 17171489.2.
Dec. 14, 2017.—EP Search Report App No. 17188362.2.
Dec. 15, 2017.—EP Search Report App No. 17188365.5.
2000; Bascope, G.V.T. Barbi, I; "Generation of Family of Non-isolated DC-DC PWN Converters Using New Three-state Switching Cells"; 2000 IEEE 31st Annual Power Electronics Specialists Conference in Galway, Ireland; vol. 2.
Jan. 2005. 20; Duncan, Joseph, A Global Maximum Power Point Tracking DC-DC Converter, Massachussetts Institute of Technology, Dept. of Electrical Engineering and Computer Science Dissertation; 8 pages.
2005; Edelmoser, K.H et al.; High Efficiency DC-to-AC Power Inverter with Special DC Interface; Professional Paper, ISSN 0005-1144, Automatika 46 (2005) 3-4, 143-148, 6 pages.
2006; Esmaili, Gholamreza; "Application of Advanced Power Electornics in Renewable Energy Sources and Hygrid Generating Systems" Ohio State Univerty, Graduate Program in Electrical and Computer Engineering, Dissertation. 169 pages.
Nov. 13, 2007; Gomez, M; "Consulting in the Solar Power Age," IEEE-CNSV: Consultants' Network of Scilion Valley; 30 pages.
Jul. 25, 1995—Jun. 30, 1998; Kern, G; "SunSine (TM)300: Manufacture of an AC Photovoltaic Module," Final Report, Phases I & II; National Renewable Energy Laboratory, Mar. 1999; NREL-SR-520-26085; 33 pages.
May 1, 2000; Kroposki, H. Thomas and Witt, B & C; "Progress in Photovoltaic Components and Systems," National Renewable Energy Laboratory; NREL-CP-520-27460; 7 pages.
Jan. 22-23, 1998. Oldenkamp, H et al; "AC Modules: Past, Present and Future" Workshop Installing the Solar Solution; Hatfield, UK; 6 pages.
Linear Technology Specification Sheet, LTC3443—"High Current Micropower 600kHz Synchronous Buck-Boost Dc/ Dc Converter"—2004.
Linear Technology Specification Sheet, LTC3780—"High Efficiency Synchronous, 4-Switch Buck-Boost Controller"—2005.
Apr. 22, 2004—MICREL—MIC2182 High Efficiency Synchronous Buck Controller.
Apr. 1972—Methods for Utilizing Maximum Power From a Solar Array—Decker, DK.
2000—Evaluating MPPT converter topologies using a Matlab PV model—Walker, Geoffrey.
Jun. 30, 2008—Wang, Ucilia; Greentechmedia; "National Semi Casts Solarmagic"; www.greentechmedia.com; 3 pages; accessed Oct. 24, 2017.
Sep. 2004; Yuvarajan, S; Dchuan Yu; Shanguang, Xu; "A Novel Power Converter for PHotovoltaic Applications," Journal of Power Sources; vol. 135, No. 1-2, pp. 327-331.
Jun. 1998—Stern M., et al., "Development of a Low-Cost Integrated 20-kW-AC Solar Tracking Subarray for Grid-Connected PV Power System Applications—Final Technical Report"—National Renewable Energy Laboratory; 41 pages.
1997; Verhoeve, C.W.G., et al., "Recent Test Results of AC_Module inverters," Netherlands Energy Research Foundation ECN, 1997; 3 pages.
2004—Nobuyoshi, M et al., "A Controlling Method for Charging Photovoltaic Generation Power Obtained by a MPPT Control Method to Series Connected Ultra-Electric Double Layer Capacitors"—Industry Application Conference, 2004. 39th IAS Annual Meeting. Conference Record of the 2004 IEEE.
Feb. 23-27, 1992.—Miwa, Brett et al., "High Efficiency Power Factor Correction Using Interleaving Techniques"—Applied Power Electronics Conference and Exposition, 1992. APEC '92. Conference Proceedings 1992., Seventh Annual.
Mar. 4-8, 2001 - Andersen Gert, et al., - Aalborg University, Institute of Energy Technology, Denmark - "Currect Programmed Control of a Single Phase Two-Switch Buck-Boost Power Factor Correction Circut" - Applied Power Electronics Conference and Exposition, 2001. APEC 2001. Sixteenth Annual IEEE.
Feb. 2004. 22-26 - Andersen, Gert et al., - "Utilizing the free running Current Programmed Control as a Power Factor Correction Technique for the two switch Buck-Boost converter" - Applied Power Electronic Conference and Exposition, 2004. APEC '04. Nineteenth Annual IEEE.
Mar. 3-7, 1996 - Caricchi F et al., - "Prototype of Innovative Wheel Direct Drive With Water-Cooled Exial-Flux Motor for Electric Vehicle Applications" - Applied Power Electronics Conference and Expositions, 1996. APEC '96. Conference Proceedings 1996., Eleventh Annual IEEE.
Feb. 1998. 15-19 - Caricchi, F et al., - "Study of Bi-Directional Buck-Boost Converter Topologies for Application in Electrical Vehicle Motor Drives" - Applied Power Electronics Conference and Exposition, 1998, APEC '98. Conference Proeedings 1998., Thirteenth Annual IEEE.
Nov. 1990. 27-30 - Ensling, JHR - "Maximum Power Point Tracking: A Cost Saving Necessity in Solar Energy Systems" Industrial Electornics Society, 1990. IECON '90., 16th Annual Conference of IEEE.
Feb. 2004. 22-26 - Gaboriault, Mark et al., - "A High Efficiency, Non-Inverting, Buck-Boost DC-DC Converter" - Applied Power Electronics Conference and Exposition, 2004. APEC '04. Nineteenth Annual IEEE.
Feb. 1998. 15-19 - Hua, et al., - "Comparative Study of Peak Power Tracking Techniques for Solar Storage System" - Applied Power

(56) References Cited

OTHER PUBLICATIONS

Electronics Conference and Exposition, 1998. APEC'98. Conferenced Proceedings 1998., Thirteenth Annual IEEE.
Jun. 20-24, 1993 - Sullivan, et al., "A High-Efficiency Maximum Power Point Tracker for Photovoltaic Arrays in a Solar- Powered Race Vehicle" - University of California, Berkeley, Department of Electrical Engineering and OCmputer Sciences - Power Electronics Specialists Conference, 1993. PESC '93 Record., 24th Annual IEEE.
May 19-24, 2002- Bower et at., - "Certification of Photovoltaic Inverters: The Initial Step Toward PV System Certification" - Photovoltaic Specialists Conferences, 2002. Conference Record of the Twenty-Ninth IEEE.
Jun. 17-21, 2001 - Tse et al., "A Novel Maximum Power Point Tracking Technique for PV Panels" - Power Electronics Specialists Conferences, 2001. PESC. 2001 IEEE 32nd Annual.
May 12-18, 2008 - Cuadras et al., "Smart Interfaces for Low Power Energy Harvesting Systems" - Instrumentation and Measurement Technology Conferences Proceedings, 2008. IMTC 2008. IEEE.
Dec. 1994. 5-9 - Haan, et al., " Test Results of a 130 W Ac Module; a modular solar as power station" - Photovoltaic Energy Conversion 1994. Conference Record of the Twenty Fourth. IEEE Phtovoltaic Specialists Conference - 1994.
2008 Sept. 1-3 - Jung, et al., "Soft Switching Boost Converter for Photovoltaic Power Generation System" - Power Electronics and Motion Control Conference, 2008. EPE-PEMC 2008.
Jun. 3-5, 2008 - Duan, et al., "A Novel High-Efficiency Inverter for Stand Alone and Grid-Connected Systems" - Industrial Electronics and Applications, 2008. ICIEA 2008.
Nov. 7, 2002 - Ertl, et al., "A Novel Multicell DC-AC Converter for Applicaiton in Renewable Energy Systems" - IEEE Transactions on Industrial Electronics (vol. 49, Issue 5, Oct. 2002).
Oct. 2000. 8-12 Hashimoto, et al., "A Novel High Peforamance Utility Interactive Photovoltain Inverter System" - Industry Applications Conference, 2000. Conference Record of the 2000 IEEE.
Feb. 2004. 22-26 - Ho, et al., "An Integrated Inverter with Maximum Power Tracking for Grid-Connected PV Systems" - Applied Power Electronics Conference and Exposition, 2004. APEC '04. Nineteenth Annual IEEE.
Nov. 1997. 14, Hua et al., "Control of DC/DC Converters for Solar Energy System with Maximum Power Tracking" - Industrial Electronics, Control and Instrumentation, 1997. IECON 97. 23rd International Conference on Industrial Electronics, Control and Instrumentation vol. 4 of 4.
2008 Sept. 1-3, Lee et al., "Soft Switching Mutli-Phase Boost Converter for Photovoltaic System" - Power Electronics and Motion Control Conference, 2008. EPE-PEMC 2008.
Jul. 5, 2005, Yao et al., "Tapped-Inductor Buck Converter for High-Step-Down DC-DC Conversion" IEEE Transactions on Power Electronics (vol. 20, Issue 4, Jul. 2005).
1998 Sept. 21-23, Kretschmar, et al., "An AC Converter with a Small DC Link Capacitor for a 15KW Permanent Magnet Synchronous Integral Motor" - Power Electronics and Variable Speed Drives, 1998. Sevent International Converterest (Conf. Publ. No. 456).
May 2, 20005 - Hong Lim, et al., "Simple Maximum Power Point Tracker for Photovoltaic Arrays" - Electronics Letters (vol. 36, Issue 11, May 25, 2000).
Aug. 2004. 14-16, Nishida et al., "A Novel Type of Utility-Interactive Inverter for Phtovoltaic System" - Power Electronics and Mtion Control Conference, 2004. IPEMC 2004.
May 3, 20110 - June 3, Jung, et al., "DC-Link Ripple Reduction of Series-connected Module Integrated Converter for Photovoltaic Systems." - Power Electronics and ECCE Asia (ICPE & ECCE).
Jan. 8, 2007, Li et al., "An Analysis of ZVS Two-Inductor Boost Converter under Variable Frequency Operation" - IEEE Transactions on Power Electronics (vol. 22, Issue 1, Jan. 2007).
2007 Sep. 17, Rodriguez et al., "Analytic Solution to the Photovoltaic Maximum Power Point Problem" - IEEE Transactions on Circuits and Systems I: Regular Papers (vol. 54, Issue 9, Sep. 2007).
Jun. 2, 19977, Reimann et al., "A Novel Control Principle of Bi-Directional DC-DC Power Conversion" - Powre Electronics Specialists Conference 1997. PESC '97 Record.
2000 Sept. 15-22, Russell et al., "The Massachusetts Electric Solar Project: A Pilot Project to Commercialize Residential PV Systems" - Photovoltaic Specialists Conference, 2000, Conference Record of the Twenty-Eighth IEEE Photovoltaic Specialists Conference - 2000.
May 2001, Shimizu et al., "Generation Control Circuit for Photvoltaic Modules" - IEEE Transactions of Power Electronics (vol. 16, Issue 3, May 2001).
Feb. 6-10, 2000, Siri, Kasemsan "Study of System Instability in Current-Mode Converter Power Systems Operating in Solar Array Voltage Regulation Mode" - Applied Power Electronics Conference and Exposition, 2000. APEC 2000. Fiftheenth Annual IEEE.
Aug. 1990. 13-16 - Rajan, Anita "A Maximum Power Point Tracker Optimized for Solar Powered Cars" - Future Transportation Technology Conference and Expostion.
Jul. 1, 19950 - "Battery I.D. chip from Dallas Semiconductor monitors and reports battery pack temperature" - Business Wire.
Nov. 1999. 3 - Takahashi et al., "Development of a Long-Life Three-Phase Flywheel UPS Using an Electrolytic Capacitorless Converter/Inverter" - Electrical Engineering in Japan, vol. 127.
Jan. 2001 - Walker, Geoffrey "Evaluating MPPT Converter Topologies Using a Matlab PV Model" - "Journal of Electrical and Electronics Engineering, Australia".
Feb. 2007. 13 - Roman et al., "Experimental Results of Controlled PV Module for Building Integrated PV Systems" - Solar Energy 82 (2008) 471-480.
2006 - Bower et al., "Innovative PV Micro-Inverter Topology Eliminates Electrolytic Capacitors for Longer Lifetime" - IEEE 1-4244-0016-3/06/ pp. 2038-2041.
Aug. 1993. 23-27 - Case et al., "A Minimum Component Photovoltaic Array Maximum Power Point Tracker" - European Space Power Conference vol. 1. Power Systems, Power Electronics.
Jun. 4, 1997 - Maranda et al., "Optimization of the Master-Slave Inverter System for Grid-Connected Photovoltaic Plants" - Energy Convers. Mgmt. Vol. 39, No. 12 pp. 1239-1246.
2005 - Kang et al., "Photovoltaic Power Interface Circuit Incorporated with a Buck-Boost Converter and a Full-Bridge Inverter" - Applied Energy 82, pp. 266-283.
Nov. 1997. 21 - Feuermann et al., "Reversable Low Soalr Heat Gain Windows for Energy Savings" - Solar Energy vol. 62, No. 3 pp. 169-175.
May 1, 20056 - Enrique et al., "Theoretical assessment of the maximum power point tracking efficiency of photovoltaic facilities with different converter topologies" - Solar Energy 81 (2007) p. 31-38.
Dehbonei, Hooman "Power Conditioning for Distrbuted Renewable Energy Generation" - Curtin University of Technology, School of Electrical and Computer Engineering, 2003 568 pages Dissertation: Thesis. Abstract, 1 page - retrieved on 11.13.2017 on https://books.google.com/books/about/Power_Conditioning_for_Distributed_Renew.html? d=3wVXuAAACAAJ.
Korean Patent Application No. 102005-7008700, filed May 13, 2015. Applicant: Exar Corporation.
Jan. 2018. 23 - EP Search Report, EP App No. 17187230.2.
Apr. 1, 20186 - EP Examination Report 12707899.6.
Aug. 2010. 9, Hong, Wei, et al., "Charge Equalization of Battery POwer Modules in Series" The 2010 International Power Electronics Conference, IEEE, p. 1568-1572.
Jun. 6, 2018 - EP Search Report EP App No. 18151594.1.
Jun. 2, 20189 - EP Search Report - EP App No. 18175980.4.
Jun. 2, 20003; Bascope, G.V.T. Barbi, I; "Generation of Family of Non-isolated Dc-Dc Pwm Converters Using New Three-state Switching Cells"; 2000 IEEE 31st Annual Power Electronics Specialists Conference in Galway, Ireland; vol. 2.
Oct. 3-7, 2004; Nobuyoshi, M et al., "A Controlling Method for Charging Photovoltaic Generation Power Obtained by a MPPT Control Method to Series Connected Ultra-Electric Double Layer Capacitors" - Industry Application Conference, 2004. 39th IAS Annual Meeting. Conference Record of the 2004 IEEE.

(56) References Cited

OTHER PUBLICATIONS

Storfer, Lior, "Enhancing Cable Modem TCP Performance," Texas Instruments Inc. white paper, Jul. 2003.
Philips Semiconductors, Data Sheet PSMN005-55B; PSMN005-55P N-channel logic trenchMOS transistor, Oct. 1999, Product specification, pp. 1-11.
International Preliminary Report on Patentability Issued in corresponding international application No. PCT/ US04/16668, filed May 27, 2004.
International Application No. PCT/US13/27965, International Preliminary Examination Report, Sep. 2, 2014.
International Patent Application PCT/US13/027965, International Search Report and Written Opinion, Jun. 2, 2013.
International Application No. PCT/US12/44045, International Preliminary Examination Report, Jan. 28, 2014.
International Patent Application No. PCT/US2012/044045, International Search Report and Written Opinion, January 2. 2013.
International Patent Application No. PCT/US2009/047734, International Search Report and Written Opinion, May 4, 2010.
Linares, Leonor et al., "Improved Energy Capture in Series String Photovoltaics via Smart Distributed Power Electronics," 24th Annual IEEE Applied Power Electronics Conference and Exposition, pp. 904-910, Feb. 15, 2009.
International Patent Application No. PCT/US2010/029929, International Search Report and Written Opinion, Oct. 27, 2010.
Lowe, Electronics Basis: What is a Latch Circuit, http://www.dummies.com/how-to/content/electronics-basics-what-is- a-latch-circuit.html, from Electronics All-in-One for Dummies, Feb. 2012, downloaded Jul. 13, 2014.
International Patent Application No. PCT/US2011/020591, International Search Report and Written Opinion, Aug. 8, 2011.
International Patent Application No. PCT/US2011/033544, International Search Report and Written Opinion, Nov. 24, 2011.
J. Keller and B. Kroposki, titled, "Understanding Fault Characteristics of Inverter-Based Distributed Energy Resources", In a Technical Report NREL/TP-550-46698, published Jan. 2010, pp. 1 through 48.
International Patent Application No. PCT/US2008/081827, International Search Report and Written Opinion, Jun. 24, 2009.
International Patent Application No. PCT/US2010/046274 International Search Report and Written Opinion, Apr. 22, 2011.
International Patent Application No. PCT/US2011/033658, International Search Report and Written Opinion, Jan. 13, 2012.
International Patent Application No. PCT/US2011/029392, International Search Report and Written Opinion, Oct. 24, 2011.
European Patent Application No. 09829487.9, Extended Search Report, Apr. 21, 2011.
International Patent Application No. PCT/US2009/062536, International Search Report and Written Opinion, Jun. 17, 2010.
International Patent Application No. PCT/US2010/022915, International Search Report and Written Opinion, Aug. 23, 2010.
International Patent Application No. PCT/US2010/046272, International Search Report and Written Opinion, Mar. 31, 2011.
Exell et al., "The Design and Development of a Solar Powered Refrigerator", [retrieved on 2013-02-13], Retrieved from the Internet <URL: http://www.appropedia.org/The_Design_and_Development_of_a_Solar_Powered_Refrigerator>, op. 1-64.
"Development of Water-Lithium Bromide Low-Temperature Absorption Refridgerating Machine", 2002 Energy & Environment on Database on Noteworthy contributions for Science and Technology (Japan), Research Data (No. 1748) [online], [retrieved on Aug. 29, 2012]. Retrieved from the Internet: <URL: http://dbnstl.nii.ac.jp/english/detail/1748>, pp. 1-4.
Dictionary.com, "air conditioning" [online], [retrieved on Aug. 28, 2012]. Retrieved from the Internet: <URL: http://dictionary.reference.com/browse/air+conditioning?s=t>, pp. 1-3.
International Patent Application No. PCT/US2010/029936, International Search Report and Written Opinion, Nov. 12, 2010.
International Patent Application No. PCT/US08/75127, International Search Report and Written Opinion, Apr. 28, 2009.
International Patent Application No. PCT/US09/35890, International Search Report and Written Opinion, Oct. 1, 2009.
European Patent Application No. 08845104.2, Extended Search Report, Jul. 31, 2014.
European Patent Application No. 11772811.3, Extended Search Report, Dec. 15, 2014.
International Patent Application No. PCT/US2008/082935, International Search Report and Written Opinion, Jun. 25, 2009.
Bhatnagar et al., Silicon Carbide High Voltage (400 V) Shottky Barrier Diodes, IEEE Electron Device Letters, vol. 13 (10) p. 501-503 Oct. 10, 1992.
Jun. 6-10, 2004—Rodriguez, C., and G. A. J. Amaratunga. "Dynamic stability of grid-connected photovoltaic systems." Power Engineering Society General Meeting, 2004. IEEE, pp. 2194-2200.
Nov. 3, 1999-Dec. 29—Kikuchi, Naoto, et al. "Single phase amplitude modulation inverter for utility interaction photovoltaic system." Industrial Electronics Society, 1999. IECON'99 Proceedings. The 25th Annual Conference of the IEEE. vol. 1. IEEE, 1999.
Oct. 7-12, 1990.—Nonaka, Sakutaro, et al. "Interconnection system with single phase IGBT PWM CSI between photovoltaic arrays and the utility line." Industry Applications Society Annual Meeting, 1990., Conference Record of the 1990 IEEE.
Jun. 23-27, 2002—Calais, Martina, et al. "Inverters for single-phase grid connected photovoltaic systems-an overview." Power Electronics Specialists Conference, 2002. pesc 02. 2002 IEEE 33rd Annual. vol. 4. IEEE, 2002.
Jul. 1999—Marra, Enes Goncalves, and José Antenor Pomilio. "Self-excited induction generator controlled by a VS-PWM bidirectional converter for rural applications." Industry Applications, IEEE Transactions on 35.4 (1999): 877-883.
Apr. 2-5, 2002—Xiaofeng Sun, Weiyang Wu, Xin Li, Qinglin Zhao: A Research on Photovoltaic Energy Controlling System with Maximum Power Point Tracking:; Proceedings of the Power Conversion Conference-Osaka 2002 (Cat. No. 02TH8579) IEEE—Piscataway, NJ, USA, ISBN: 0-7803-7156-9, vol. 2, p. 822-826, XP010590259: the whole document.
International Search Report for corresponding PCT/GB2005/050198 completed Jun. 28, 2006 by C. Wirner of the EPO.
Brunello, Gustavo, et al., "Shunt Capacitor Bank Fundamentals and Protection," 2003 Conference for Protective Relay Engineers, Apr. 8-10, 2003, pp. 1-17, Texas A&M University, College Station, Tx, USA.
Cordonnier, Charles-Edouard, et al., "Application Considerations for Sensefet Power Devices," PCI Proceedings, May 11, 1987, pp. 47-65.
Jun. 9-11, 2003—Kotsopoulos, Andrew, et al., "Predictive DC Voltage Control of Single-Phase PV Inverters with Small DC Link Capacitance," IEEE International Symposium, Month Unknown, 2003, pp. 793-797.
Meinhardt, Mike, et al., "Multi-String-Converter with Reduced Specific Costs and Enhanced Functionality," Solar Energy, May 21, 2001, pp. 217-227, vol. 69, Elsevier Science Ltd.
Mar. 6-10, 2005—Kimball, et al.: "Analysis and Design of Switched Capacitor Converters"; Grainger Center for Electric Machinery and Electromechanics, University of Illinois at Urbana-Champaign, 1406 W. Green St, Urbana, IL 61801 USA, © 2005 IEEE; pp. 1473-1477.
Martins, et al.: "Interconnection of a Photovoltaic Panels Array to a Single-Phase Utility Line From a Static Conversion System"; Power Electronics Specialists Conference, 2000. PESC 00. 2000 IEEE 31st Annual; Jun. 18, 2000-Jun. 23, 2000; ISSN: 0275-9306; pp. 1207-1211, vol. 3.
International Search Report for corresponding PCT/GB2005/050197, completed Dec. 20, 2005 by K-R Zettler of the EPO.
Kjaer, Soeren Baekhoej, et al., "Design Optimization of a Single Phase Inverter for Photovoltaic Applications," IEEE 34th Annual Power Electronics Specialist Conference, Jun. 15-19, 2003, pp. 1183-1190, vol. 3, IEEE.
Jun. 23-27, 2002—Shimizu, Toshihisa, et al., "A Flyback-type Single Phase Utility Interactive Inverter with Low-frequency Ripple Current Reduction on the DC Input for an AC Photovoltaic Module System," IEEE 33rd Annual Power Electronics Specialist Conference 2002, pp. 1483-1488, vol. 3, IEEE.

(56) References Cited

OTHER PUBLICATIONS

Written Opinion of PCT/GB2005/050197, Feb. 14, 2006 (mailing date), Enecsys Limited.
Jun. 17-21, 2001—Yatsuki, Satoshi, et al., "A Novel AC Photovoltaic Module System based on the Impedance-Admittance Conversion Theory," IEEE 32nd Annual Power Electronics Specialists Conference, Month Unknown, 2001, pp. 2191-2196, vol. 4, IEEE.
Ciobotaru, et al., Control of single-stage single-phase PV inverter, Aug. 7, 2006.
International Search Report and Written Opinion for PCT/IB2007/004591 dated Jul. 5, 2010.
European Communication for EP07873361.5 dated Jul. 12, 2010.
European Communication for EP07874022.2 dated Oct. 18, 2010.
European Communication for EP07875148.4 dated Oct. 18, 2010.
Chen, et al., "A New Low-Stress Buck-Boost Converter for Universal-Input PFC Applications", IEEE Applied Power Electronics Conference, Feb. 2001, Colorado Power Electronics Center Publications.
Chen, et al., "Buck-Boost PWM Converters Having Two Independently Controlled Switches", IEEE Power Electronics Specialists Conference, Jun. 2001, Colorado Power Electronics Center Publications.
Esram, et al., "Comparison of Photovoltaic Array Maximum Power Point Tracking Techniques", IEEE Transactions on Energy Conversion, vol. 22, No. 2, Jun. 2007, pp. 439-449.
Walker, et al., "Photovoltaic DC-DC Module Integrated Converter for Novel Cascaded and Bypass Grid Connection Topologies-Design and Optimisation", 37th IEEE Power Electronics Specialists Conference, Jun. 18-22, 2006, Jeju, Korea.
Geoffrey R. Walker Affidavit re: U.S. Appl. No. 11/950,271, submitted in an IDS for U.S. Appl. No. 11/950,271 on Mar. 9, 2010.
International Search Report for PCT/IB2007/004610 dated Feb. 23, 2009.
International Search Report for PCT/IB2007/004584 dated Jan. 28, 2009.
International Search Report for PCT/IB2007/004586 dated Mar. 5, 2009.
International Search Report for PCT/IB2007/004643 dated Jan. 30, 2009.
International Search Report for PCT/US2008/085736 dated Jan. 28, 2009.
International Search Report for PCT/US2008/085754 dated Feb. 9, 2009.
International Search Report for PCT/US2008/085755 dated Feb. 3, 2009.
Kajihara, et al., "Model of Photovoltaic Cell Circuits Under Partial Shading", 2005 IEEE, pp. 866-870.
Knaupp, et al., "Operation of a 10 Kw Pv Facade with 100 W Ac Photovoltaic Modules", 1996 IEEE, 25th PVSC, May 13-17, 1996, pp. 1235-1238, Washington, DC.
Myrzik, et al., "String and Module Integrated Inverters for Single-Phase Grid Connected Photovoltaic Systems - A Review", Power Tech Conference Proceedings, 2003 IEEE Bologna, Jun. 23-26, 2003, p. 8, vol. 2.
Chen, et al., "Predictive Digital Current Programmed Control", IEEE Transactions on Power Electronics, vol. 18, Issue 1, Jan. 2003.
Wallace, et al., "DSP Controlled Buck/Boost Power Factor Correction for Telephony Rectifiers", Telecommunications Energy Conference 2001, INTELEC 2001, Twenty-Third International, Oct. 18, 2001, pp. 132-138.
Alonso, "A New Distributed Converter Interface for PV Panels", 20th European Photovoltaic Solar Energy Conference, 6-10, Jun. 2005, Barcelona, Spain, pp. 2288-2291.
Alonso, "Experimental Results of Intelligent PV Module for Grid-Connected PV Systems", 21st European Photovoltaic Solar Energy Conference, Sep. 4-8, 2006, Dresden, Germany, pp. 2297-2300.
Enslin, "Integrated Photovoltaic Maximum Power Point Tracking Converter", IEEE Transactions on Industrial Electronics, vol. 44, No. 6, Dec. 1997, pp. 769-773.
1999 Sept. 7-9 - Lindgren, "Topology for Decentralised Solar Energy Inverters with a Low Voltage AC-Bus", Chalmers University of Technology, Department of Electrical Power Engineering, EPE '99 - Lausanne.
Jun. 20-25, 2004 - Nikraz, "Digital Control of a Voltage Source Inverter in a Photovoltaic Applications", 2004 35th Annual IEEE Power Electronics Specialists Conference, Aachen, Germany, 2004, pp. 3266-3271.
Orduz, "Evaluation Test Results of a New Distributed MPPT Converter", 22nd European Photovoltaic Solar Energy Conference, Sep. 3-7, 2007, Milan, Italy.
Jun. 17-21, 2007 - Palma, "A Modular Fuel Cell, Modular DC-DC Converter Concept for High Performance and Enhanced Reliability", IEEE 2007, pp. 2633-2638.
1996 Sept. 16-19 - Quaschning, "Cost Effectiveness of Shadow Tolerant Photovoltaic Systems", Berlin University of Technology, Institute of Electrical Energy Technology, Renewable Energy Section. EuroSun '96, pp. 819-824.
Roman, "Intelligent PV Module for Grid-Connected PV Systems", IEEE Transactions on Industrial Electronics, vol. 52, No. 4, Aug. 2006, pp. 1066-1073.
Roman, "Power Line Communications in Modular PV Systems", 20th European Photovoltaic Solar Energy Conference, 6-10, Jun. 2005, Barcelona, Spain, pp. 2249-2252.
Uriarte, "Energy Integrated Management System for PV Applications", 20th European Photovoltaic Solar Energy Conference, Jun. 6-10, 2005, Barcelona, Spain, pp. 2292-2295.
Walker, "Cascaded DC-DC Converter Connection of Photovoltaic Modules", IEEE Transactions on Power Electronics, vol. 19, No. 4, Jul. 2004, pp. 1130-1139.
Oct. 1999. 3-7 - Matsui, et al., "A New Maximum Photovoltaic Power Tracking Control Scheme Based on Power Equilibrium at DC Link", IEEE, 1999, pp. 804-809.
Hou, et al., Application of Adaptive Algorithm of Solar Cell Battery Charger, Apr. 2004.
Sep. 15-22, 2000—Stamenic, et al., "Maximum Power Point Tracking for Building Integrated Photovoltaic Ventilation Systems".
International Preliminary Report on Patentability for PCT/IB2008/055092 dated Jun. 8, 2010.
International Search Report for PCT/IB2008/055092 dated Sep. 8, 2009.
International Search Report and Opinion of International Patent Application WO2009136358 (PCT/IB2009/051831), dated Sep. 16, 2009.
Informal Comments to the International Search Report dated Dec. 3, 2009.
PCT/IB2010/052287 International Search Report and Written Opinion dated Sep. 2, 2010.
JK Intellectual Property office, Combined Search and Examination Report for GB1100450.4 under Sections 17 and 18 3), Jul. 14, 2011.
Jain, et al., "A Single-Stage Grid Connected Inverter Topology for Solar PV Systems with Maximum Power Point Tracking", IEEE Transactions on Power Electronics, vol. 22, No. 5, Sep. 2007, pp. 1928-1940.
Lynch, et al., "Flexible DER Utility Interface System: Final Report", Sep. 2004-May 2006, Northern Power Systems, Inc., Waitsfield, Vermont B. Kroposki, et al., National Renewable Energy Laboratory Golden, Colorado Technical Report NREL/TP-560-39876, Aug. 2006.
Schimpf, et al., "Grid Connected Converters for Photovoltaic, State of the Art, Ideas for improvement of Transformerless Inverters", NORPIE/2008, Nordic Workshop on Power and Industrial Electronics, Jun. 9-11, 2008.
Sandia Report SAND96-2797 I UC-1290 Unlimited Release, Printed Dec. 1996, "Photovoltaic Power Systems and The National Electrical Code: Suggested Practices", by John Wiles, Southwest Technology Development Institute New Mexico State University Las Cruces, NM.

(56) References Cited

OTHER PUBLICATIONS

United Kingdom Intellectual Property Office, Combined Search and Examination Report Under Sections 17 and 18(3), GB1020862.7, dated Jun. 16, 2011.
Sep. 25, 2025—European Office Action—EP App. 23185759.0.
Dec. 10, 2025—European Office Action—EP App. 21207269.8.

* cited by examiner 409
408
407
402
406
403
404

409
400
408
402
403
404

Vs
Vd
Vg
710
721
D2
Q70
C2
Z2
704b

Steady ON state:
Vgs
Vds
Vc2
t
6V
0V
Temporarily OFF
4V
65mV
2V

Steady OFF state:
0.5V
30V

SAFETY SWITCH FOR PHOTOVOLTAIC SYSTEMS

CROSS-REFERENCE TO RELATED APPLICATIONS

The present application is a continuation of U.S. application Ser. No. 17/240,276, filed Apr. 26, 2021, entitled "Safety Switch for Photovoltaic Systems," which is a continuation of U.S. application Ser. No. 16/248,475, filed Jan. 15, 2019, now U.S. Pat. No. 11,018,623, issued May 25, 2021, entitled "Safety Switch for Photovoltaic Systems," which is a continuation-in-part of U.S. nonprovisional application Ser. No. 15/250,068, filed Aug. 29, 2016, now U.S. Pat. No. 10,230,310, issued Mar. 12, 2019, entitled "Safety Switch for Photovoltaic Systems." The content of these are incorporated by reference herein in their entireties for all purposes. The present application claims priority to U.S. provisional patent application Ser. No. 62/318,303, filed Apr. 5, 2016, entitled "Optimizer garland," hereby incorporated by reference in its entirety. Additionally, the present application claims priority to U.S. provisional patent application Ser. No. 62/341,147, filed May 25, 2016, entitled "Photovoltaic Power Device and Wiring," hereby incorporated by reference in its entirety.

BACKGROUND

Safety regulations may require disconnecting and/or short-circuiting one or more photovoltaic (PV) generators or other components in case of an unsafe condition occurring in a photovoltaic installation. For example, safety regulations require that in case of an unsafe condition (e.g. a fire, a short-circuit, carrying out of maintenance work), the maximum voltage at any point in a photovoltaic installation may not exceed a safe voltage level. In some photovoltaic systems, it may be necessary to disconnect and/or short-circuit one or more photovoltaic generator(s) to achieve the safe voltage requirement. While photovoltaic systems may be deployed for tens of years, safety regulations may change at shorter time intervals (e.g. every several years). It would be advantageous to have a controllable safety switch which may be controlled to disconnect or short-circuit a PV generator in case of a safety hazard, and which may be controlled to reconnect the photovoltaic generator once the system is safe again. It would be desirable for controllable safety switches to be cost-effective and easily deployed.

SUMMARY

The following summary is a short summary of some of the inventive concepts for illustrative purposes only, and is not intended to limit or constrain the inventions and examples in the detailed description. One skilled in the art will recognize other novel combinations and features from the detailed description.

Embodiments herein may employ safety switches and associated apparatuses and methods for controlling currents through branches and/or voltages at nodes in photovoltaic (PV) installations.

In illustrative embodiments comprising one or more electrical systems, a group of electrical safety switches may be electrically connectable to a plurality of electrical power sources. The electrical safety switches may be controllable to maintain safe operation of the electrical systems.

In illustrative electrical systems, a safety switch may be deployed between serially-connected photovoltaic generators in a photovoltaic installation. In some embodiments, safety switches may be installed between each pair of PV generators. In some embodiments, the number and location of safety switches may be chosen with regard to current safety regulations, and in some embodiments, the number and location of safety switches may be chosen with regard to anticipated "worst-case" safety regulations. For example, in locales where adding, reconfiguring and/or removing system components is easy and inexpensive, safety switches may be deployed in a PV installation in accordance with the safety regulations at the time the installation was built. In locales where adding, reconfiguring and/or removing system components may be difficult or expensive, safety switches may be deployed in a manner that complies with a "worst-case" (i.e. most stringent) prediction of future regulations.

Illustrative safety switches according to some embodiments may be retrofit to existing photovoltaic installations and components. Illustrative safety switches according to some embodiments may be integrated in other PV system components (e.g. connectors, PV generators, power devices, combiner boxes, batteries and/or inverters), potentially reducing the cost of design and manufacturing of the safety switches, and increasing In some embodiments, auxiliary power circuits are used to provide power to safety switches and associated controllers. In some embodiments, safety switches are located at system points which do not carry significant electrical power when the safety switches are in a particular state (e.g., when safety switches are in the ON state). Illustrative auxiliary power circuits are disclosed herein, along with associated methods for providing power to the auxiliary power circuits and safety switches regardless of the state of the safety switches.

In some embodiments, components and design of safety switches may be selected to regulate or withstand electrical parameters when illustrative safety switches are in the ON or OFF states. For example, some illustrative safety switches may comprise shunt resistors sized to regulate electrical current flowing through safety switches when the safety switches are in the OFF position.

Further embodiments include photovoltaic power devices comprising internal circuitry configured to limit a voltage between input terminals to the photovoltaic power devices in case of a potentially unsafe condition while continuously providing operational power to the photovoltaic power devices.

Further embodiments include electrical circuits for interconnecting photovoltaic generators and photovoltaic power devices configured to limit a voltage between various system nodes while continuously providing operational power to the photovoltaic power devices.

Further embodiments include a chain of preconnected photovoltaic power devices with associated safety switches, which may provide a cost-effective, easy way to wire a photovoltaic generation system along with associated safety switches.

In some embodiments, safety switches may be in communication with accompanying system devices, such as system control devices and/or end-user devices such as graphical user interfaces for monitoring applications.

Further embodiments include user interfaces for monitoring the state of and parameters measured by safety switches in illustrative power systems. A system owner or operator may be able to view a list of system safety switches, associated switch states and electrical parameter measured thereby. In some embodiments, the list may be a graphical user interface (GUI) viewable on a computing device, such as a computer monitor, tablet, smart-television, smartphone, or the like. In some embodiments, the system operator may be able to manually control safety switches (e.g. by pressing buttons).

As noted above, this Summary is merely a summary of some of the features described herein and is provided to introduce a selection of concepts in a simplified form that are further described below in the Detailed Description. The Summary is not exhaustive, is not intended to identify key features or essential features of the claimed subject matter and is not to be a limitation on the claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Figure 1A:
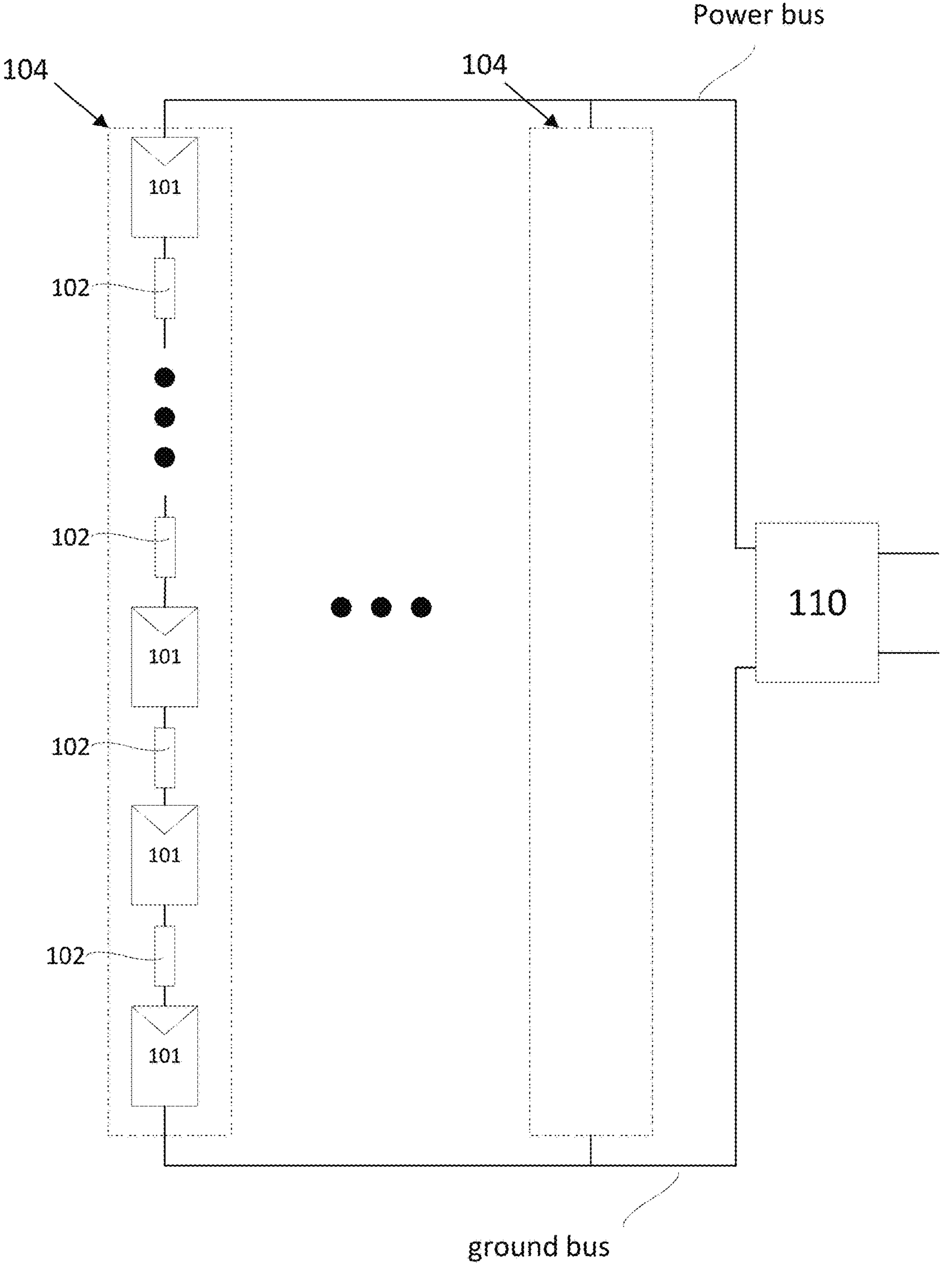
FIG. 1A illustrates a photovoltaic system configuration according to various aspects of the present disclosure.

Reference is now made to FIG. 1A, which shows a photovoltaic (PV) system according to illustrative embodiments. PV system 100 may comprise a plurality of PV strings 104 coupled in parallel between a ground bus and a power bus. Each of PV strings 104 may comprise a plurality of serially-connected PV generators 101 and a plurality of safety switches 102. PV generators 101 may comprise one or more photovoltaic cells(s), module(s), panel(s) or shingle(s). In some embodiments, PV generators 101 may be replaced by direct current (DC) batteries or alternative direct current or alternating current (AC) power sources.

In the illustrative embodiment of FIG. 1A, a safety switch 102 is disposed between each pair of PV generators 101. In some embodiments (e.g. the embodiment shown in FIG. 2) a safety switch 102 may be disposed between groups of more than one serially-connected PV generators. Safety switch 102 may comprise a control device and a communication device, and may be operated to disconnect adjacent PV generators when receiving (e.g. via the communication device) a command to disconnect PV generators.

In some embodiments, the power and ground buses may be input to system power device 110. In some embodiments, system power device 110 may include a DC/AC inverter and may output alternating current (AC) power to a power grid, home or other destinations. In some embodiments, system power device 110 may comprise a combiner box, transformer and/or safety disconnect circuit. For example, system power device 110 may comprise a DC combiner box for receiving DC power from a plurality of PV strings 104 and outputting the combined DC power. In some embodiments, system power device 110 may include a fuse coupled to each string 104 for overcurrent protection, and/or one or more disconnect switches for disconnecting one or more PV strings 104.

In some embodiments, system power device 110 may include or be coupled to a control device and/or a communication device for controlling or communicating with safety switches 102. For example, system power device 110 may comprise a control device such as a microprocessor, Digital Signal Processor (DSP) and/or a Field Programmable Gate Array (FPGA) configured to control the operation of system power device 110. In some embodiments, system power device 110 may comprise multiple interacting control devices. System power device 110 may further comprise a communication device (e.g. a Power Line Communication circuit and/or a wireless transceiver) configured to communicate with linked communication devices included in safety switches 102. In some embodiments, system power device 110 may comprise both a control device and a communication device, the control device configured to determine desirable modes of operation for PV power devices (e.g. power devices 103), and the communication device configured to transmit operational commands and receive reports from communication devices included in the PV power devices.

System power device 110 may be coupled to any number of other devices and/or systems such as PV systems 100 (e.g., various discrete and/or interconnected devices such as disconnect(s), PV cell(s)/array(s), inverter(s), micro inverter(s), PV power device(s), safety device(s), meter(s), breaker(s), AC main(s), junction box(es), camera etc.), network(s)/Intranet/Internet, computing devices, smart phone devices, tablet devices, camera, one or more servers which may include data bases and/or work stations. System power device 110 may be configured for controlling the operation of components within PV system 100 and/or for controlling the interactions with other elements coupled to PV system 100.

In some embodiments, the power and ground buses may be further coupled to energy storage devices such as batteries, flywheels or other energy storage devices.

Safety regulations may define a maximum allowable voltage between the ground bus and any other voltage point in PV system 100, during both regular operating conditions and during potentially unsafe conditions. Similarly, safety regulations may define a maximum allowable voltage between any two voltage points in PV system 100. In some scenarios, an unsafe condition in PV system 100 may require disconnecting or short-circuiting one or more of the PV generators 101 in a PV string 104.

As a numerical example, an illustrative PV string 104 may comprise 20 serially-connected PV generators 101. Each PV generator 101 may have an open-circuit voltage of 45V. In case of an unsafe condition (e.g. a fire, detection of an arc or a dangerous short-circuit somewhere in PV system 100), safety regulations may require that system power device 110 cease drawing power from PV string 104, resulting in an open-circuit voltage of 45·20=900V across PV string 104. Safety regulations may further require that in case of an unsafe condition, the maximum voltage between any two points in PV system 100 may not exceed, for example, 80V. To comply with safety regulations, safety switches 102 may disconnect the plurality of PV generators 101 comprising PV string 104, resulting in PV generators 101 (excluding the PV generators 101 coupled to the ground and power buses) having a "floating" voltage with regard to ground, and a voltage drop of about 45V between the two terminals of each PV generator.

In some embodiments, system power device 110 may respond to a potentially unsafe system condition by limiting the voltage across each PV string 104. For example, system power device 110 may comprise an inverter configured to regulate a voltage of about 60V across each PV string 104 in case of a potentially unsafe condition.

Figure 1B:
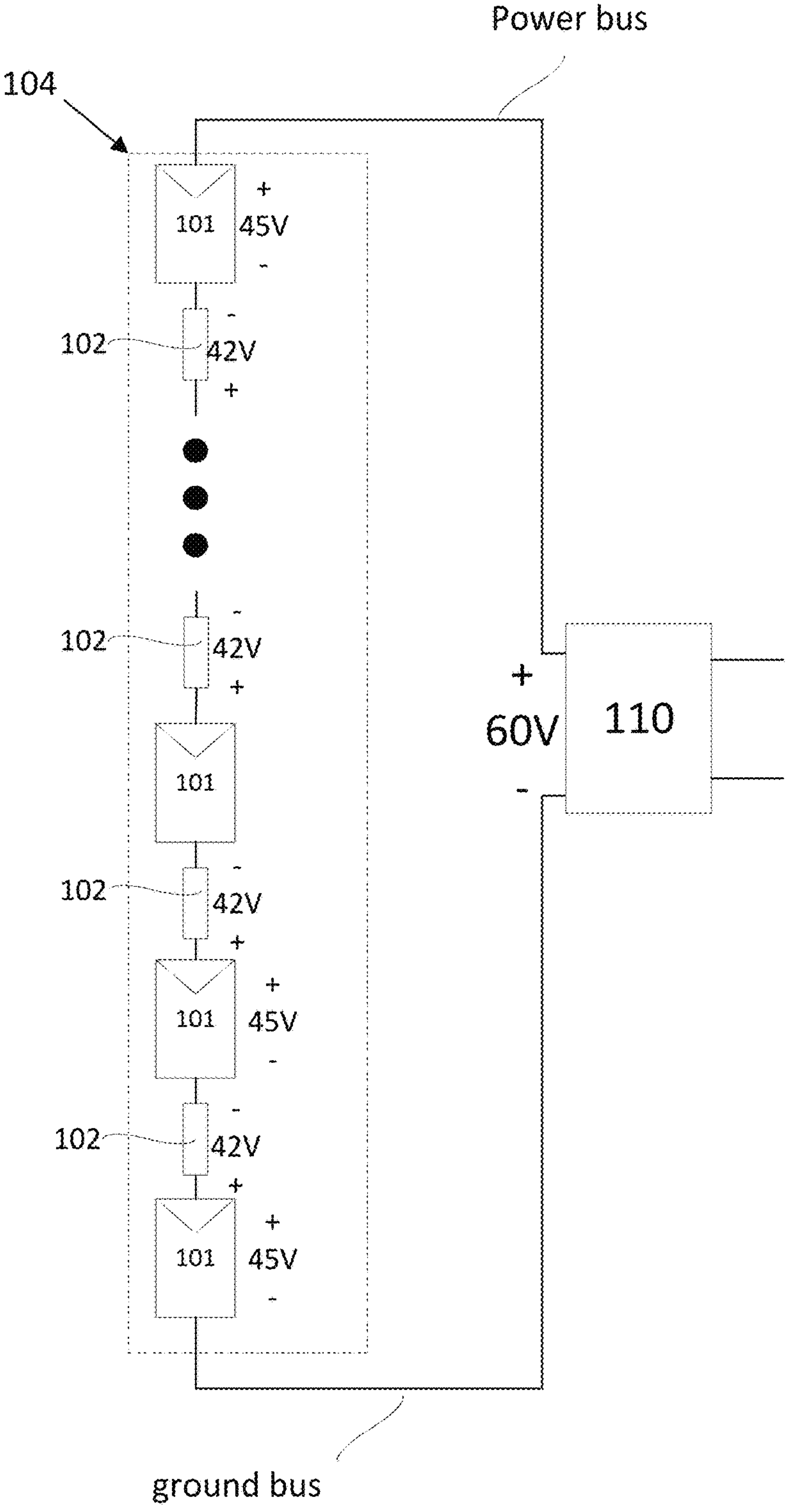
FIG. 1B illustrates a photovoltaic system configuration according to various aspects of the present disclosure.

Reference is now made to FIG. 1B, which illustrates a single PV string 104 coupled to system power device 110. In case of a potentially unsafe system condition, safety switches 102 may disconnect (i.e. each switch may move to the OFF state), and system power device 110 may apply a voltage to PV string 104. In the numerical example of FIG. 1B, each PV generator is assumed to be operating at an open-circuit voltage of 45V, and system power device 110 may apply a voltage of 60V across PV string 104. Safety switches 102, in accordance with embodiments disclosed herein, may be configured to provide and withstand a voltage drop of opposite polarity to the PV generators. In the numerical example of FIG. 1B, PV string 104 comprises twenty PV generators 101 and twenty safety switches 102. Each PV generator has a positive voltage drop of 45V, and each safety switch 102 has a negative voltage drop of 42V, providing a string voltage of (45−42)·20=60V. It may be noted that the voltage drop between each pair of locations in the PV system does not exceed 60V.

It is to be noted that the ratio of photovoltaic generators to safety switches, and the location of safety switches, may change depending on electrical parameters of photovoltaic generators and safety regulations. For example, if low-voltage PV generators (e.g. PV generators having an open-circuit voltage of 10V) are used as PV generators 101, and safety regulations allow a maximum point-to-point voltage of 55V in case of a potentially unsafe condition, a single safety switch 102 may be disposed per five PV generators 101. If safety regulations are changed to allow a maximum point-to-point voltage of 45V in case of a potentially unsafe condition, additional safety switches 102 may be added.

Safety switches 102 may comprise a resistor for regulating current through safety switches 102 when the switches are in the OFF state. For example, each of safety switches 102 may comprise a shunt resistor (e.g. resistor R31 of FIG. 3) having a resistance of about 1 kΩ, to regulate the OFF-state current to be about 42V/1 kΩ=42 mA. In general, the value of a shunt resistor may vary according to expected OFF-state voltages and currents, and may be between 10Ω and 5 kΩ.

In some embodiments, the values may vary depending on the regulated voltage provided by system power device 110 and the open-circuit voltage of each PV generator 101. For example, string 104 may comprise ten PV generators, and ten safety switches, each PV generator having an open-circuit voltage of 30V, and system power device 110 may provide a voltage of 50V across PV string 104. In that case, each safety switch may be operated to have a negative voltage of 25V, providing the string voltage of (30−25)·10=50V.

Figure 2:
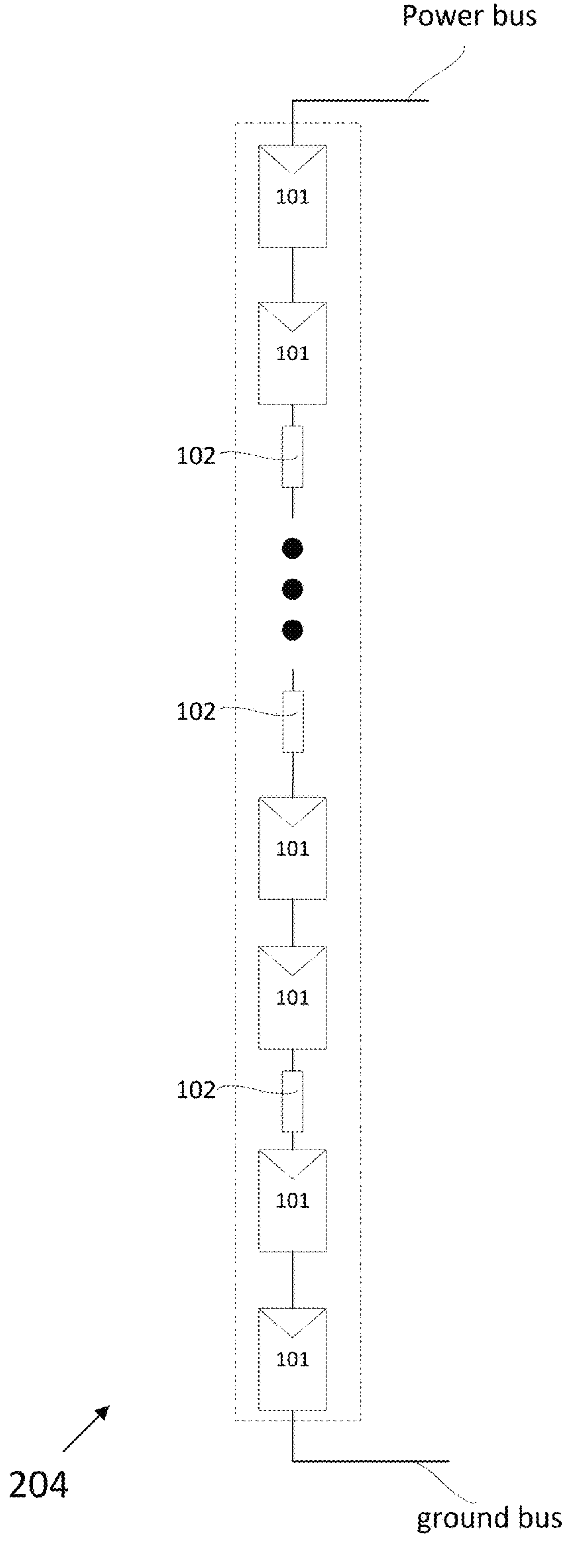
FIG. 2 illustrates part of a photovoltaic system configuration according to various aspects of the present disclosure.

Reference is now made to FIG. 2, which shows a photovoltaic string according to illustrative embodiments. PV string 204 may comprise a plurality of PV generators 101 and safety switches 102. PV generators 101 may be similar to or the same as PV generators 101 of FIG. 1A, and safety switches 102 may be similar to or the same as safety switches 102 of FIG. 1. Safety switches 102 may be installed between each pair of PV generators 101, such that each PV generator 101 (excluding the PV generators connected to the ground and power buses) has a first terminal connected to a different PV generator 101 and a second terminal connected to a safety switch 102. The arrangement illustrated in FIG. 2 may be appropriate in systems where the maximum allowed safe voltage is greater than or equal to double the open-circuit voltage of a single PV generator 101. For example, if each PV generator 101 has an open-circuit voltage of 45V and the maximum allowed safe voltage is 100V, or each PV generator 101 has an open-circuit voltage of 30V and the maximum allowed safe voltage is 80V, the arrangement illustrated in FIG. 2 may reduce costs by reducing the required number of safety switches while still complying with safety regulations.

Figure 3:
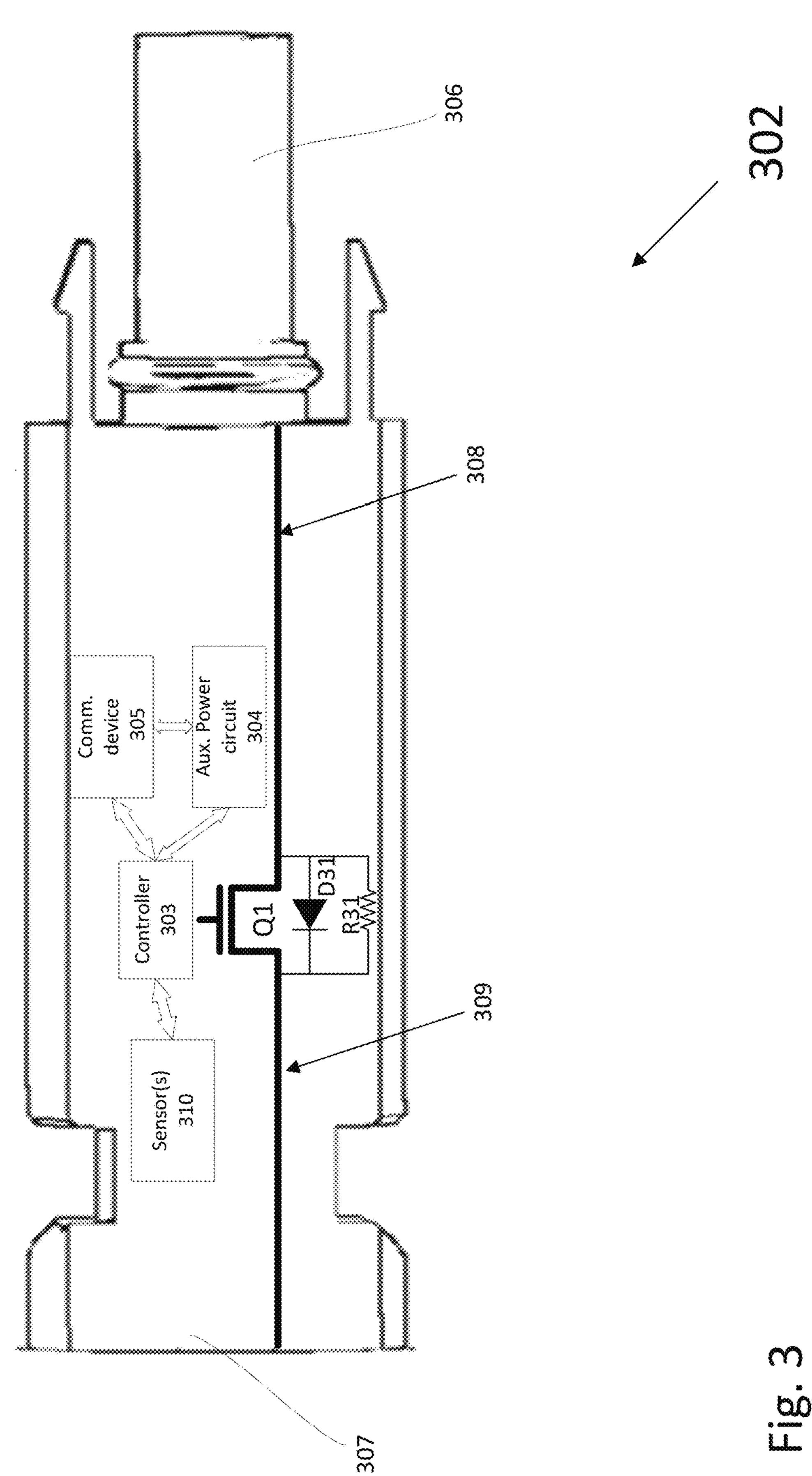
FIG. 3 illustrates a safety switch according to various aspects of the present disclosure.

Reference is now made to FIG. 3, which illustrates a safety switch according to illustrative embodiment. Safety switch 302 may be used as safety switch 102 in FIG. 1A and FIG. 2. Safety switch may comprise male connector 306 and female connector 307, male connector 306 designed to fit a female connector features by a PV generator (e.g. PV generator 101) and female connector 307 designed to fit a male connector features by a PV generator. Conductor 308 may provide an electrical connection to male connector 306, and conductor 309 may provide an electrical connection to female connector 307. In some embodiments, various interconnecting connectors may be used. Safety switch 302 may include a switching element disposed between conductor 308 and conductor 309. In the illustrative embodiment of FIG. 3, transistor Q1 may be used as a switching element disposed between conductor 308 and conductor 309. Safety switch 302 may further include controller 303 for controlling the operation of transistor Q1. Transistor Q1 may be realized using various electrical devices, such as Metal-Oxide-Semiconductor Field Effect Transistor (MOSFET), Insulated Gate Bipolar Junction transistor (IGBT), Bipolar Junction Transistor (BJT), Junction gate field-effect transistor (JFET) or other appropriate devices. In some embodiments, transistor Q1 may be realized using multiple transistors connected in parallel, to improve electrical performance (e.g. to reduce losses). In the illustrative embodiments disclosed herein, transistor Q1 and similar switching elements will be assumed to be MOSFETs comprising a body diode. Diode D31 may be the body diode of transistor Q1. In some embodiments (e.g. in case Q1 is a MOSFET comprising a low-quality body diode) a separate diode may be coupled in parallel to diode D31 to function as an alternative bypass diode. Diode D31 may be oriented to prevent forward bias of diode D31 when the transistor is in the OFF position. Resistor R31 may be disposed across the terminals of transistor Q1. Resistor R31 may be sized to regulate the OFF-state resistance across the terminals of transistor Q1. For example, if the anticipated OFF-state voltage drop across transistor Q1 is 40V, and the desired OFF-state leakage current through safety switch 302 is 20 mA, R31 may be about 40V/20 mA=2000Ω. In some embodiments, R31 might not be featured (e.g. if there is no need or desire to regulate the OFF-state leakage current).

Safety switch 302 may comprise communication device 305 for communicating with other devices and controller 303 for controlling the operation (e.g. turning ON and OFF) of transistor Q1. Controller 303 may be an analog circuit, microprocessor, Digital Signal Processor (DSP), Application-Specific Integrated Circuit (ASIC) and/or a Field Programmable Gate Array (FPGA). In some embodiments, communication device 305 may receive a command from an external device to change the state of transistor Q1, and communication device 305 may convey the command to controller 303. Communication device 305 may communicate with external devices using various technologies such as Power Line Communications (PLC), acoustic communications transmitted over conductors 308 and 309, and wireless communication protocols (e.g. Wi-Fi™, ZigBee™, Bluetooth™, cellular communications, etc.).

Auxiliary power circuit 304 may be coupled to conductors 308 and/or 309, and may provide power to controller 303, sensor/sensor interface(s) 310 and/or communication device 305. Auxiliary power circuit 304 may be variously realized, with illustrative embodiments disclosed herein (e.g. in FIGS. 7A-7C, 7E, 7H). In some embodiments, two or more of controller 303, auxiliary power circuit 304 and communication device 305 may be integrated as a single unit. For example, in FIG. 7C, communication device 305 may receive a PLC signal which also provides power to controller 303.

In some embodiments, safety switch 302 may further comprise measurement sensor(s) and/or sensor interface(s) 310 for measuring parameters such as current, voltage and/or temperature. For example, sensor/sensor interface(s) 310 may include a current sensor for measuring the current through conductor 308 or conductor 309, and/or a voltage sensor for measuring the voltage drop across transistor Q1, and/or a temperature sensor for measuring the temperature at or near male connector 306, female connector 307 and/or transistor Q1. In some embodiments, sensor(s)/sensor interface(s) 310 may provide measurements to controller 303, with controller 303 configured to take action (e.g. change the state of transistor Q1) according to the measurements received. For example, controller 303 may be configured to set the state of Q1 to OFF if a high current is measured through conductor 309, or if a high temperature is measured near male connector 306. In some embodiments, controller 303 may provide the measurements obtained from sensor(s)/sensor interface(s) 310 to communication device 305, with communication device 305 configured to transmit the measurements to a system controller or data-collection device (not explicitly depicted), such as system power device 110 of FIG. 1. In some embodiments, sensor(s)/sensor interface(s) 310 may provide measurements directly to communication device 305, bypassing controller 303.

It should be noted that while a preferred embodiment of the disclosure includes providing transistor Q1 for safety features (e.g. the ability to disconnect two PV generators from each other), other embodiments included herein might not include transistor Q1. Sensor/sensor interface(s) 310, auxiliary power circuit 304 and communication device 305 may be combined to provide measurement and data-reporting features even without the safety advantages (e.g. ability to disconnect a photovoltaic generator) provided by safety transistor Q1.

Figures 4A, 4B:
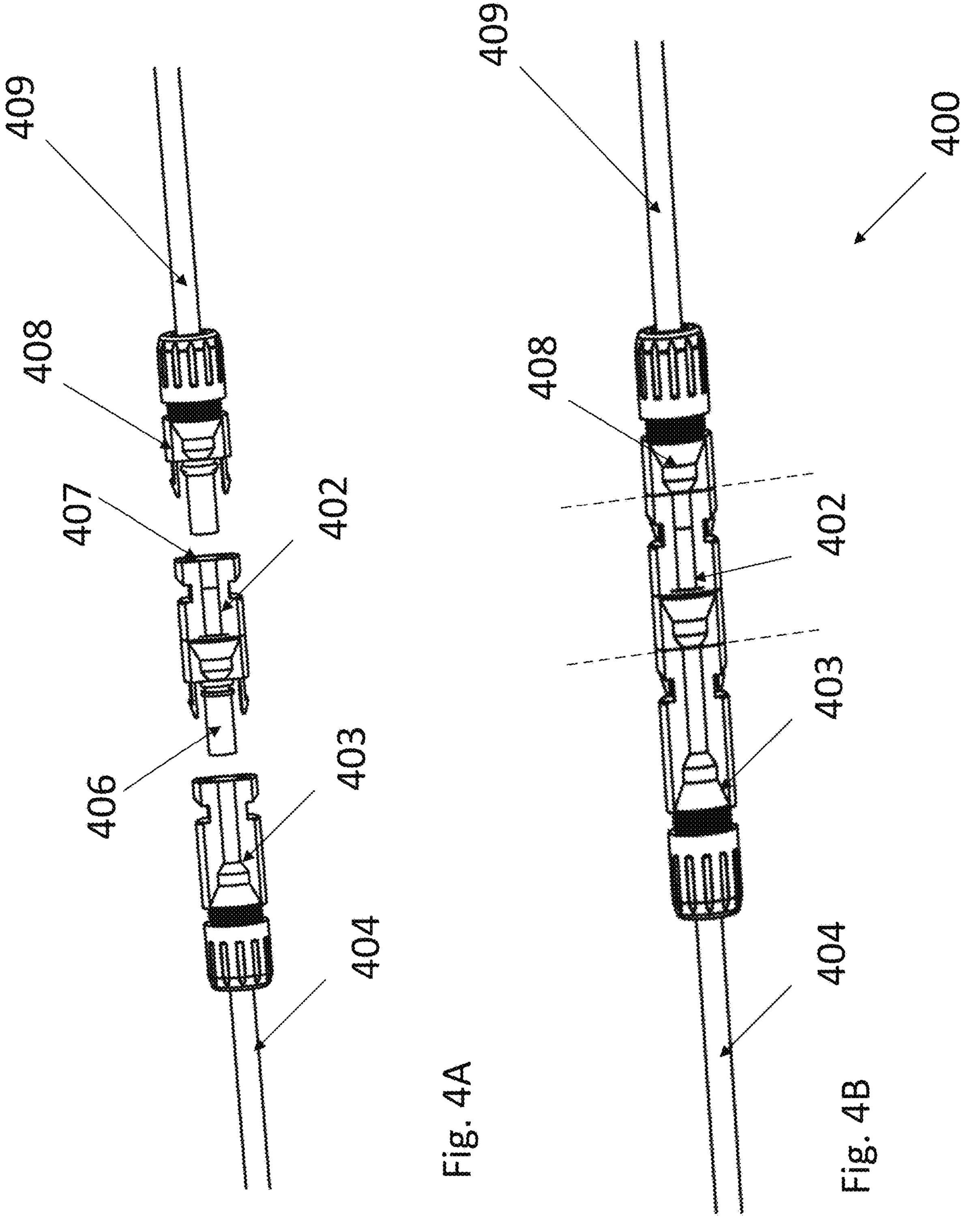
FIGS. 4A-4B illustrate a safety switch according to various aspects of the present disclosure.

Reference is now made to FIGS. 4A-4B, which illustrates the connectivity of a safety switch according to illustrative embodiments. Safety switch 402 may be similar to or the same as safety switch 302 of FIG. 3. Safety switch 402 may comprise male connector 406 for connecting to connector 403, with connector 403 connected to conductor 404 which carries power generated by a first PV generator (not explicitly depicted). Similarly, safety switch 402 may comprise female connector 407 for connecting to connector 408, with connector 408 connected to conductor 409 which carries power generated by a second PV generator (not explicitly depicted). In some conventional photovoltaic systems, the first and second photovoltaic generators may be serially connected by connecting connector 403 to connector 408. Safety switch 402 may be designed to seamlessly connect to connector 403 on one end and to connector 408 on the other end, adding safety-disconnect, control and/or monitoring features to a photovoltaic installation, either during construction of the installation or as a retrofit feature at a later time.

FIG. 4A shows safety switch 402 along with connectors 408 and 403 prior to connecting, according to illustrative embodiments, while FIG. 4B shows connection point 400 comprising safety switch 402 connected to connectors 408 and 403 (the component boundaries indicated by dashed lines).

In some embodiments, advantages may be obtained by integrating safety switch 402 into a photovoltaic generator connector or a PV generator junction box. For example, safety switch 402 may be built into connector 403 or connector 408 of a PV generator, providing safety switching functionality in a PV generator without necessitating additional components and connections. Integrating safety switches in PV generator connectors or junction boxes may reduce costs (e.g. by not requiring a separate enclosure and connectors for the safety switch) and simplify installation (since no additional components need be connected).

Figure 5A:
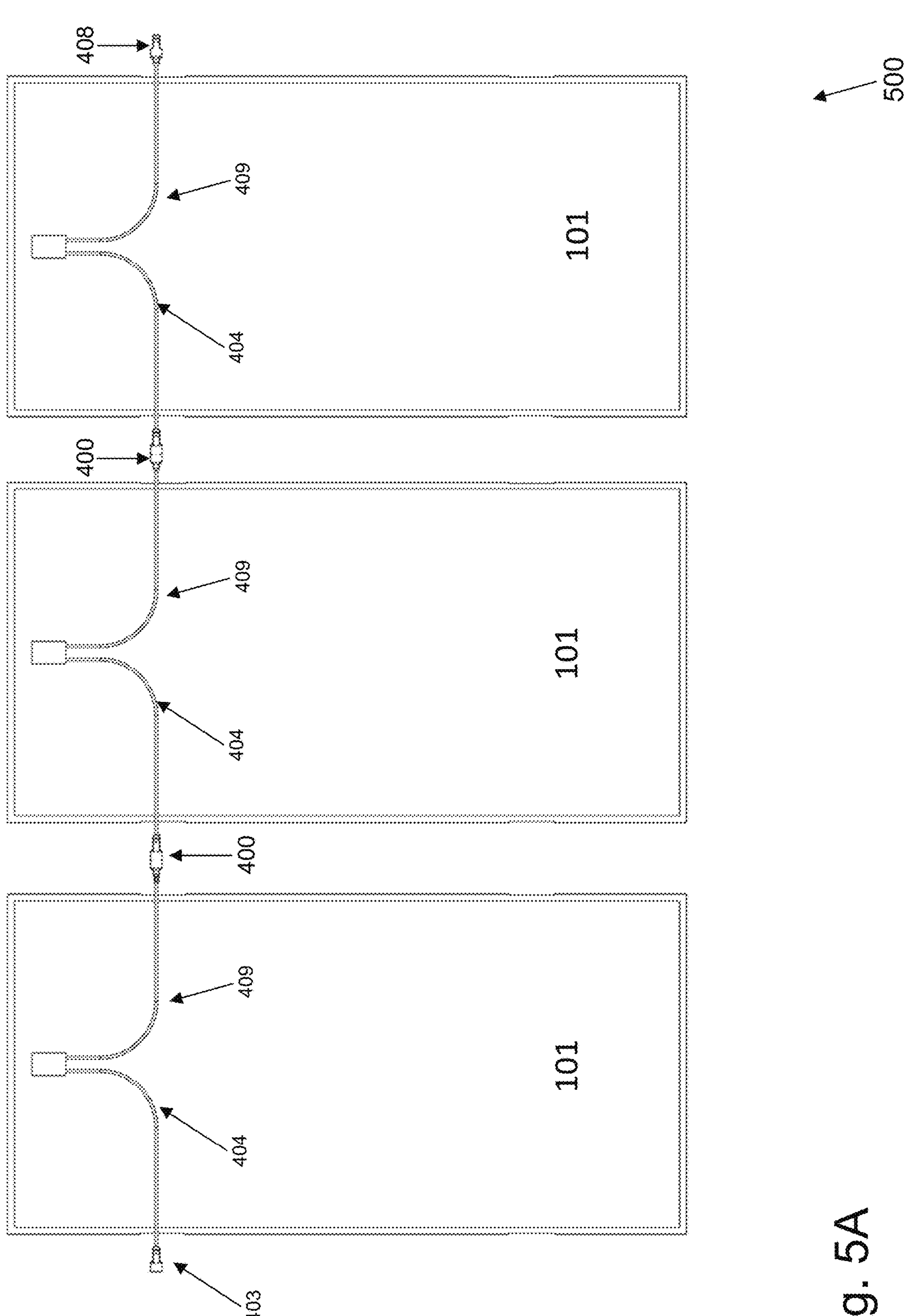
FIG. 5A illustrates part of a photovoltaic system configuration according to various aspects of the present disclosure.

Reference is now made to FIG. 5A, which shows part of a photovoltaic (PV) string featuring a safety switch according to illustrative embodiments. PV string 500 may be part of a string of PV generators 101 (e.g. part of a string similar to or the same as PV string 104 of FIG. 1A, comprising generators similar to or the same as PV generators 101 of FIG. 1A and FIG. 2) connected to each other via connection points 400. Connection points 400 may be similar to or the same as connection point 400 of FIG. 4A and FIG. 4B, and may include a safety switch (e.g. safety switch 402) coupled in between two PV generator connectors (e.g. connectors 403 and 408). Each PV generator 101 may comprise conductors 404 and 409 for carrying photovoltaic power from PV cells comprising the PV generator, and connectors 403 and 408 for connecting to safety switch 402.

Figure 5B:
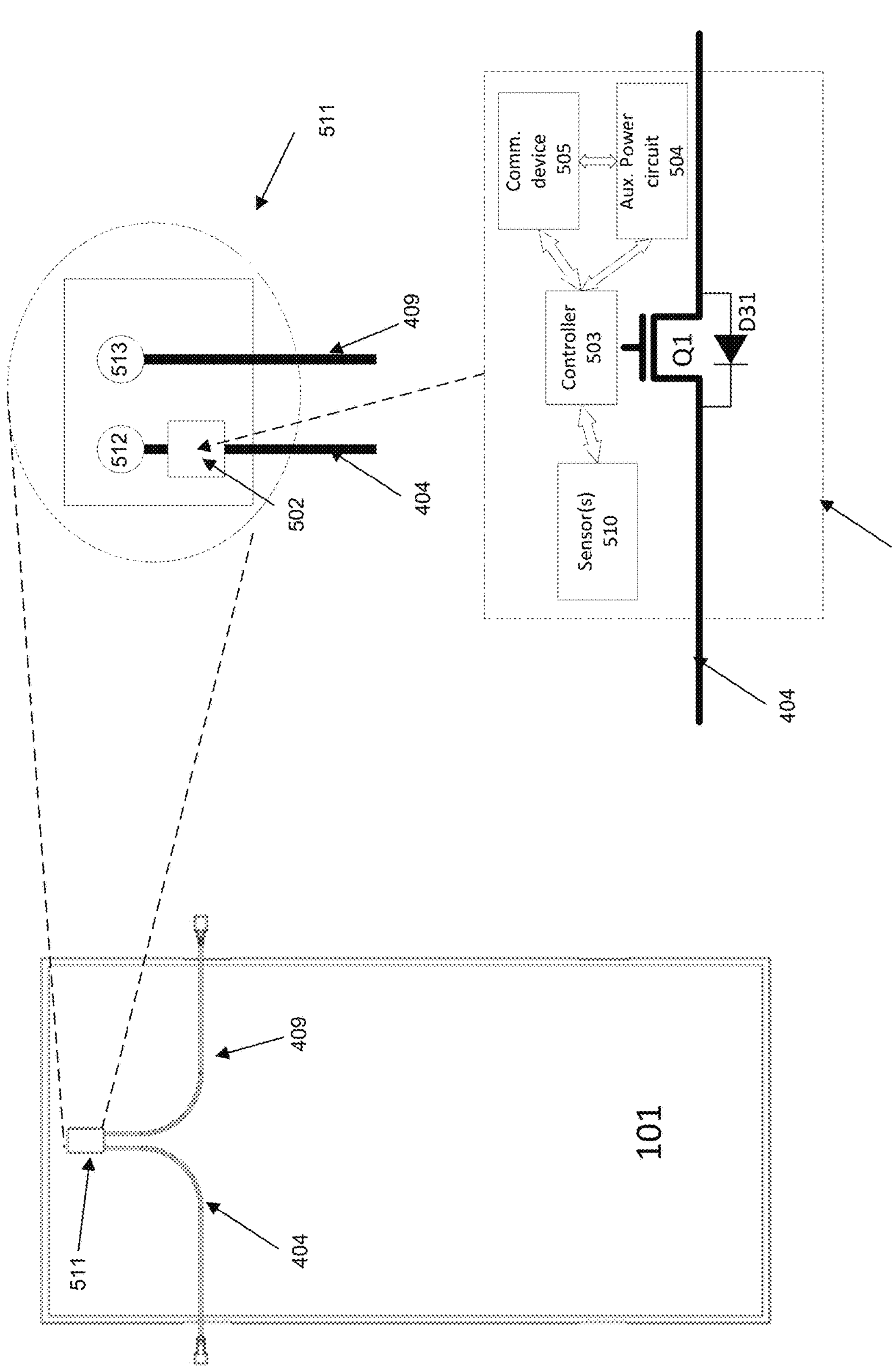
FIG. 5B illustrates a photovoltaic generator according to various aspects of the present disclosure.

Reference is now made to FIG. 5B, which illustrates a PV generator comprising a safety switch according to illustrative embodiments. PV generator 101 may comprise junction box 511 and conductors 404 and 409. FIG. 5B may illustrate the back side on a PV generator, with PV cells mounted on the front side of the PV generator (not explicitly shown). In some embodiments, PV cells may be mounted on both sides of the PV generator, or the back side of the PV generator may be constructed to allow solar irradiance to reach the PV cells from both sides of the PV generator. Junction box 511 may comprise electrical connections 512 and 513 for collecting photovoltaic power from the PV cells, and providing the photovoltaic power via conductors 409 and 404.

In illustrative embodiments disclosed herein, safety switch 502 may be disposed between conductor 404 and electrical connection 512. Safety switch 502 may be functionally similar or the same as safety switch 302 of FIG. 3, without requiring the physical enclosure and connectors 306 and 307. Transistor Q1, diode D31, sensor(s)/sensor interfaces 510, controller 503, communication device 505 and/or auxiliary power circuit 504 may be integrated in junction box 511. In some embodiments, a resistor may be coupled across the terminals of transistor Q1 (similarly to resistor R31 of FIG. 3) for regulating the OFF-state current through safety switch 502. In some embodiments, auxiliary power circuit 504 may be coupled between conductors 404 and 409 for receiving photovoltaic power generated by PV generator 101, and may provide power to controller 503, communication device 505 and/or sensor(s)/sensor interfaces 510.

Figure 9:
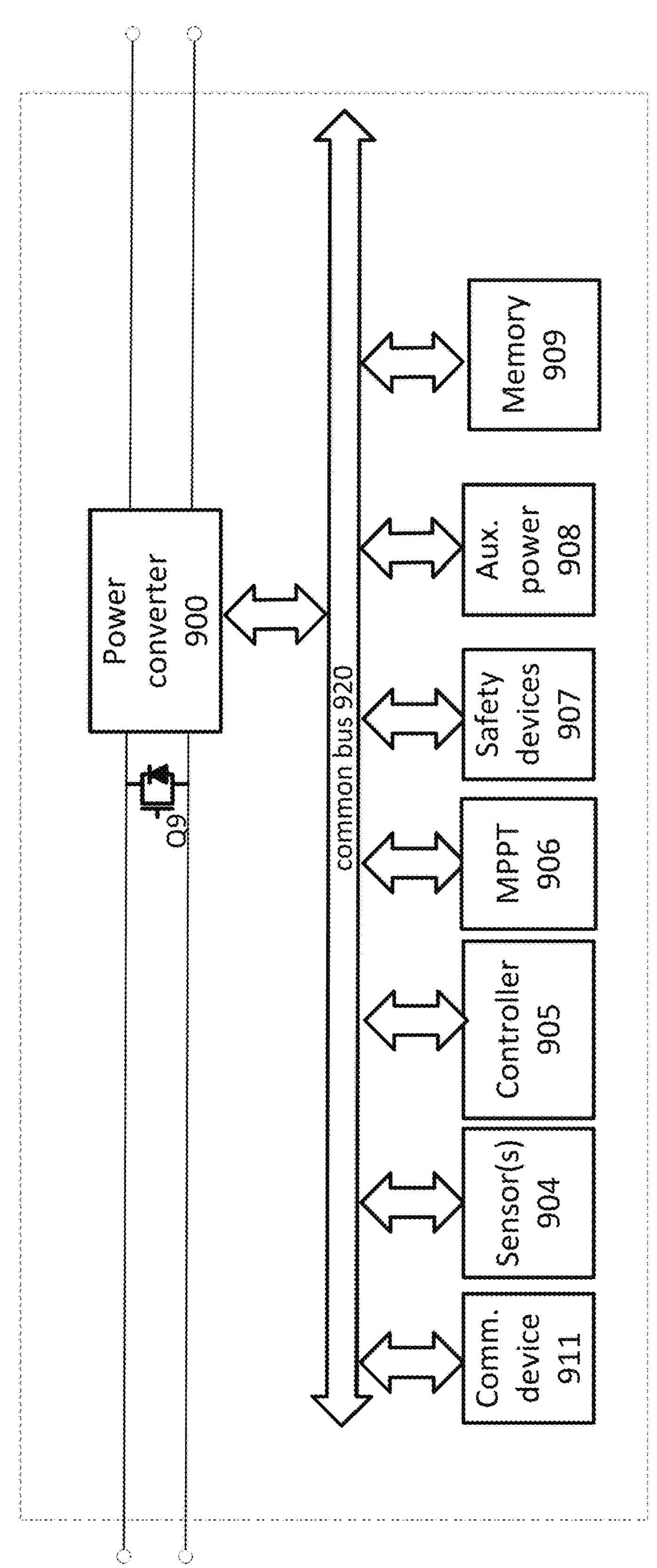
FIG. 9 illustrates a photovoltaic power device according to various aspects of the present disclosure.
Figure 9:
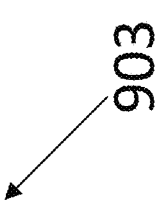

In some embodiments, junction box 511 may further include an integrated PV power device similar to or the same as PV power device 903 of FIG. 9. PV power device 903 may be coupled between conductors 404 and 409 and electrical connections 512 and 513. For example, power converter 900 of FIG. 9 may receive power from electrical connections 512 and 513, and may output power to conductors 404 and 409. Safety switch 502 may be disposed between PV power device 903 and electrical connection 512, or, in some embodiments, may be integrated into PV power device 903.

Figure 6:
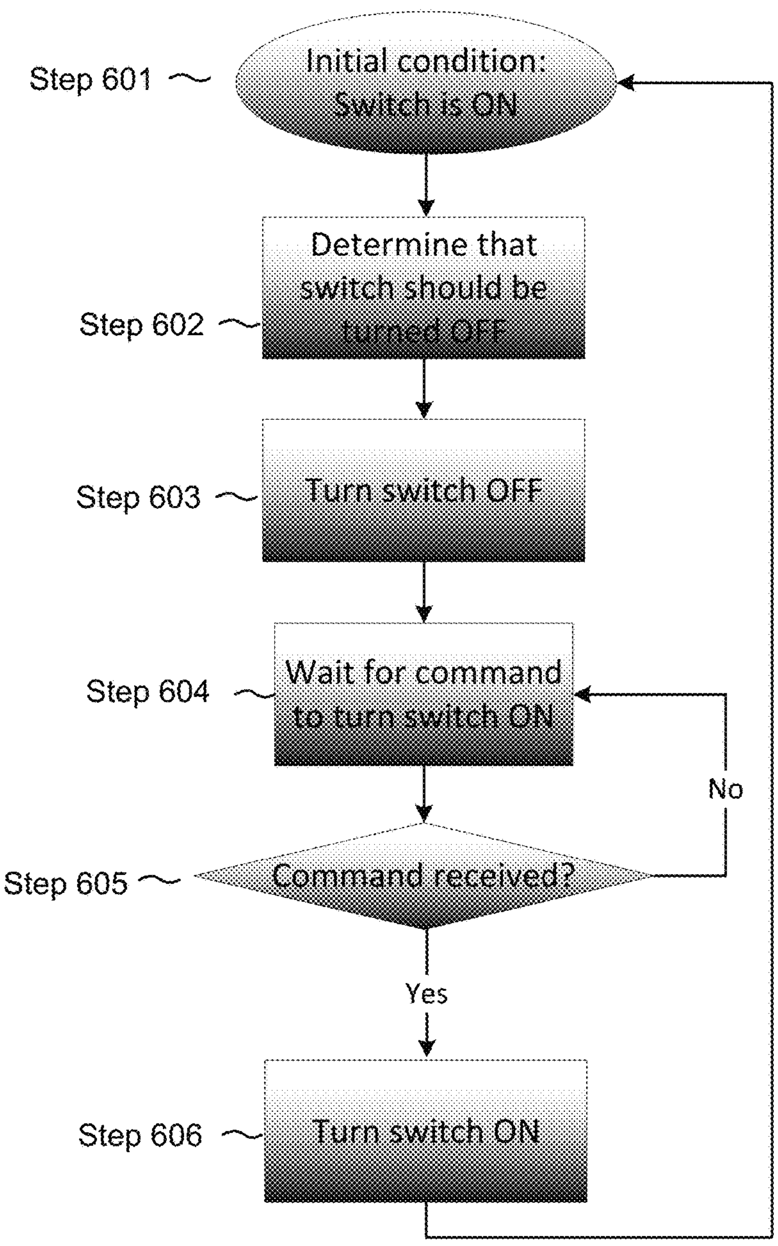
FIG. 6 illustrates a method for operating a safety switch according to various aspects of the present disclosure.

Reference is now made to FIG. 6, which shows a method for operating a safety switch (e.g. safety switch 102 of FIG. 1A, safety switch 302 of FIG. 3). Method 600 may be carried out by a controller similar to or the same as controller 303 of FIG. 3. At step 601, the initial condition may be that the switch is in the ON state, allowing current to flow between the two conductors coupled to the switch (e.g. conductors 404 and 409 of FIG. 5A). During step 601, an auxiliary power circuit coupled to the safety switch may provide power to the controller and/or a gate driver for maintaining the switch in the ON state (for example, some types of transistors implementing safety switches may be “normally OFF”, in which case the auxiliary power circuit may power a voltage signal applied to a transistor gate node to maintain the ON state). At step 602, the controller may receive a command to turn the switch to the OFF state. In some embodiments, the command may be received via a communication device (e.g. communication device 305) in communication with a system control device. In some embodiments, at step 602, instead of receiving a command to turn the switch to the OFF state, the controller may independently determine that an unsafe condition may be present (e.g. due to sensor reporting high current or temperature, or a sensor detecting a rapid change in current flowing through the switch, or based on comparing two electrical parameters and detecting a substantial mismatch) and determine that the switch should be turned to the OFF state. In some embodiments, a determination that the switch should be turned to the OFF state may be made in response to not receiving a signal. For example, in some illustrative systems, a system control device continuously provides a “keep alive” signal to associated safety switches and PV power devices. Not receiving a “keep alive” signal may indicate a potentially unsafe condition and may cause a determination that the switch should be turned to the OFF state.

Still referring to FIG. 6, at step 603, the controller turns the switch to the OFF state. In some embodiments (e.g. if the switch is a “normally ON” transistor), turning the switch to the OFF state may include applying a voltage to a transistor terminal, and in some embodiments (e.g. if the switch is a “normally OFF” transistor), turning the switch to the OFF state may include ceasing to apply a voltage to a transistor terminal. At step 604, the controller waits to receive a command to turn the switch back to the ON position. Generally, once an unsafe condition has been resolved, a system control device may provide a signal indicating that it is safe to reconnect PV generators and to resume providing power. In some embodiments, at step 604 the controller may independently determine that it is safe to return the switch to the ON position (e.g., due to a sensor reporting that the unsafe condition is no longer present).

At step 605, the controller determines if a command (or, in some embodiments, a self-determination) to turn the switch to the ON state has been received. If no such command (or determination) has been received, the controller carrying out method 600 returns to step 604. If a command (or, in some embodiments, a self-determination) to turn the switch to the ON state has been received, the controller carrying out method 600 proceeds to step 606, turns the switch back to the ON state (e.g. by applying a voltage to a transistor node, or removing an applied voltage from a transistor node) and returns to step 601.

An auxiliary circuit for providing continuous power supply to a safety switch according to embodiments disclosed herein may be variously implemented. Auxiliary power circuits may provide power for operating a safety switch under varying conditions and at various times. For example, auxiliary power circuits may provide operational power to a safety switch at three times: at initial startup (i.e. when the system comprising a safety switch is first deployed), at steady-state ON time (i.e. when the system is up and running, during normal operating conditions, when the switch is ON), and at steady-state OFF time (i.e. when the system is up and running, during a potentially unsafe condition, when the switch is OFF).

Figure 7B:
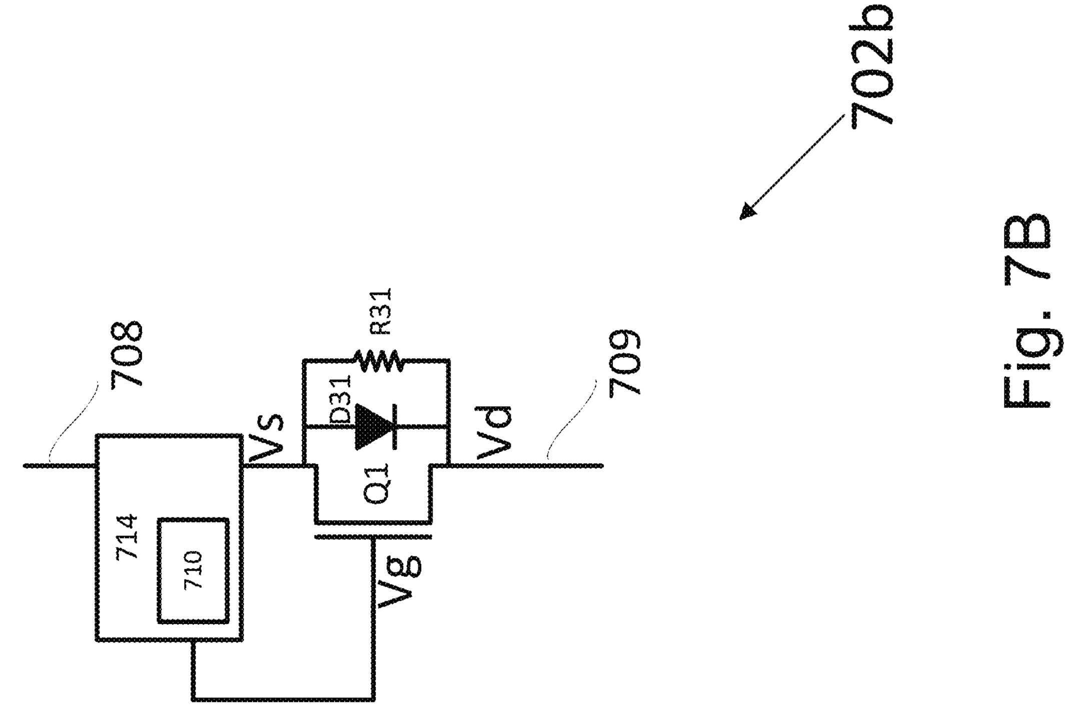
FIGS. 7A-7C illustrate circuits for providing operational power to a safety switch according to various aspects of the present disclosure.
Figure 7A:
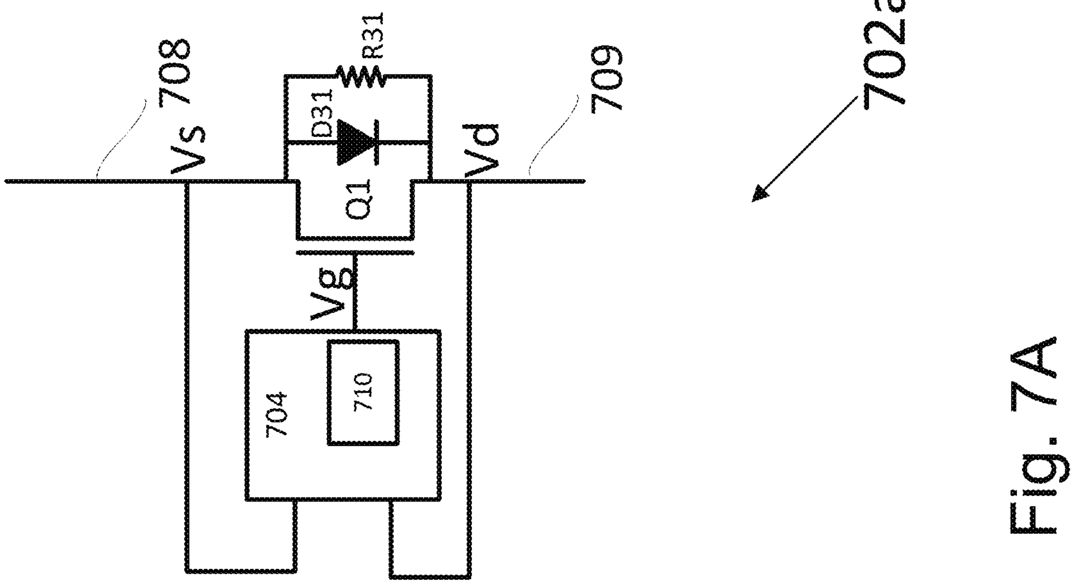

Reference is now made to FIG. 7A, which illustrates a safety switch 702*a* comprising an auxiliary power circuit according to illustrative embodiments. Safety switch 702*a* may comprise conductors 708 and 709, transistor Q1, controller 710 and auxiliary power circuit 704. Safety switch 702*a* may further comprise a communication device similar to or the same as communication device 305 of FIG. 3 (not explicitly depicted, to reduce visual noise). Transistor Q1 may be similar to or the same as transistor Q1 described with regard to FIG. 3, resistor R31 may be the same as R31 of FIG. 3, diode D31 may be the same as D31 of FIG. 3, controller 710 may be similar to or the same as controller 303 of FIG. 3, and conductors 708 and 709 may be similar to or the same as conductors 308 and 309, respectively, of FIG. 3.

Auxiliary power circuit 704 may be coupled in parallel to transistor Q1. A first input of auxiliary power circuit 704 may be coupled to conductor 708, and a second input of auxiliary power circuit 704 may be coupled to conductor 709.

In some embodiments, auxiliary power circuit 704 may comprise analog circuitry configured to provide an appropriate control signal to transistor Q1. In some embodiments, auxiliary power circuit 704 may provide power to controller 710, with controller 710 configured to provide a control signal to transistor Q1.

Reference is now made to FIG. 7B, which illustrates a safety switch 702*b* comprising an auxiliary power circuit according to illustrative embodiments. Safety switch 702*b* may comprise conductors 708 and 709, transistor Q1, controller 710 and auxiliary power circuit 714. Safety switch 702*b* may further comprise a communication device similar to or the same as communication device 305 of FIG. 3 (not explicitly depicted, to reduce visual noise). Transistor Q1 may be similar to or the same as transistor Q1 described with regard to FIG. 3, resistor R31 may be the same as R31 of FIG. 3, diode D31 may be the same as D31 of FIG. 3, controller 710 may be similar to or the same as controller 303 of FIG. 3, and conductors 708 and 709 may be similar to or the same as conductors 308 and 309, respectively, of FIG. 3.

Auxiliary power circuit 714 may be coupled in series with transistor Q1. A first input of auxiliary power circuit 714 may be coupled to conductor 708, and a second input of auxiliary power circuit 704*a* may be coupled to transistor Q1.

Figures 7C, 7D:
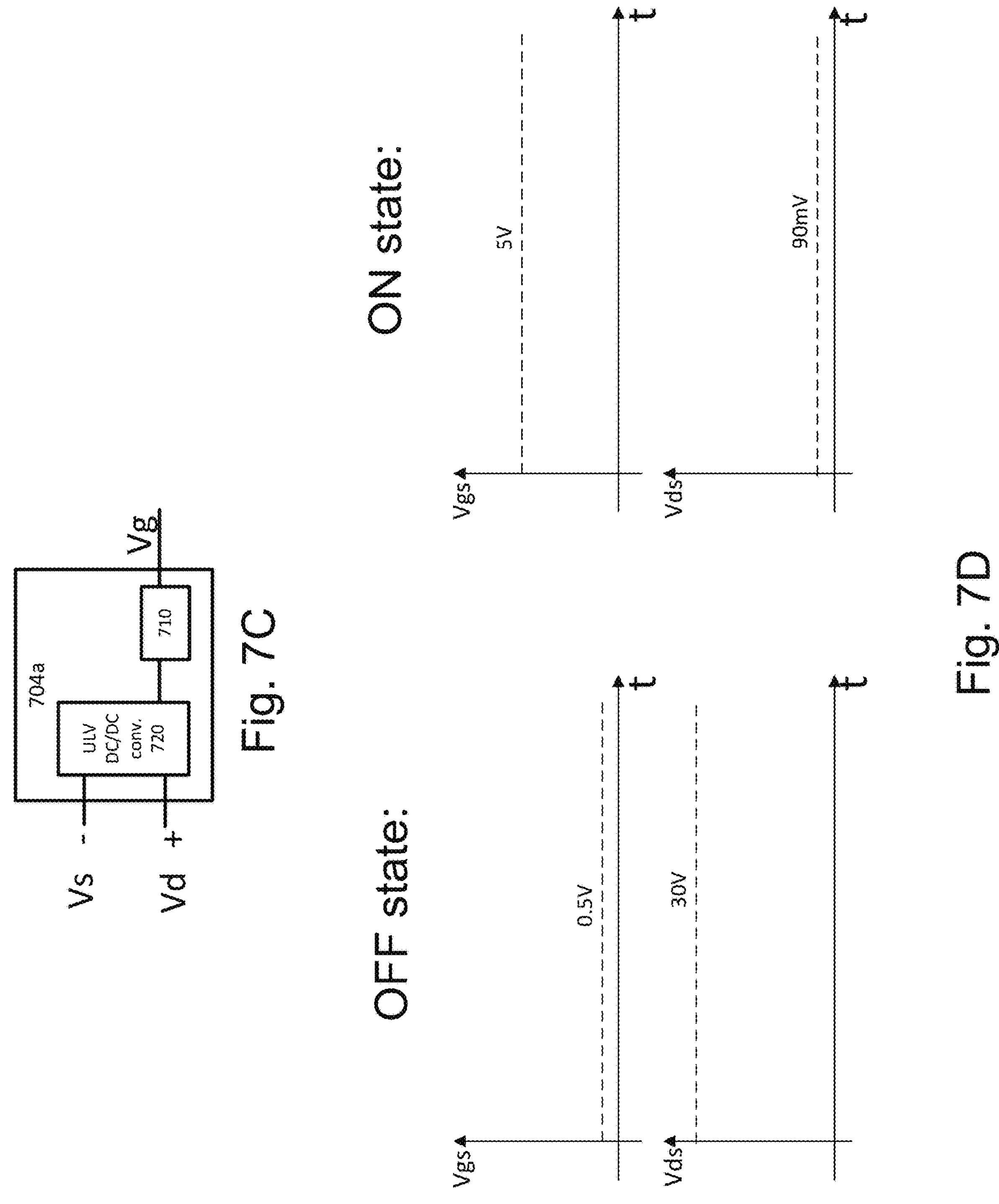
FIG. 7D illustrates a timing diagram depicting some of the operational parameters of a safety switch according to various aspects of the present disclosure.

Reference is now made to FIG. 7C, which depicts an auxiliary power circuit according to illustrative embodiments. Auxiliary power circuit 704*a* may be used as auxiliary power circuit 704 of FIG. 7A. A first input to auxiliary power circuit 704*a* may be coupled to the source terminal of a transistor (e.g. Q1 of FIG. 7A), and a second input to auxiliary power circuit 704*a* may be coupled to the drain terminal of a transistor. An output of auxiliary power circuit 704*a* may be coupled to the gate terminal of a transistor. Auxiliary power circuit 704*a* may comprise Ultra Low Voltage Direct-Current to Direct Current (DC/DC) converter (ULVC) 720. Controller 710 may be an analog or digital controller, and may be similar to controller 303 of FIG. 3. Controller 710 may be integrated with or separate from auxiliary power circuit 304*a*. In some embodiments, an output of ULVC 720 may be coupled to an input of controller 710, with controller 710 applying a voltage to the gate of a transistor. ULVC 720 may be configured to receive a very low voltage (e.g. tens or hundreds of millivolts) at its input, and output a substantially larger voltage (e.g. several volts). ULVC 720 may be variously implemented. In some embodiments, ULVC may comprise an oscillator charge pump and/or several conversion stages. Variations of illustrative circuits found in "0.18-V Input Charge Pump with Forward Body Biasing in Startup Circuit using 65 nm CMOS" (P. H. Chen et. al., ©IEEE 2010), "Low voltage integrated charge pump circuits for energy harvesting applications" (W. P. M. Randhika Pathirana, 2014) may be used as or as part of ULVC 720.

Reference is now made to FIG. 7D, which shows a timing diagram for operating auxiliary power circuit 704*a* of FIG. 7C according to an illustrative embodiment. As a numerical example, auxiliary power circuit 704*a* may be coupled as described above to the terminals of a MOSFET. ULVC 720 may be coupled between the source (Vs) and drain (Vd) terminals of the MOSFET. When the MOSFET is in the OFF position, the voltage drop between terminals Vs and Vd may be substantial, e.g. close to the open-circuit voltage of a PV generator. When the MOSFET is in the OFF position, ULVC 720 may be bypassed or disabled, with the substantial voltage drop between terminals Vs and Vd processed to provide power to controller 710. Controller 710 may hold the voltage between the MOSFET gate and source terminals to a low value, (e.g. 0V or 1V, under a minimum source-gate threshold of 2V), maintaining the MOSFET in the OFF position.

Still referring to FIG. 7D, controller 710 may receive a command via a communication circuit (not explicitly depicted) to turn the MOSFET to the ON state. Controller 710 may increase the gate-to-source voltage to about 5V. In illustrative PV systems, the current flowing through a PV string at certain points of operation may be about 10 A. At a gate-to-source voltage of 5V and drain-to-source current of 10 A, the drain-to-source voltage may be about 90 mV. ULVC 720 may boost the drain-to-source voltage of 90 mV to a voltage of several volts or more (e.g. 5V, 10V, 12V or 20V) for powering controller 710. Controller 710 may continuously hold the gate-to-source voltage at about 5V until a command is received to turn the MOSFET OFF. In some embodiments, the MOSFET is turned OFF at the end of every day, i.e. when PV generators cease producing significant power due to nightfall. When it is time to turn the MOSFET OFF, controller may decrease the gate-to-source voltage back to about 0V or 1V.

Operating auxiliary power circuit 704*a* according to the illustrative timing diagrams of FIG. 7D may provide several advantages. For example, the steady-state power consumed by safety switch 702*a* using auxiliary power circuit 704*a* may be low, in this illustrative example, 90 mV*10 A=900 mW when in the ON position, and 30V*10 uA=0.3 mW when in the OFF position. Furthermore, the steady-state voltage across safety switch 702*a* may be substantially constant when in the ON position (e.g. 90 mV).

Figures 7E, 7F:
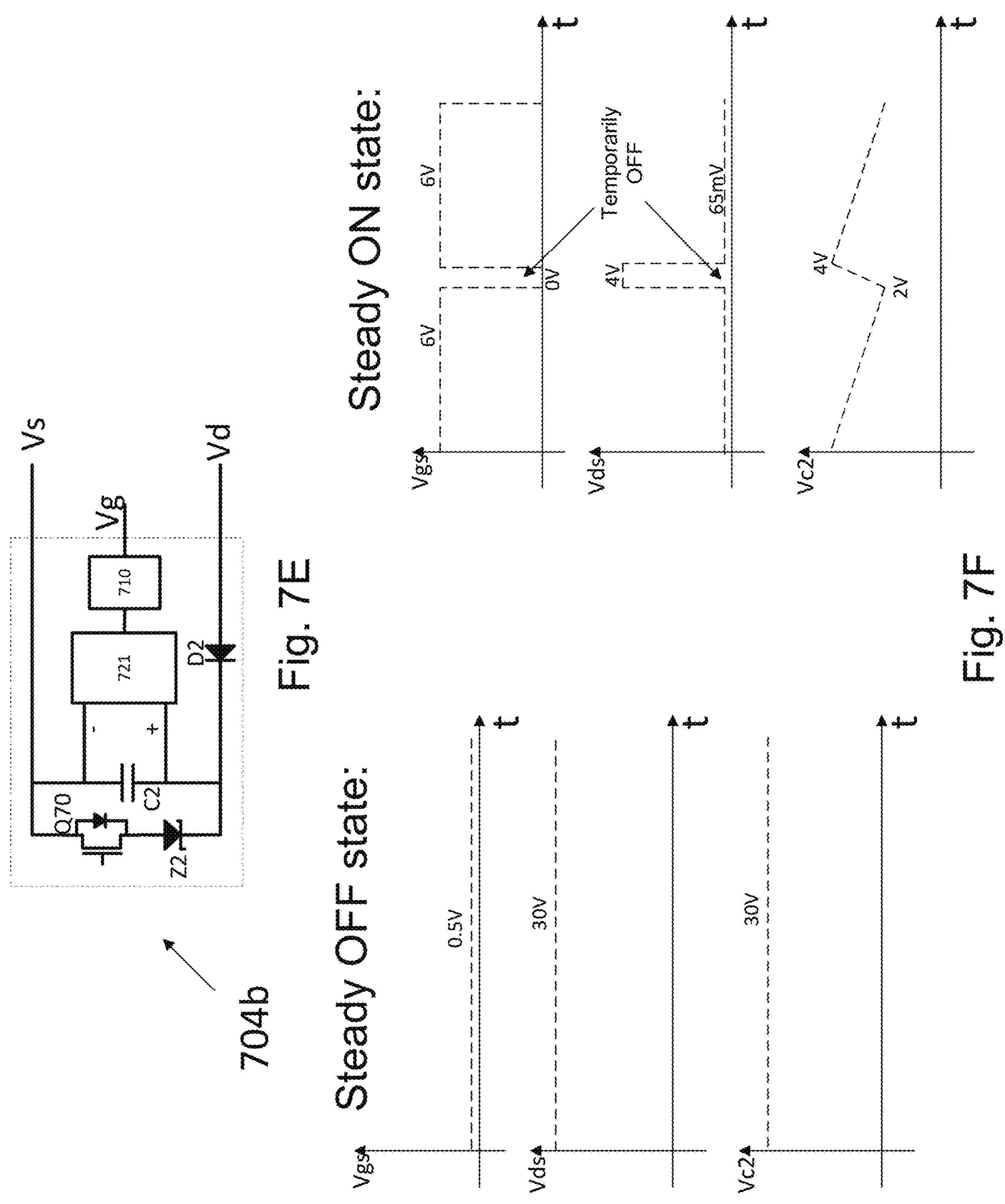
FIG. 7E illustrates a circuit for providing operational power to a safety switch according to various aspects of the present disclosure.
FIG. 7F illustrates a timing diagram depicting some of the operational parameters of a safety switch according to various aspects of the present disclosure.

Reference is now made to FIG. 7E, which depicts an auxiliary power circuit according to illustrative embodiments. Auxiliary power circuit 704*b* may be used as auxiliary power circuit 704 of FIG. 7A. A first input to auxiliary power circuit 704*b* may be coupled to the source terminal of a transistor (e.g. Q1 of FIG. 7A), and a second input to auxiliary power circuit 704*b* may be coupled to the drain terminal of a transistor. An output of auxiliary power circuit 704*b* may be coupled to the gate terminal of a transistor. Auxiliary power circuit 704*b* may comprise capacitor C2, diode D2, diode Z2, transistor Q70 and DC-to-DC converter 721. In some embodiments, capacitor C2 may be replaced by a different charge device (e.g. a battery). Controller 710 may be analog or digital, and may be similar to controller 303 of FIG. 3. Controller 710 may be integrated with or separate from auxiliary power circuit 304*a*. Diode Z2 may be a Zener diode designed to limit and hold a reverse-bias voltage to a predetermined value. In this illustrative embodiment, diode Z2 is assumed to have a reverse-bias voltage of 4V. A first input to auxiliary power circuit 704*b* may be coupled to the source terminal of a transistor (e.g. Q1 of FIG. 7A), and a second input to auxiliary power circuit 704*b* may be coupled to the drain terminal of a transistor (e.g. Q1). An output of auxiliary power circuit 704*b* may be coupled to the gate terminal of a transistor (e.g. Q1). In some embodiments, an output of converter 721 may be coupled to an input of controller 710, with controller 710 applying a voltage to the gate of a transistor. Converter 721 may be configured to receive a voltage of several volts (e.g. between 3V-10V) at its input, and output a voltage for powering controller 710 or controlling the gate voltage of a transistor gate terminal.

The anode of diode D2 may be coupled to a transistor drain terminal (Vd), and the cathode of diode D2 may be coupled to the cathode of diode Z2 and a first terminal of capacitor C2. The anode of diode Z2 may be coupled to a drain terminal of transistor Q70, with the source terminal of transistor Q70 coupled to a transistor source terminal (Vs) and to a second terminal of capacitor C2. The gate voltage of transistor Q70 may be controlled by controller 710 (the control line is not explicitly depicted). The inputs of converter 721 may be coupled in parallel with capacitor C2.

Auxiliary power circuits 704*a-b* and 714 may be operated to provide a voltage drop across the terminals of safety switch 702 according to safety and effective system operation requirements. The drain-to-source voltage may be desired to be low during normal system operation, when safety switch 702 is in the "steady ON state", i.e. when the switch provides a low-impedance path for photovoltaic power to flow through a PV string. When safety switch 702 is in a "steady OFF state", safety switch 702 may be required to provide a drain-to-source voltage of about an open-circuit voltage of a PV generator without providing a low-impedance path for current flow.

Referring back to FIG. 7E, controller 710 may operate transistor Q70 and transistor Q1 of FIG. 7A to provide a voltage drop across the terminals of safety switch 702 according to safety and effective system operation requirements. In the "steady OFF state", transistors Q1 and Q70 may be held in the OFF state. In the "steady ON state" transistor Q1 may be ON, providing a low impedance path between the drain and source terminals, and transistor Q70 may be either ON or OFF. It may be desirable during the "steady ON state" to temporarily move Q1 to the "temporarily OFF state" for a short period of time, to allow capacitor C2 to recharge and continue providing operational power to controller 710. In the "temporarily OFF" state, transistor Q1 may be OFF and transistor Q70 may be ON. Diode Z2 may provide a limited charging voltage (e.g. 4V) across the terminals of capacitor C2, with capacitor C2 providing a current path for the current of a PV string.

Reference is now made to FIG. 7F, which shows a timing diagram for operating auxiliary power circuit 704*b* of FIG. 7E according to an illustrative embodiment. As a numerical example, auxiliary power circuit 704*a* may be coupled as described above to the terminals of a MOSFET. Converter 721 may be coupled between the source (Vs) and drain (Vd) terminals of the MOSFET. When the MOSFET is in the steady-OFF-state, the voltage drop between terminals Vs and Vd may be substantial, e.g. close to the open-circuit voltage of a PV generator. When the MOSFET is in the steady-OFF-state, converter 721 may be bypassed or disabled, with the substantial voltage drop between terminals Vs and Vd processed to provide power to controller 710. In some embodiments, when the MOSFET is in the steady-OFF-state, converter 721 may process the drain-to-source voltage to provide power to controller 710. Controller 710 may hold the voltage between the MOSFET gate terminal and source terminals to a low value, (e.g. 0V or 1V, under a minimum source-gate threshold of 2V), maintaining the MOSFET in the OFF position. When the MOSFET is in the steady-OFF-state, capacitor C2 may be charged to about the voltage between the drain and source terminals. In some embodiments, diode Z2 may be disconnected (e.g. by turning Q70 to the OFF state), to increase the drain-to-source voltage when the MOSFET is in the steady-OFF-state. In some embodiments, having a large drain-to-source voltage (e.g. about the same voltage as a PV generator open-circuit voltage) when the MOSFET is in the steady-OFF-state increases system safety by decreasing the total voltage across a PV generator and an accompanying safety switch.

Still referring to FIG. 7F, controller 710 may receive a command via a communication circuit (not explicitly depicted) to turn the MOSFET to the ON state. Controller 710 may increase the gate-to-source voltage of Q1 to about 6V. In illustrative PV systems, the current flowing through a PV string at certain points of operation may be about 10 A. At a gate-to-source voltage of 6V and drain-to-source current of 10 A, the drain-to-source voltage may be about 65 mV. Diode D2 might not be forward biased (e.g., if diode has a forward voltage of 0.6V, a drain-to-source voltage of 65 mV might not forward-bias diode D2), disconnecting capacitor C2 from the drain terminal. Capacitor C2 may slowly discharge by providing power to converter 721. Converter 721 may include circuitry (e.g. analog comparators) to monitor the voltage across capacitor C2, and may respond to the voltage across capacitor C2 falling below a first threshold. If the voltage across capacitor falls below the first threshold, controller 710 may reduce the gate-to-source voltage to about 0V or 1V, resulting in the MOSFET moving to the OFF state. Diode D2 may then become forward-biased, and diode Z2 may limit the drain-to-source voltage to a second threshold. Transistor Q70 may be held in the ON state, allowing diode Z2 to regulate the drain-to-source voltage. Capacitor C2 may then be rapidly charged back to about the voltage level of the second threshold, with controller 710 configured to increase the gate-to-source voltage back to 6V when capacitor C2 reaches the second threshold voltage. This iterative process may repeat itself while the MOSFET is operating in a "steady ON state" mode. In the illustrative embodiment illustrated in FIG. 7F, the first threshold is 2V, and the second threshold is 4V. The voltage across capacitor C2 varies between the two levels, with the gate-to-source voltage alternating between about 0V and about 6V, and the drain-to-source voltage alternating between 4V and 65 mV.

Operating auxiliary power circuit 704*b* according to the illustrative timing diagrams of FIG. 7F may provide several advantages. For example, a converter designed to receive an input voltage between 2-30V (e.g. converter 721) may be cheap, efficient and easy to implement. In some embodiments, additional zener diodes may be coupled in series with diode Z2, increasing the first voltages. Increasing the first threshold voltage (e.g. to 10V, 15V or 20V, respectively) may provide advantages such as decreasing the frequency of charge-discharge cycles over capacitor C2, and may provide a voltage to converter 721 which may be easier to process.

It is to be understood that illustrative operating points comprising MOSFET drain-to-source voltages of 65 mV and 90 mV, MOSFET gate-to-source voltages of 5V and 6V, and MOSFET drain-to-source currents of 10A are used for illustrative purposes and are not intended to be limiting of operating points used in conjunction with illustrative embodiments disclosed herein. In some embodiments, multiple MOSFET transistors may be parallel-coupled to reduce ON-state resistance, thereby reducing the drain-to-source voltage across MOSFETs when in the ON state. For example, coupling five MOSFETs in parallel may reduce a drain-to-source ON-state voltage from 65 mV to 15 mV.

Figure 7G:
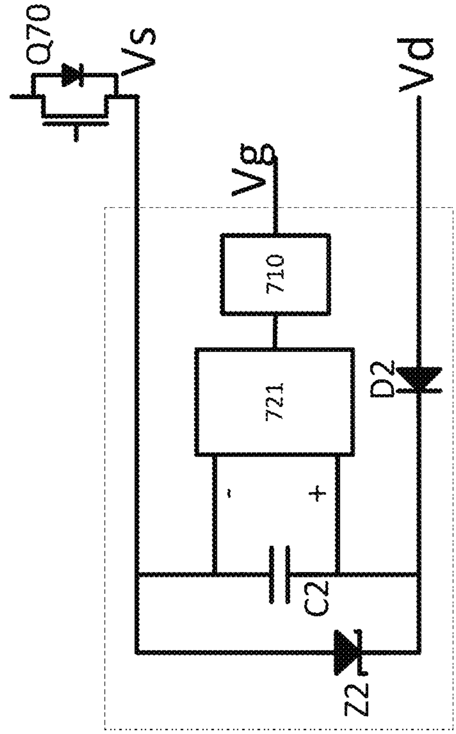
FIG. 7G illustrates a circuit for providing operational power to a safety switch according to various aspects of the present disclosure.
Figure 7G:
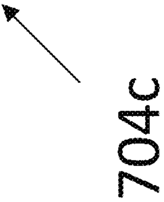

Reference is now made to FIG. 7G, which depicts an auxiliary power circuit according to illustrative embodiments. Auxiliary power circuit 704*c* may be used as auxiliary power circuit 704 of FIG. 7A. Auxiliary power circuit 704*c* may be similar to auxiliary power circuit 704*b*, with a modification in that the anode of diode Z2 is coupled to the drain terminal of transistor Q1 (Vs), and that the drain terminal of transistor Q70 is also coupled to the source terminal of transistor Q1 (Vs). When safety switch 702 is in the "steady ON state", transistors Q1 and Q70 may be ON, providing a low impedance path for PV string current. When safety switch 702 is in the "steady OFF state", transistors Q1 and Q70 may be OFF, preventing a low impedance path for a PV string current, and providing a substantial voltage drop across the terminals of safety switch 702 (e.g. about the same voltage or a slightly lower voltage than a PV-generator open-circuit voltage). When safety switch 702 is in the "temporarily OFF state", transistor Q1 may be OFF and transistor Q70 may be ON, diode Z2 providing a charging voltage to capacitor C2 and Q70 providing a low-impedance current path for a PV string current.

Figure 7H:
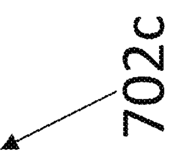
FIG. 7H illustrates a circuit for providing operational power to a safety switch according to various aspects of the present disclosure.
Figure 7H:
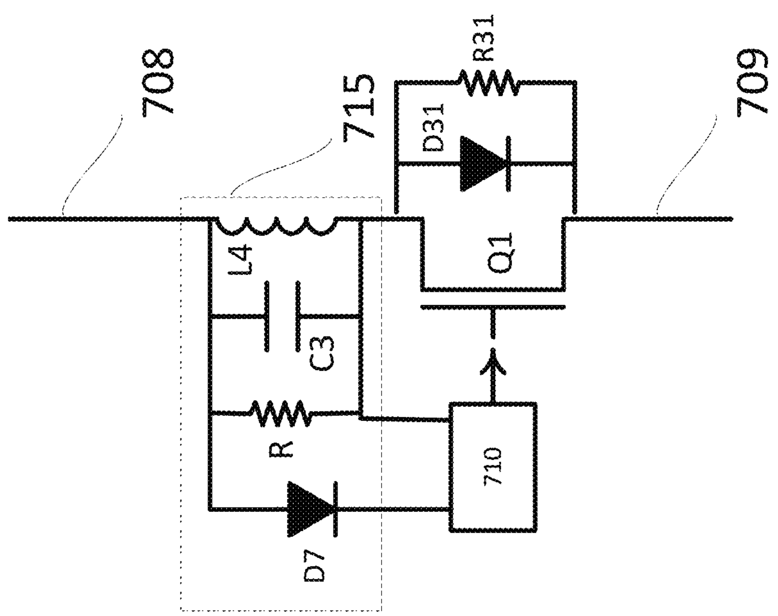

Reference is now made to FIG. 7H, which illustrates a safety switch comprising an auxiliary power circuit according to illustrative embodiments. Safety switch 702*c* may comprise conductors 708 and 709, transistor Q1, controller 710 and auxiliary power circuit 715. Auxiliary power circuit 715 may be used auxiliary power circuit 714 of FIG. 7B. In this illustrative embodiment, auxiliary power circuit 715 may double as a power line communication (PLC) device. Inductor L4, capacitor C3 and resistor R may be coupled in parallel, with a first node of inductor L4 coupled to conductor 708, and a second node of inductor L4 coupled to the source terminal of transistor Q1. The values of inductor L4 and capacitor C3 may be selected to resonate at a resonant frequency (e.g. 60 kHz).

Still referring to FIG. 7H, an external device (e.g. system power device 110 of FIG. 1) may transmit a PLC high-frequency alternating current signal (e.g. using frequency shift keying, amplitude modulation or other modulation schemes) over conductor 708. The PLC signal may induce a high-frequency alternating-current voltage drop across the terminals of resistor R, with diode D7 providing a voltage to controller 710 when the voltage across resistor R is positive (i.e. the voltage at conductor 708 is higher than the voltage at the source terminal of transistor Q1). In some embodiments, diode D7 may be replaced by a "full bridge" of diodes providing a voltage to controller 710 when the voltage across R is nonzero (either positive or negative). In some embodiments, the PLC-induced voltage across resistor R may serve a dual purpose. The PLC signal may provide operational information to controller 710 by varying the voltage drop across resistor R. Additionally, in some embodiments, the PLC signal may provide operational power to controller 710. Controller 710 may draw power from the resonant circuit comprising resistor R, capacitor C3 and inductor L4, and use the drawn power to set the state of transistor Q1.

Implementing auxiliary power circuit 715 as illustrated in FIG. 7H may provide certain advantages. For example, auxiliary power circuit 715 of FIG. 7H may double as a communication device, reducing the total component count in safety switch 702*c*. Furthermore, integrating control and power signals may reduce the complexity required to program controller 710. For example, an 'ON' signal may be broadcast by a system controller at a high power, and an 'OFF' signal may be broadcast by a system controller at low power. Auxiliary power circuit 715 may directly apply the converted power signal to the gate of transistor Q1, wherein the power of the 'ON' signal may be sufficient to hold Q1 in the ON state, and the power of the 'OFF' signal might not be sufficient to hold Q1 in the ON state.

Elements of auxiliary power circuits 704*a*, 704*b* and 715 may be variously combined. For example, auxiliary power circuit 714 of FIG. 7B may be added to safety switch 702*a* of FIG. 7A, auxiliary power circuit 714 functioning as a PLC circuit as well as being configured to provide power to controller 710 in case of a malfunction in auxiliary power circuit 704. In some embodiments, auxiliary power circuit 714 may provide initial power to controller 710 at system setup, with auxiliary power circuit 704 providing power to controller 710 during "steady state" operation.

Figure 7I:
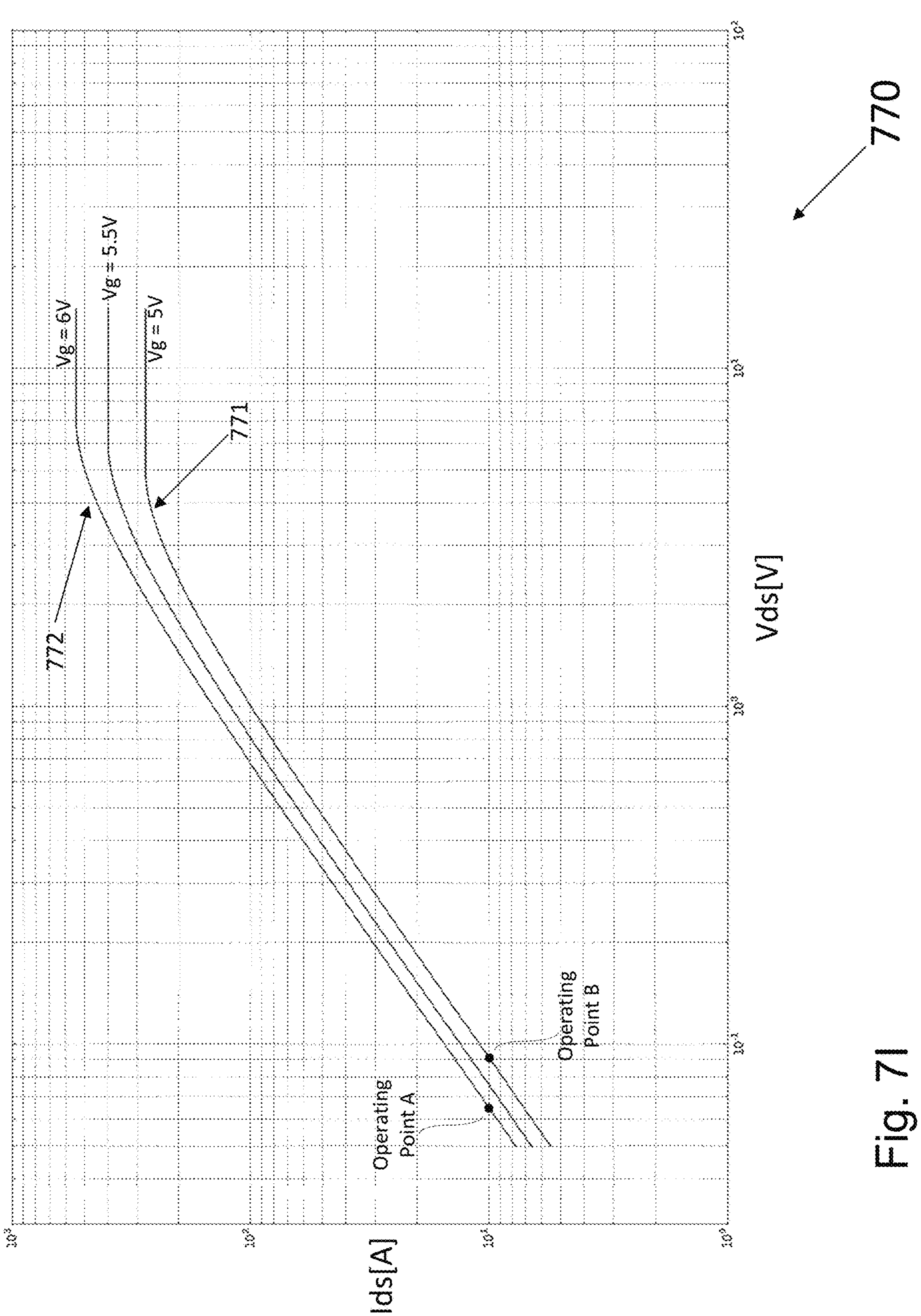
FIG. 7I illustrates part of an illustrative datasheet indicating possible operating points for operating a transistor according to various aspects of the present disclosure.

Reference is now made to FIG. 7I, which illustrates part of a MOSFET datasheet according to an illustrative embodiment. Plot 770 may depict relationships between drain-to-source voltage and drain-to-source current through a MOSFET. Curve 771 may depict a current-voltage relationship when the gate-to-source voltage applied to a MOSFET is 5V. Curve 771 may depict a current-voltage relationship when the gate-to-source voltage applied to a MOSFET is 6V. Operating point A may indicate that when a gate-to-source voltage applied to a MOSFET is 6V and the drain-to-source current flowing through the MOSFET is 10 A, the drain-to-source voltage across the MOSFET is about 65 mV. This may correspond to a possible operating point for a MOSFET operated according to FIG. 7F. Operating point B may indicate that when a gate-to-source voltage applied to a MOSFET is 5V and the drain-to-source current flowing through the MOSFET is 10 A, the drain-to-source voltage across the MOSFET is about 90 mV. This may correspond to a possible operating point for a MOSFET operated according to FIG. 7D. As noted above, these operating points are illustrative only, and may adapted by connected multiple MOSFETs in parallel to obtain new operating points.

Figure 8:
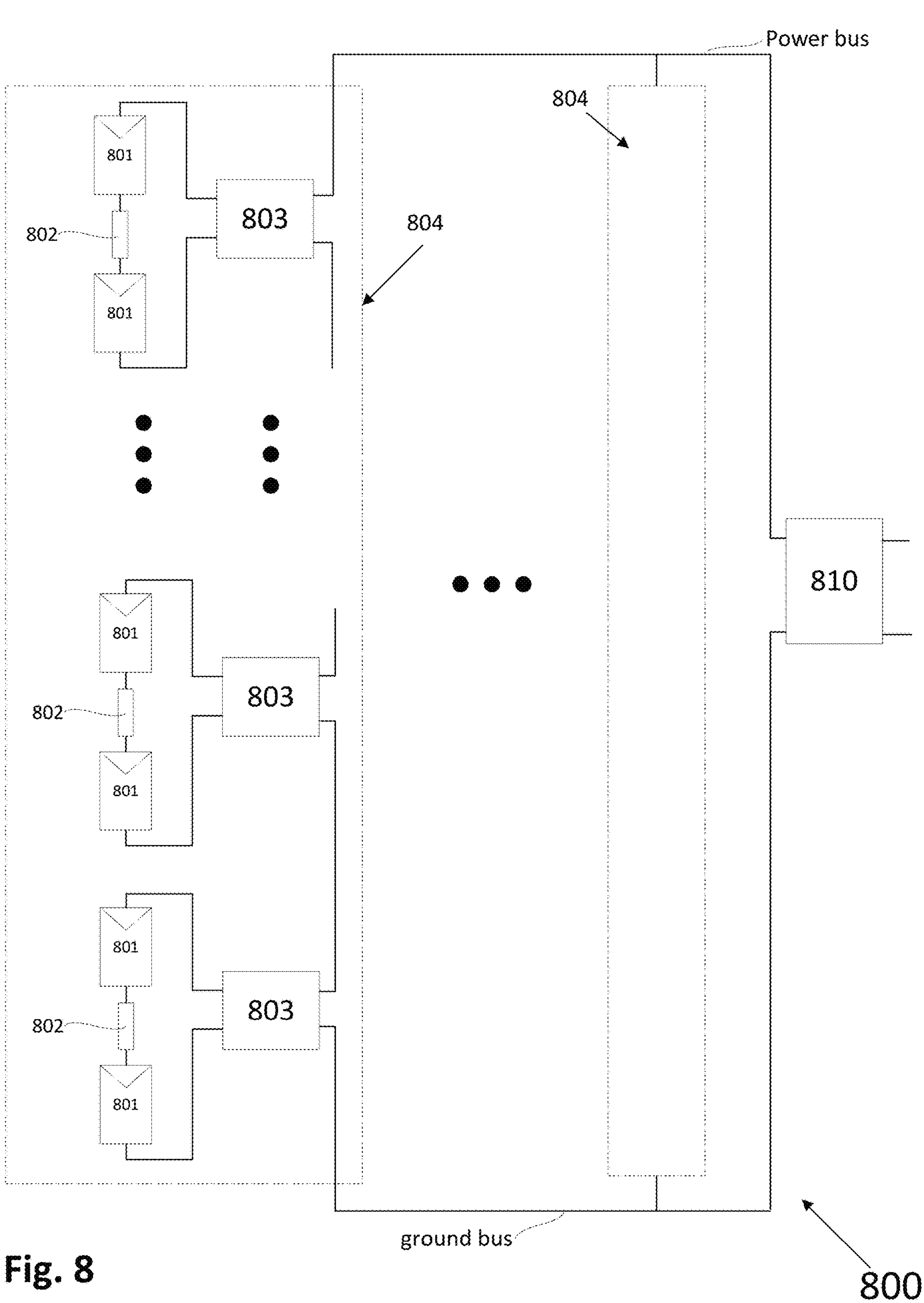
FIG. 8 illustrates a photovoltaic system configuration according to various aspects of the present disclosure.

Reference is now made to FIG. 8, which shows a photovoltaic (PV) system according to illustrative embodiments. PV system 800 may comprise a plurality of PV strings 804 coupled in parallel between a ground bus and a power bus. Each of PV strings 804 may comprise a plurality of photovoltaic generators 801, a plurality of safety switches 802 and a plurality of PV power devices 803. PV generators 801 may be similar to or the same as PV generators 101 of FIG. 1A, and safety switches 802 may be similar to or the same as safety switch 102 of FIG. 1A, safety switch 302 of FIG. 3 and/or safety switches 702*a*-702*c* of FIGS. 7A-7C.

In some embodiments, the power and ground buses may be input to system power device 810. In some embodiments, system power device 810 may include a DC/AC inverter and may output alternating current (AC) power to a power grid, home or other destinations. In some embodiments, system power device 810 may comprise a combiner box, transformer and/or safety disconnect circuit. For example, system power device 810 may comprise a DC combiner box for receiving DC power from a plurality of PV strings 804 and outputting the combined DC power. In some embodiments, system power device 810 may include a fuse coupled to each PV string 804 for overcurrent protection, and/or one or more disconnect switches for disconnecting one or more PV strings 804. In some embodiments, system power device 810 may comprise a system controller (e.g. a Digital Signal Processor (DSP), Application-Specific Integrated Circuit (ASIC) and/or a Field Programmable Gate Array (FPGA)) for providing commands to and receiving data from PV power devices 803 and safety switches 802.

Each safety switch 802 may be coupled between a first output of a first PV generator and a second output of a second output generator, and each PV power device may have two input terminals: a first input terminal coupled to the second output of the first PV generator, and a second input terminal coupled to the first output of the second PV generator. In this "two-to-one" arrangement, each pair of PV generators 801 are effectively coupled in series, with the combined voltage and power of the two PV generators provided to the input of PV power device 803. Each safety switch 802 is disposed between the two PV generators, for disconnecting the pair of PV generators in case of a potentially unsafe condition.

Some conventional PV installations feature a similar arrangement, with each pair of PV generators 801 directly connected to each other without a safety switch disposed in between the generators. In case of an unsafe condition, a PV power device 803 may stop drawing power from the PV generators, resulting in an open-circuit voltage at the PV power device input terminals which is about double the open-circuit voltage of each PV power generator. This voltage may, in some systems, be as high as 80, 100 or even 120 volts, which may be higher than the allowed safe voltage defined by safety regulations.

By operating safety switches 802 according to apparatuses and methods disclosed herein, in case of an unsafe condition (e.g. detected by system power device 810, a PV power device 803 and/or a safety switch 802), one or more safety switches 802 may move to the OFF state, reducing the voltage drop between the input terminals of each PV power device 803 to about 40-60 volts, which may be an adequately safe voltage level.

Each PV power device 803 may receive power from two photovoltaic generators 801 coupled to the inputs of PV power device 803, and may provide the combined power of the two photovoltaic generators at the outputs of PV power device 803. The outputs of a plurality of PV power devices 803 may be coupled in series to form a PV string 804, with a plurality of PV strings 804 coupled in parallel to provide power to system power device 810.

While FIG. 8 illustrates an arrangement wherein two PV generators 801 are coupled in parallel to each PV power device 803, various arrangements can be easily obtained. For example, each PV power device receive power from three or more serially-connected PV generators 801, with safety switches 802 disposed between the PV generators. In some embodiments, some PV power devices 803 may receive power from a single PV generator 801, some PV power devices may receive power from two PV generators 801, and some PV power devices may receive power from more than two PV generators 801. In some embodiments, PV power devices 803 may receive power from multiple parallel-connected serial strings of PV generators 801, with safety switches 802 disposed in the serial strings. Embodiments disclosed herein include the aforementioned modifications, and other modifications which will be evident to one of ordinary skill in the art.

Reference is now made to FIG. 9, which illustrates circuitry which may be found in a power device such as power device 903, according to an illustrative embodiment. PV power device 903 may be similar to or the same as PV power device 803 of FIG. 8. In some embodiments, PV power device 903 may include power converter 900. Power converter 900 may comprise a direct current-direct current (DC/DC) converter such as a Buck, Boost, Buck/Boost, Buck+Boost, Cuk, Flyback and/or forward converter. In some embodiments, power converter 900 may comprise a direct current-alternating current (DC/AC) converter (also known as an inverter), such a micro-inverter. Power converter 900 may have two input terminals and two output terminals, which may be the same as the input terminals and output terminals of PV power device 903. In some embodiments, PV power device 903 may include Maximum Power Point Tracking (MPPT) circuit 906, configured to extract increased power from a power source the power device is coupled to. In some embodiments, power converter 900 may include MPPT functionality. In some embodiments, MPPT circuit 906 may implement impedance matching algorithms to extract increased power from a power source the power device is coupled to Power device 903 may further comprise controller 905 such as a microprocessor, Digital Signal Processor (DSP), Application-Specific Integrated Circuit (ASIC) and/or a Field Programmable Gate Array (FPGA).

Still referring to FIG. 9, controller 905 may control and/or communicate with other elements of power device 903 over common bus 920. In some embodiments, power device 903 may include circuitry and/or sensors/sensor interfaces 904 configured to measure parameters directly or receive measured parameters from connected sensors and/or sensor interfaces 904 configured to measure parameters on or near the power source, such as the voltage and/or current output by the power source and/or the power output by the power source. In some embodiments the power source may be a PV generator comprising PV cells, and a sensor or sensor interface may directly measure or receive measurements of the irradiance received by the PV cells, and/or the temperature on or near the PV generator.

Still referring to FIG. 9, in some embodiments, power device 903 may include communication device 911, configured to transmit and/or receive data and/or commands from other devices. Communication device 911 may communicate using Power Line Communication (PLC) technology, or wireless technologies such as ZigBee™, Wi-Fi, cellular communication or other wireless methods. In some embodiments, power device 903 may include memory device 909, for logging measurements taken by sensor(s)/sensor interfaces 904 to store code, operational protocols or other operating information. Memory device 909 may be flash, Electrically Erasable Programmable Read-Only Memory (EEPROM), Random Access Memory (RAM), Solid State Devices (SSD) or other types of appropriate memory devices.

Still referring to FIG. 9, in some embodiments, PV power device 903 may include safety devices 907 (e.g. fuses, circuit breakers and Residual Current Detectors). Safety devices 907 may be passive or active. For example, safety devices 907 may comprise one or more passive fuses disposed within power device 903 and designed to melt when a certain current flows through it, disconnecting part of power device 903 to avoid damage. In some embodiments, safety devices 907 may comprise active disconnect switches, configured to receive commands from a controller (e.g. controller 905, or an external controller) to disconnect portions of power device 903, or configured to disconnect portions of power device 903 in response to a measurement measured by a sensor (e.g. a measurement measured or obtained by sensors/sensor interfaces 904). In some embodiments, power device 903 may comprise auxiliary power circuit 908, configured to receive power from a power source coupled to power device 903, and output power suitable for operating other circuitry components (e.g. controller 905, communication device 911, etc.). Communication, electrical coupling and/or data-sharing between the various components of power device 903 may be carried out over common bus 920.

Still referring to FIG. 9, in some embodiments, PV power device 903 may comprise transistor Q9 coupled between the inputs of power converter 900. Transistor Q9 may be controlled by controller 905. If an unsafe condition is detected, controller 905 may set transistor Q9 to ON, short-circuiting the input to power converter 900. Transistor Q9 may be controlled in conjunction with safety switch 802 of FIG. 8. When safety switch 802 and transistor Q9 are OFF, each pair of PV generators 801 of FIG. 8 are disconnected, each PV generator providing an open-circuit voltage at its output terminals. When safety switch 802 and transistor Q9 are ON, each pair of PV generators 801 of FIG. 8 are connected and short-circuited, the pair of PV generators providing a voltage of about zero to power converter 900. In both scenarios, a safe voltage at all system locations may be maintained, and the two scenarios may be staggered to alternate between open-circuiting and short-circuiting PV generators. This mode of operation may allow continuous power supply to system control devices, as well as provide backup mechanisms for maintaining a safe voltage (i.e. in case a safety switch 802 malfunctions, operation of transistor Q9 may allow continued safe operating conditions).

Figure 10:
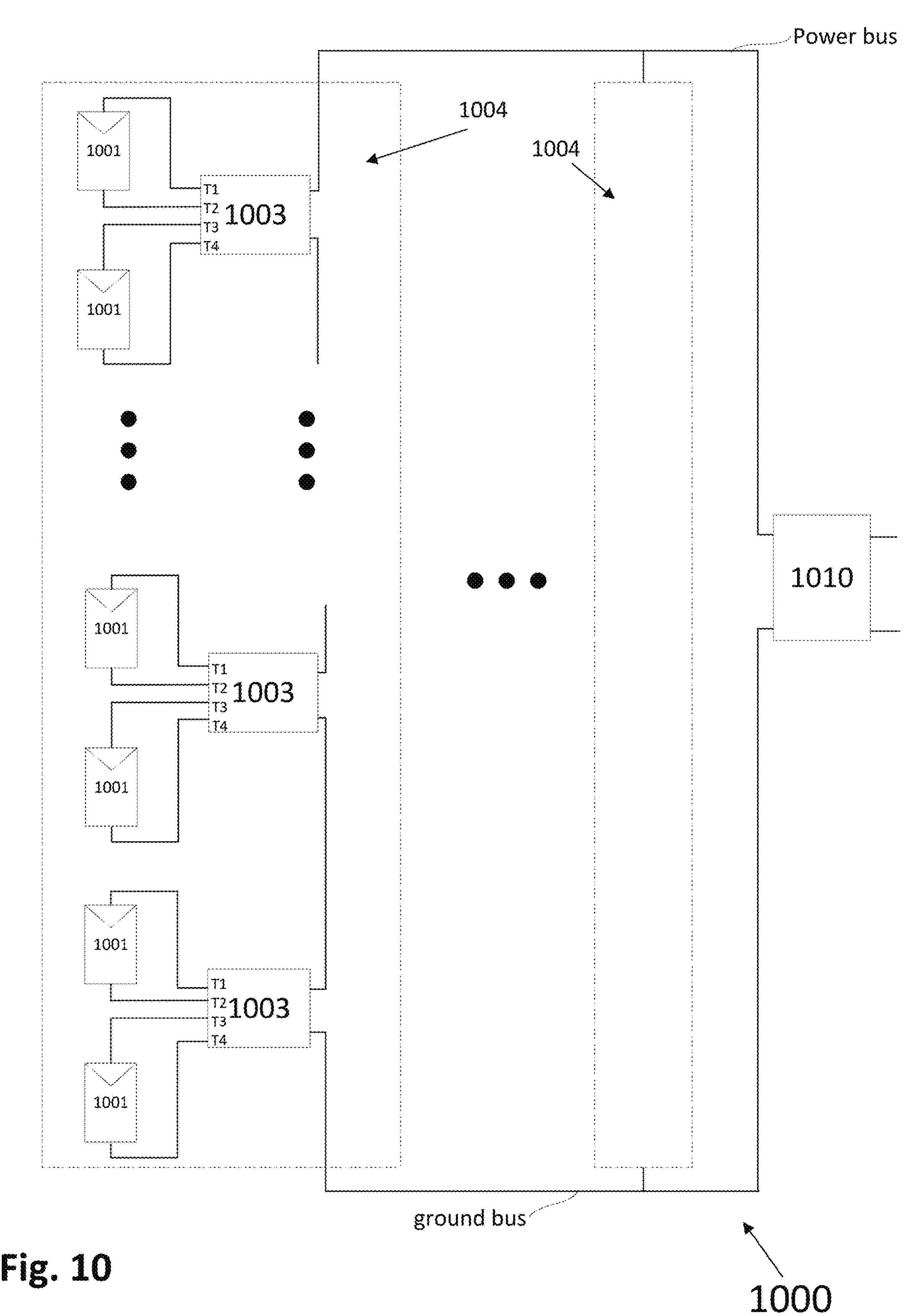
FIG. 10 illustrates a photovoltaic system configuration according to various aspects of the present disclosure.

Reference is now made to FIG. 10, which shows a photovoltaic (PV) system according to illustrative embodiments. PV system 1000 may comprise a plurality of PV strings 1004 coupled in parallel between a ground bus and a power bus. Each of PV strings 1004 may comprise a plurality of photovoltaic generators 1001 and a plurality of PV power devices 1003. PV generators 1001 may be similar to or the same as PV generators 801 of FIG. 8. In some embodiments, the power and ground buses may be input to system power device 1010, which may be similar to or the same as system power device 810 of FIG. 8.

Each of photovoltaic power devices 1003 may comprise four input terminals: T1, T2, T3 and T4. T1 and T2 may be coupled to and receive power from a first PV generator, and T3 and T4 may be coupled to and receive power from a second PV generator. In some embodiments, PV power device 1003 may be substantially the same as PV power device 803 of FIG. 8, with the addition of safety switch 802 integrated into PV power device 1003 and connected in between terminals T2 and T3 of PV power device 1003.

Figure 11B:
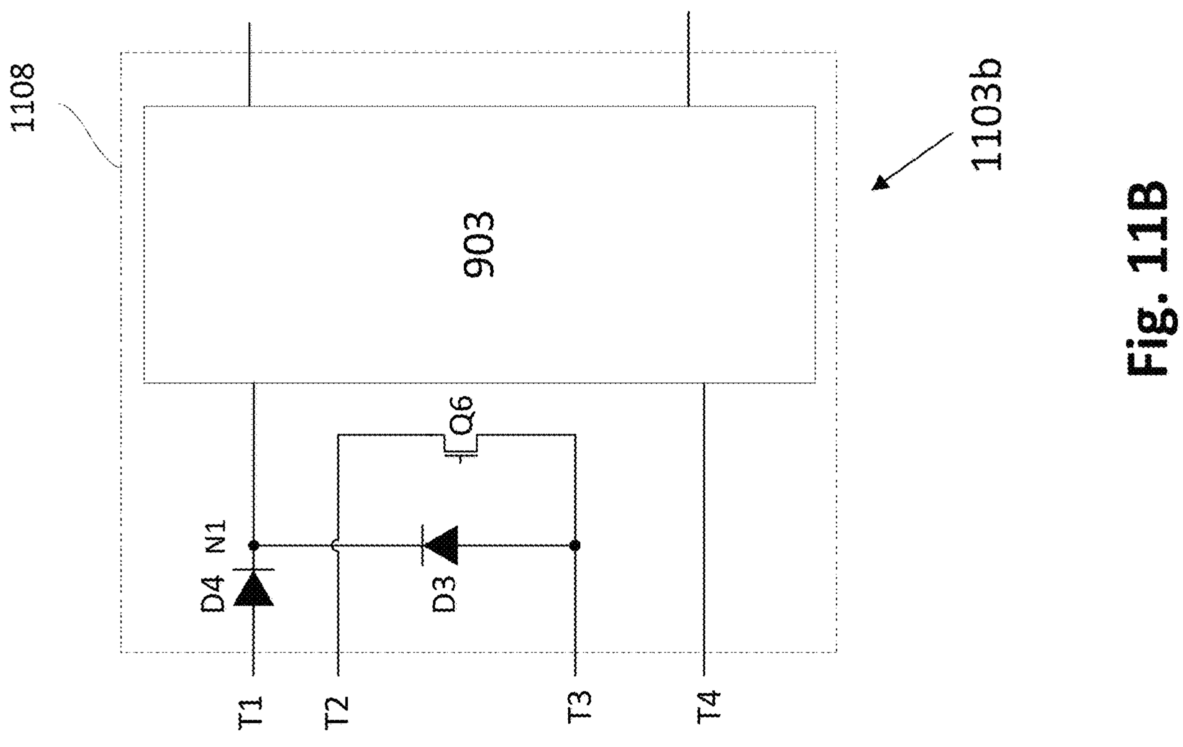
FIGS. 11A-11B illustrate a photovoltaic power devices according to various aspects of the present disclosure.
Figure 11A:
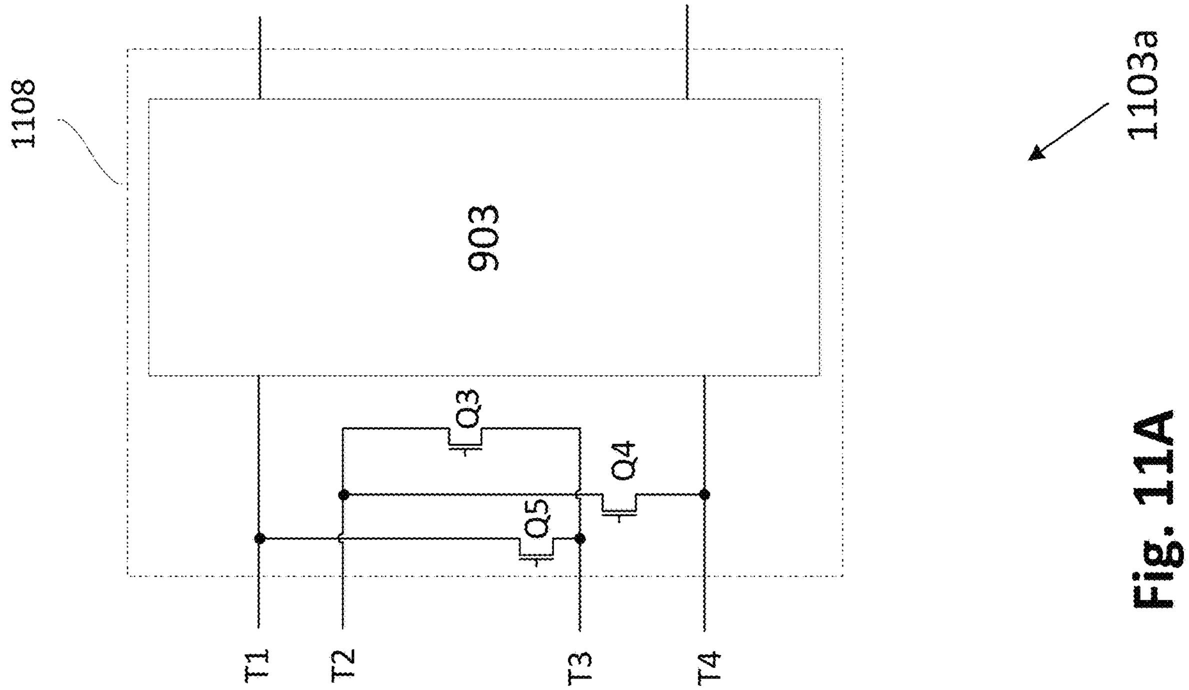

Reference is now made to FIG. 11A, which shows a photovoltaic power device according to illustrative embodiments. PV power device 1103*a* may be used as PV power device 1003 of FIG. 10. PV power device 1103*a* may comprise a PV power device similar to or the same as PV power device 803 of FIG. 8 or PV power device 903 of FIG. 9. For convenience, in the illustrative embodiments of FIG. 11A and FIG. 11B, PV power device 1103*a* will be assumed to comprise PV power device 903 of FIG. 9.

PV power device 1103*a* may comprise transistors Q3, Q4 and Q5. Transistors Q3-Q5 may be MOSFETs, JFETs, IGBTs, BJTs or other appropriate transistors. For the illustrative embodiment of FIG. 11A, transistors Q3-Q5 will be assumed to be MOSFETs. Transistor Q3 may be connected between input terminals T2 and T3. Transistor Q4 may be connected between input terminals T2 and T4. Transistor Q1 may be connected between input terminals T1 and T3. Transistors Q3-Q5 may be controlled (e.g. have gate signals provided) by one or more controllers such as controller 905 of PV power device 903. The elements comprising PV power device 1103*a* may be jointly enclosed by enclosure 1108.

A first PV generator (not explicitly depicted) may be coupled between terminals T1 and T2, and a second PV generator (not explicitly depicted) may be coupled between terminals T3 and T4. Under normal operating conditions, transistor Q3 may be ON, and transistors Q4 and Q5 may be OFF. Under these conditions, the two photovoltaic generators may be serially connected, with the combined serial voltage of the two PV generators provided between terminals T1 and T4. When a potentially unsafe condition is detected, the controller controlling transistor Q3 may turn Q3 to the OFF state, reducing the voltage drop between terminals T1 and T4.

Even when transistor Q3 is OFF, power may still be provided at the input to PV power device 903. For example, in some embodiments, controller(s) controlling transistors Q4 and Q5 may switch Q4 and Q5 to the ON state when Q3 is OFF, resulting in terminal T1 being short-circuited to terminal T3, and terminal T2 being short-circuited to terminal T4. Under these conditions, the first and second photovoltaic generator may be coupled in parallel between terminal T1 and T4, allowing PV power device 903 to draw power from the PV generators (e.g. for powering devices such as controller 905, communication device 911, auxiliary power circuit 908 and other devices depicted in FIG. 9). In some embodiments, Q4 or Q5 might not be included in PV power device 1103*a*. For example, Q4 might not be included, in which case by turning Q5 to the ON position when Q3 is OFF, power is provided to PV power device 903 by a single PV generator (coupled between T3 and T4). Similarly, Q5 might not be included, in which case by turning Q4 to the ON position when Q3 is OFF, power is provided to PV power device 903 by a single PV generator (coupled between T1 and T2).

Reference is now made to FIG. 11B, which shows a photovoltaic power device according to illustrative embodiments. PV power device 1103*b* may be used as PV power device 1003 of FIG. 10. PV power device 1103*b* may comprise a PV power device similar to or the same as PV power device 803 of FIG. 8 or PV power device 903 of FIG. 9. For convenience, in the illustrative embodiments of FIG. 11A and FIG. 11B, PV power device 1103*a* will be assumed to comprise PV power device 903 of FIG. 9.

Transistor Q6 may be similar to or the same as transistor Q3 of FIG. 11A. PV power device 1103*b* may further comprise diodes D3 and D4. The anode of diode D3 may be coupled to terminal T3 and the cathode of diode D3 may be coupled to the positive input of PV power device 903 at node N1. The anode of diode D4 may be coupled to terminal T1 and the cathode of diode D3 may be coupled to the positive input of PV power device 903 at node N1. The elements comprising PV power device 1103*b* may be jointly enclosed by enclosure 1108.

Still referring to FIG. 11B, a first PV generator (not explicitly depicted) may be coupled between terminals T1 and T2, and a second PV generator (not explicitly depicted) may be coupled between terminals T3 and T4. Under normal operating conditions, transistor Q3 may be ON, connecting terminals T2 and T3. The voltage at terminal T1 may be higher than the voltage at terminal T2 (e.g. if the positive output of a PV generator is coupled to terminal T1 and the negative output of the PV generator is coupled to terminal T2), so diode D4 may be forward-biased and diode D3 may be reverse-biased. The voltage at node N1 may be about the voltage at terminal T1 (assuming an insignificant voltage drop across diode D4), resulting in a voltage input to PV power device 903 about equal to the voltage between terminals T1 and T4.

When a potentially unsafe condition is detected, the controller controlling transistor Q6 may turn Q6 to the OFF state, disconnecting the coupling of terminals T2 and T3. The voltage at node N1 may be the voltage at terminal T1 or the voltage at terminal T3, the greater of the two. While the voltage at node N1 might not be predetermined, in either possible scenario, a PV generator may be coupled to the inputs of PV power device 903, providing power to PV power device 903 (e.g. for powering devices such as controller 905, communication device 911, auxiliary power circuit 908 and other devices depicted in FIG. 9).

Figure 12:
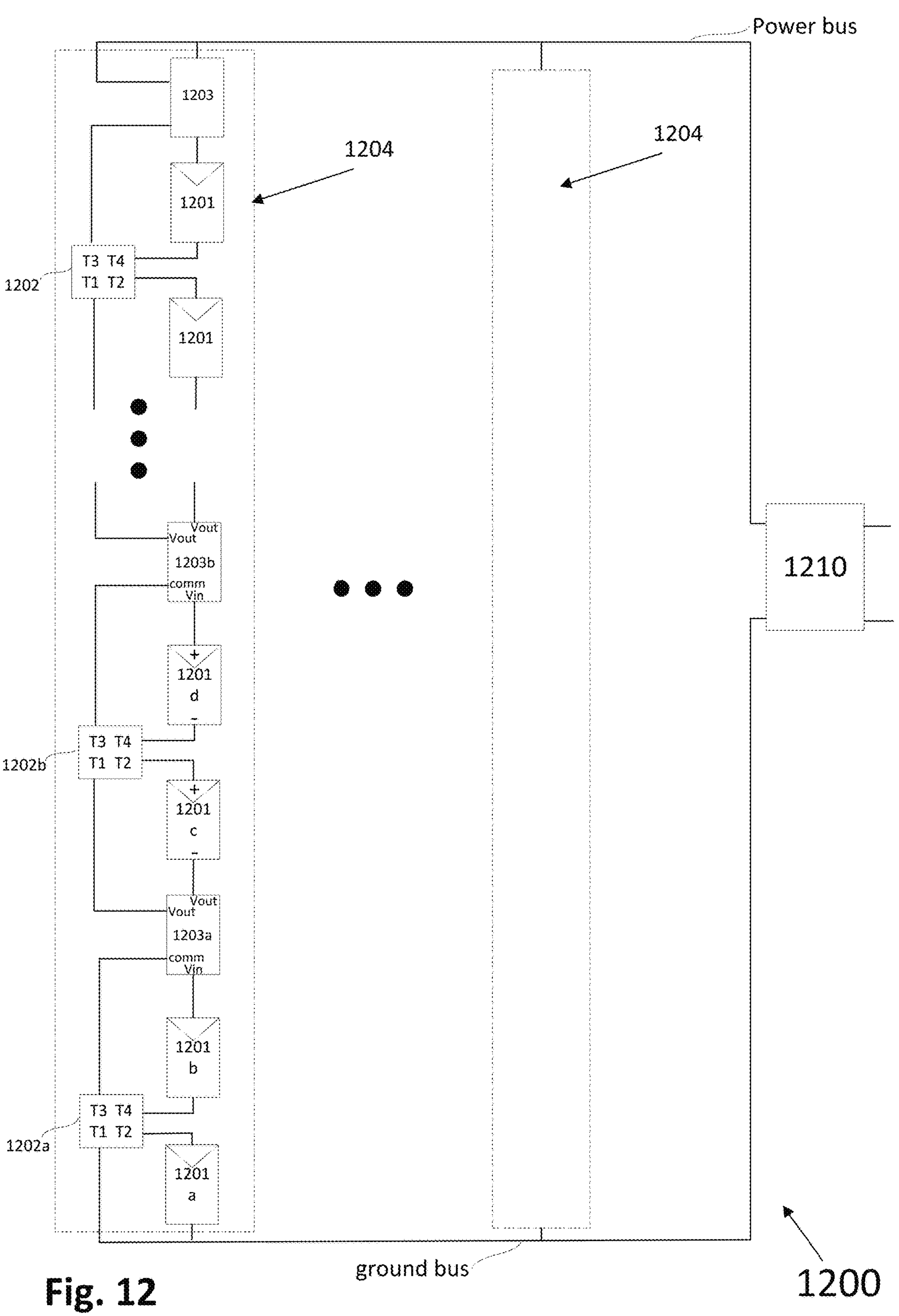
FIG. 12 illustrates a photovoltaic system configuration according to various aspects of the present disclosure.

Reference is now made to FIG. 12, which shows a photovoltaic (PV) system according to illustrative embodiments. PV system 1200 may comprise a plurality of PV strings 1204 coupled in parallel between a ground bus and a power bus. Each of PV strings 1204 may comprise a plurality of photovoltaic generators 1201, a plurality of safety switches 1202 and a plurality of PV power devices 1203. PV generators 1001 may be similar to or the same as PV generators 801 of FIG. 8. In some embodiments, the power and ground buses may be input to system power device 1210, which may be similar to or the same as system power device 810 of FIG. 8.

Each PV power device 1203 may be designed to be coupled to more than one PV power generator 1201. For example, in PV system 1200, each PV power device 1203 (except for the PV power devices coupled to the power bus) is coupled to two PV power generators and to two safety switches 1202, with each safety switch 1202 (except for the safety switch 1202 which is coupled to the ground bus) coupled to two PV generators 1201 and two PV power devices 1203.

Under normal operating conditions, each PV power device 1203 may receive power from two PV generators 1201, and may forward the power along PV string 1204 towards the power bus. Under normal operating conditions, each safety switch 1202 may provide a connection between two PV generators 1201 and may provide a connection between two PV power devices 1203 for forwarding power along PV string 1204. For example, under normal operating conditions, safety switch **1202*a* provides a connection between PV generators 1201*a* and 1201*b*. PV power device 1203*a* may receive power generated by PV generators 1201*a* and 1201*b*, with safety switches 1202*b* disposed between PV power devices 1203*a* and 1203*b*, providing PV power device 1203*a* with a connection for forwarding power to PV power device 1203*b*. Similarly, safety switch 1202*b* provides a connection between PV generators 1201*c* and 1201*d*, with PV power device 1203*b* receiving power from PV generators 1201*c* and 1201*d***.

In case of an unsafe condition, safety switch **1202*a* may be operated to disconnect PV generator 1201*a* from PV generator 1201*b*, and to disconnect PV power device 1203*a* from the ground bus. Similarly, safety switch 1202*b* may be operated to disconnect PV generator 1201*c* from PV generator 1201*d*, and to disconnect PV power device 1203*a* PV power device 1203*b*. Operating safety switches 1202 in this manner may reduce the voltage in various locations in PV system 1200** to safe voltage levels.

Figure 13B:
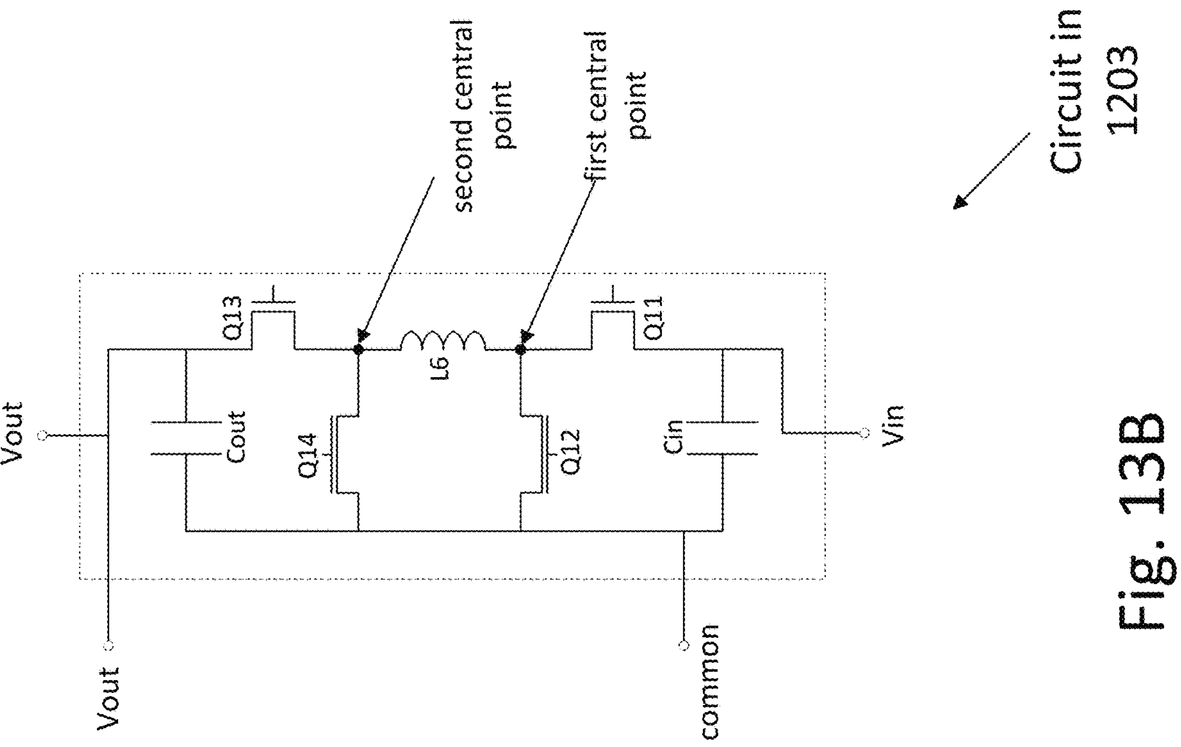
FIG. 13B illustrates circuitry of a photovoltaic power device according to various aspects of the present disclosure.
Figure 13A:
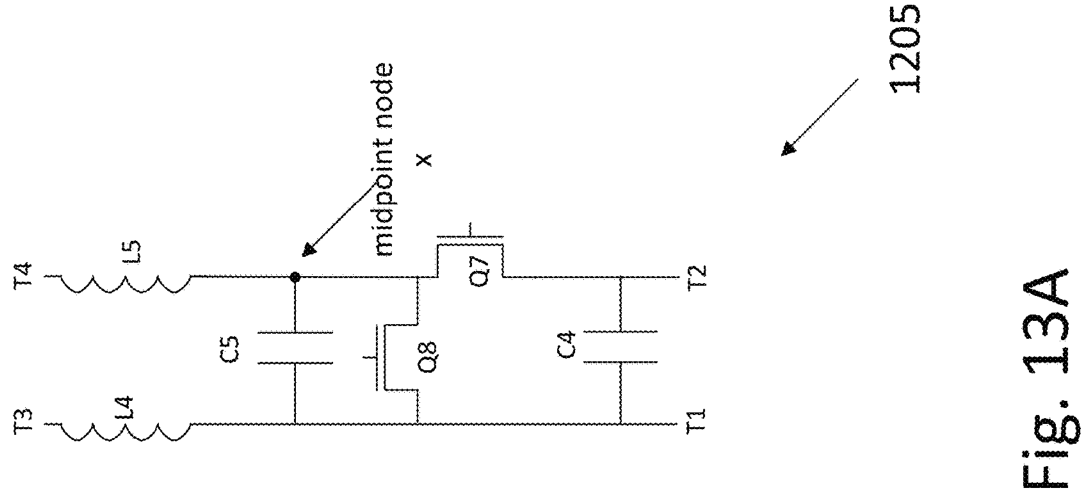
FIG. 13A illustrates circuitry of a safety switch according to various aspects of the present disclosure.

Reference is now made to FIG. 13A, which shows safety switch 1205 according to an illustrative embodiment. Safety switch 1205 may comprise terminals T1-T4, transistors (e.g. MOSFETs) Q7 and Q8, capacitors C4 and C5, and inductors L4 and L5. Inductor L4 may be provided between terminal T3 and terminal T1 to reduce ripples and/or spikes in a current flowing from terminal T1 to terminal T3, and inductor L5 may be provided between terminal T4 and midpoint node X to reduce ripples and/or spikes in a current flowing from transistor Q7 to terminal T4. In some embodiments, inductors L4 and L5 might not be provided. In some embodiments, transistors Q7 and Q8 may be replaced by alternative switching elements, such as IGBTs, BJTs, JFETs or other switching elements. Capacitor C4 may be coupled between terminals T1 and T2. Transistor Q7 may be coupled between terminal T2 and midpoint node X, and capacitor C5 may be coupled between terminal T1 and midpoint node X. Transistor Q8 may be coupled in parallel to capacitor C5, between terminal T1 and midpoint node X. In some embodiments, capacitor C5 and/or capacitor C4 might not be provided.

During normal system operation, transistor Q7 may be held in the ON state, and transistor Q8 may be in the OFF state. Capacitor C5 may then be in parallel with capacitor C4, and a first PV generator may be coupled between terminals T1 and T2, applying a voltage to capacitors C4 and C5 and providing electrical power at terminals T1 and T2. Terminal T4 may be coupled to an output terminal of a second PV generator, and terminal T3 may be coupled to an input terminal of a PV power device 1203. The power input to safety switch 1205 at terminals T1 and T2 may be output at terminals T3 and T4 to the second PV generators and the PV power device 1203.

Transistors Q7 and Q8 may be controlled by a controller (not explicitly depicted) similar to or the same as controller 710 of FIG. 7A. In some embodiments, the controller may be powered by capacitor C4 (e.g. a controller input power terminal may be coupled to terminal T2 or terminal T1 for receiving power from capacitor C4). Safety switch 1205 may further comprise a communication device (e.g. similar to or the same as communication device 305 of FIG. 3) for receiving operational commands from a system control device.

When an unsafe condition is detected, the controller may switch transistor Q7 to the OFF state and transistor Q8 to the ON state. Capacitor C5 may be short-circuited by transistor Q8, while capacitor C4 may maintain the voltage imposed between terminals T1 and T2.

Reference is now made to FIG. 13B, which shows some of the internal circuitry of a photovoltaic power device according to one illustrative embodiment. In some embodiments, PV power device 1203 may comprise a variation of a Buck+Boost DC/DC converter. The power device may include a circuit having two input terminals, denoted Vin and common, and two output terminals which output the same voltage Vout. The output voltage is in relation to the common terminal. The circuit may include an input capacitor Cin coupled between the common terminal and the Vin terminal, an output capacitor coupled between the common terminal and the Vout terminals. The circuit may include two central points used for reference. The circuit may include a plurality of switches (e.g. MOSFET transistors) Q11, Q12, Q13 and Q14 with Q11 connected between Vin and the first central point, and Q12 connected between the common terminal and the first central point. Q13 may be connected between the Vout terminal and the second central point, and Q14 may be connected between the common terminal and the second central point. The circuit may further include inductor L6 coupled between the two central points.

The operation of the Buck+Boost DC/DC converter in PV power device 1203 may be variously configured. If an output voltage lower than he input voltage is desired, Q13 may be statically ON, Q14 may be statically OFF, and with Q11 and Q12 being Pulse-Width-Modulation (PWM)-switched in a complementary manner to one another, the circuit is temporarily equivalent to a Buck converter and the input voltage is bucked. If an output voltage higher than he input voltage is desired, Q11 may be statically ON, Q12 may be statically OFF, and with Q13 and Q14 being PWM-switched in a complementary manner to one another, the input voltage is boosted. Staggering the switching of switches Q11 and Q12, the circuit may convert the input voltage Vin to output voltage Vout. If current is input to the circuit by the Vin and common terminals, and the voltage drop across capacitors Cin and Cout are about constant voltages Vin and Vout respectively, the currents input to the circuit are combined at inductor L6 to form an inductor current which is equal to the sum of the current input at the Vin and common terminals. The inductor current may contain a ripple due to the charging and discharging of capacitors Cin and Cout, but if the voltage drop across capacitors Cin and Cout are about constant, the voltage ripples over the capacitors are small, and similarly the inductor current ripple may be small. The inductor current may be output by the pair of output terminals Vout. In some embodiments, a single output terminal may be included, and system designers may split the output terminal externally (i.e. outside of the PV power device circuit), if desired.

In illustrative embodiments, PV power device 1203 may be similar to or the same as PV power device 903 of FIG. 9, with power converter 900 of FIG. 9 comprising the Buck+Boost converter of FIG. 13B. In some embodiments, boosting the voltage input to a PV power device 1203 might not be necessary, in which case PV power device 1203 may comprise a Buck converter similar to the Buck+Boost converter of FIG. 13B, with switch Q14 removed (i.e. replaced by an open-circuit) and switch Q13 replaced with a wire (i.e. connecting the Vout terminal to the second central point).

Referring back to FIG. 12, safety switch 1202*b* may be coupled to photovoltaic generators 1201*c* and 1201*d*, and to PV power devices 1203*a* and 1203*b*. Terminal T2 may be connected to the positive output of PV generator 1201*c*, and terminal T4 may be connected to the negative output of PV generator 1201*d*. Terminal T1 may be coupled to a first Vout terminal of PV power device 1203*a*, and terminal T3 may be coupled to the common terminal of PV power device 1203*b*. The positive output terminal of PV generator 1201*d* may be coupled to the Vin terminal of PV power device 1203*b*, and the negative output terminal of PV generator 1201*c* may be coupled to a second Vout terminal of PV power device 1203*a*. Under normal operating conditions, PV generators 1201*c* and 1201*d* are serially coupled, the combined voltage of PV generators 1201*c* and 1201*d* input between the common and Vin terminals of PV power device 1203*b*. If an unsafe condition is detected, safety switch 1202*b* may disconnect the connection between terminals T2 and T4 (e.g. by setting transistor Q7 of FIG. 13A to OFF) and couple terminals T3 and T4 (e.g. by setting transistor Q8 of FIG. 13A to ON). As a result, PV generator 1201*d* may be coupled between the common and Vin terminals of PV power device 1203*b*, and PV generator 1201*c* may be coupled between terminals T1 and T2 of safety switch 1202*b*.

The system topology illustrated in FIG. 12 may provide certain advantages. For example, during normal system operation, two PV generators 1201 provide a combined voltage and power to a PV power device 1203, requiring a reduced number of PV power devices for processing power generated by the PV generators. Furthermore, continuous operational power (i.e. power used for powering device components such as controllers and transistors) is provided to all PV power devices 1203 and safety switches 1202 both during normal operations and during a potentially unsafe condition.

Figure 14:
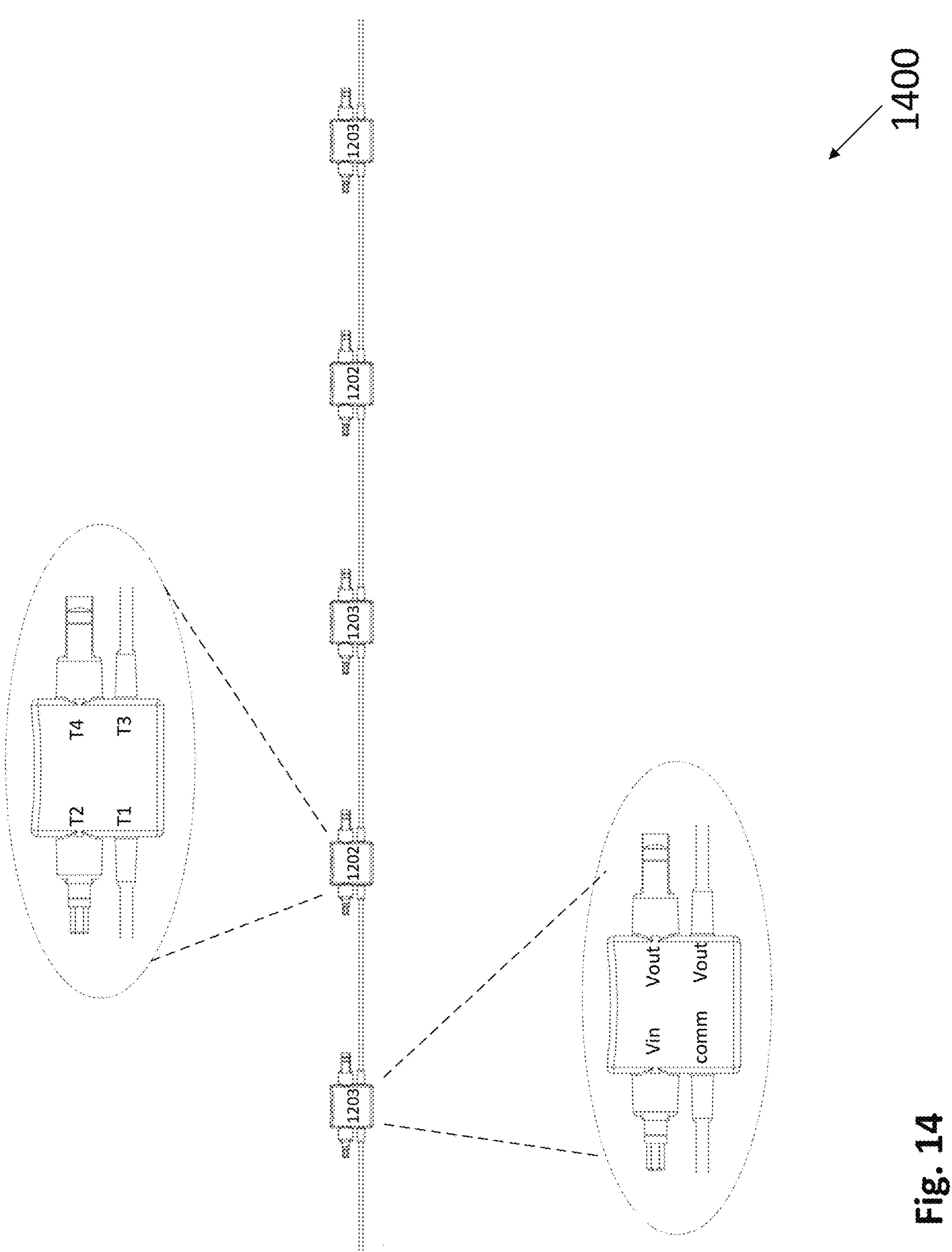
FIG. 14 illustrates a portion of a chain of photovoltaic power devices according to various aspects of the present disclosure.

Reference is now made to FIG. 14, which shows part of a chain of photovoltaic devices according to an illustrative embodiment. Chain 1400 may comprise a plurality of PV power devices 1203 and a plurality of safety switches 1202. Each safety switch 1202 may be connected, using conductors, between two PV power devices 1203. Terminal T1 of safety switch 1202 may be connected to a Vout terminal of a first PV power device, and terminal T3 of safety switch 1202 may be connected to a common terminal of a second PV power device. Terminals T2 and T4 may be accessible via external connectors similar to or the same as connectors 406 and 407 of FIG. 4A. Similarly, a Vout terminal and a Vin terminal of each PV power device 1203 may be accessible via external connectors similar to or the same as connectors 406 and 407 of FIG. 4A. Conductors connecting a PV power device terminal (e.g. the common terminal) to a safety switch terminal (e.g. terminal T3) may be sized to facilitate connecting chain 1400 to a plurality of PV generators, as depicted in FIG. 12. For example, in locales where PV generators are commonly 1-2 meters wide, each conductor disposed between a safety switch 1202 and a PV power device 1203 may be about 1-2 meters long. Chain 1400 may be assembled and sold as a single unit, saving cost and time when constructing a PV installation similar to or the same as PV system 1200 of FIG. 12.

Figure 15:
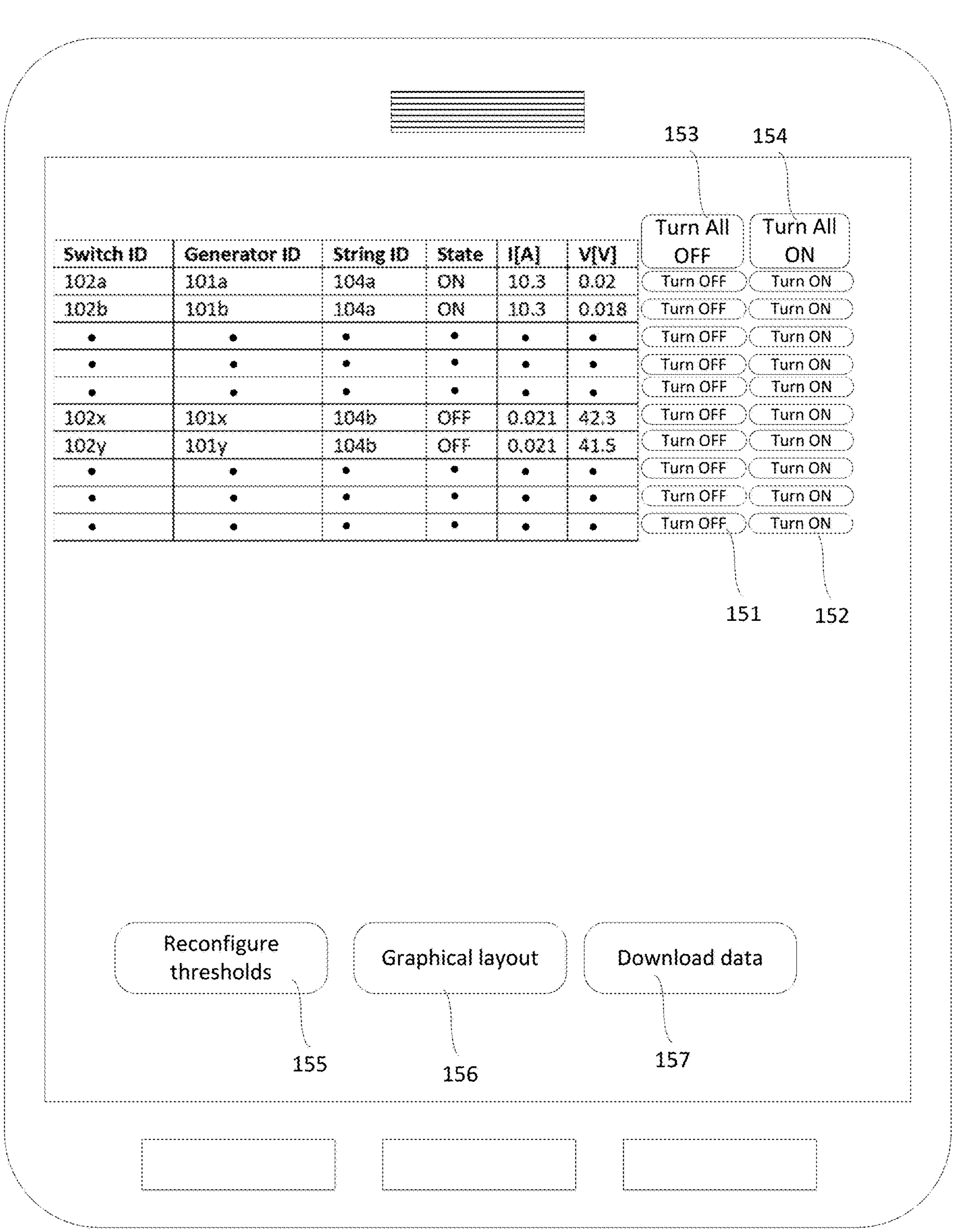
FIG. 15 is an illustrative mockup of a user interface for an electrical system according to illustrative embodiments.

Referring to FIG. 15, an illustrative application running on a smart phone, tablet, computer, workstation, mobile device (such as a cellular device) and/or a similar computing device is shown. The application may provide a list of safety switches disposed in an electrical power system (e.g. system 100 of FIG. 1). The application may indicate a serial number or other identifying information of each safety switch, as well as identifying information of coupled PV generators and/or identifying information of a PV string each safety switch is coupled to. In some embodiments, the application may indicate the state of each safety switch and/or electrical parameters of one or more safety switches, for example, the voltage across or current through one or more safety switches. In some embodiments, the application may provide touch-screen buttons or similar input controllers for controlling the state of one or more switches. For example, activating a button 151 may move an associated safety switch to the OFF state, and activating a button 152 may move an associated safety switch to the ON state. Activating button 153 may move all safety switches to the OFF state, and activating button 154 may move all safety switches to the ON state. In some embodiments, activating buttons 151-154 may be restricted based on a user access level. For example, the application may enable buttons 151-154 only when running in "Installer/Administrator" mode, to restrict the actions of unsophisticated users.

Still referring to FIG. 15, activating button 155 may enable a user to reconfigure a threshold. For example, an electrical voltage, current or power threshold which may be indicative of an arcing condition and trigger a system response (e.g. moving one or more safety switches to the OFF state) may be reconfigured by a user using the application of FIG. 15. Activating button 156 may display a graphical layout of an electrical system represented by the application, including physical location details of one or more safety switches. Activating button 157 may download current or past operational system data such as the state of safety switches, and/or electrical parameter measurement measured by safety switches. Buttons 155-157 may similarly be restricted depending on the level of user authorization.

The application of FIG. 15 may communicate directly with safety switches via wireless communications (e.g. cellular communication, or over the internet). In some embodiments, the application may communicate with a system power device (e.g. system power device 110 of FIG. 1), with the system power device configured to relay communication between the application and the safety switches via wireless communication or wired communication (e.g. power line communication).

Figure 16:
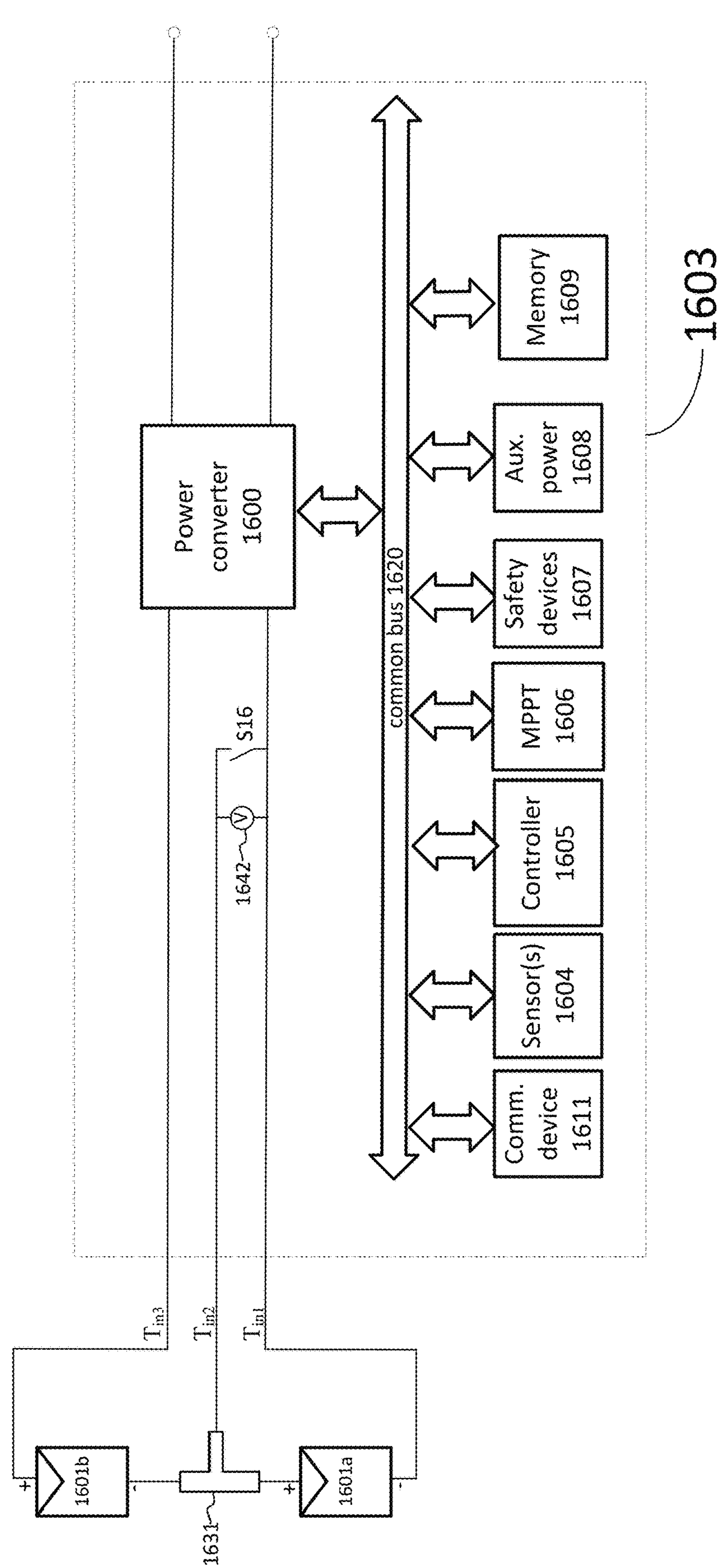
FIG. 16 illustrates a photovoltaic power device according to various aspects of the present disclosure.

Reference is now made to FIG. 16, which illustrates another aspect of the present disclosure. A PV power device 1603 may be similar to or the same as PV power device 903 of FIG. 9, and correspondingly, PV power device 803 of FIG. 8. Components depicted and described above with reference to FIG. 9 are correspondingly depicted in FIG. 16. Hence, power converter 1600 may be analogous to power converter 900 of FIG. 9. Likewise, sensor(s) 1604 may be analogous to sensor(s) 904 of FIG. 9; controller 1605 may be analogous to controller 905 of FIG. 9; and so forth for the other components of the PV power device 903, such as Maximum Power Point Tracking (MPPT) circuit 1606; safety devices 1607; auxiliary power circuit 1608; memory device 1609; communication device 1611; and common bus 1620, and so forth.

According to some aspects of the disclosure, PV power device 1603 may include power converter 1600 similar to, for example, PV power converter 900. Power converter 1600 may comprise a direct current-direct current (DC/DC) converter such as a Buck, Boost, Buck/Boost, Buck+Boost, Cuk, Flyback and/or forward converter. According to some aspects, power converter 1600 may comprise a direct current-alternating current (DC/AC) converter (also known as an inverter), such a micro-inverter. PV power device 1603 may have three input terminals, $T_{in1}$, $T_{in2}$, and $T_{in3}$, and two output terminals (not labelled, for clarity of depiction).

Still referring to FIG. 16, according to some aspects of the disclosure, PV power device 1603 may comprise switch S16, which may be coupled between input terminals $T_{in1}$, $T_{in2}$. Photovoltaic generator 1601*a* may comprise an output terminal connected to an input terminal of PV power device 1603, for instance, to input terminal $T_{in1}$. Photovoltaic generator 1601*a* may also comprise a second output terminal which may be connected to a negative output terminal of photovoltaic generator 1601*b*. The output from photovoltaic generator 1601*a* to the negative output terminal of photovoltaic generator 1601*b* may also connect to PV power device 1603 at input terminal $T_{in2}$. The connection to both the negative output terminal of photovoltaic generator 1601*b* and to an input terminal of PV power device 1603 may be via, for example, T-connector 1631. T-connector 1631 may, over input terminal $T_{in2}$, connect to PV power device 1603. Terminal $T_{in2}$ may terminate at a switch S16, which is comprised in PV power device 1603. Switch S16 may comprise a transistor, similar to transistor Q9 of FIG. 9. Alternatively, the switch S16 may comprise a relay or a different type of switch (e.g. an IGBT, BJT and the like). Photovoltaic generator 1601*b* may comprise an output terminal connected to an input terminal of PV power device 1603 via terminal $T_{in3}$.

Switch S16 may comprise a control terminal. The control terminal of switch S16 may be controlled by controller 1605. Correspondingly, controller 1605 may be configured to control switch S16. If an unsafe condition, such as a grid-outage, overvoltage, undervoltage, a problem with the inverter (such as, but not limited to, the inverter described above with reference to power converter 900), or any other problem which may result in a potentially unsafe condition, or a failure in the photovoltaic generator 1601*a*, is detected, controller 1605 may turn on switch S16, short-circuiting the input terminals of photovoltaic generator 1601*a* in order to protect, reduce the risk for, and so forth, power converter 1600 and/or personnel in the physical proximity of PV power device 1603. When switch S16 is OFF, the two PV generators 1601*a* and 1601*b* may be connected in series and to the input terminals of power converter 1600. In both scenarios, a safe voltage at locations within the system may be maintained. When switch S16 is ON, PV generator 1601*a* is short-circuited, and a reduced voltage between terminals $T_{in3}$ and $T_{in1}$ is obtained. Switch S16 being OFF may be indicative of normal operating conditions, and under normal operating conditions an increased voltage between terminals $T_{in3}$ and $T_{in1}$ may be permissible.

In an example of an aspect of system operation, communication device 1611 may enable sensor(s) 1604 to monitor the system described herein across above the common bus 1620 for a "keep alive" signal, as described above with reference to FIG. 6. In the absence of said "keep alive" signal, sensor(s) 1604 signals controller 1605 that a potentially unsafe condition might be occurring. Controller 1605 then may actuate switch S16 (which may comprise a transistor, for instance, as already noted) in order to short circuit PV generator 1601*a*. Upon receipt of a wakeup or "keep alive" signal, in the event that switch S16 is ON, the controller may eliminate the short circuit across PV generator 1601*a* by turning switch S16 OFF.

It is appreciated that in the aspect of the present disclosure described herein above, in the event that PV generator 1601*a* fails, PV power device 1603 may continue working as long as switch S16 is turned ON. In such a case, PV power device 1603 may continue to receive power from PV generator 1601*b*. It is also appreciated that T-connector 1631 may provide a test point for measuring voltage across the PV generator 1601*a*, thereby enabling calculation of the individual operating parameters of each of PV generator 1601*a* and PV generator 1601*b*. Voltmeter 1642 is depicted in FIG. 16 in parallel to switch S16 to indicate this aspect.

According to another aspect of the present disclosure, an additional switch (not depicted) might be positioned between terminals, $T_{in2}$ and $T_{in3}$. The additional switch may also be controlled by controller 1605. In such an aspect, when both the additional switch is OFF, and switch S16 is OFF, the two PV generators 1601*a* and 1601*b* are connected in series to input terminals of power converter 1600. When switch S16 is ON, and the additional switch is OFF, the output terminals of photovoltaic generator 1601*a* are short circuited and photovoltaic generator 1601*b* provides the power to the input terminals to power converter 1600. Correspondingly, when the additional switch is ON and switch S16 is OFF, the output terminals of photovoltaic generator 1601*b* are short circuited and photovoltaic generator 1601*a* provides the power to the input terminals of power converter 1600. The ability to short circuit either one of photovoltaic generator 1601*a* or photovoltaic generator 1601*b* may make the system failure proof for each of the two photovoltaic generators 1601*a* and 1601*b*. When both switch S16 is ON, and the additional switch is ON, the output terminals of both PV generators 1601*a* and 1601*b* are short-circuited, thereby the input terminals of power converter 1600 are also short-circuited. Switch S16 (as noted above) and the additional switch may comprise a relay, a transistor, including, but not limited to a MOSFET, an IGBT, a BJT, a JFET, and so forth, or another appropriate switching element.

In still another aspect of the present disclosure, a single photovoltaic generator (not depicted) may be utilized rather than photovoltaic generator 1601*a* and photovoltaic generator 1601*b*. The single photovoltaic generator may have at least three output terminals (e.g., a first series string of solar cells connected between first and second output terminals, and a second series string of solar cells connected between the second output terminal and a third output terminal). The three output terminals may, respectively, connect to the PV power device 1603 over input terminals $T_{in1}$, $T_{in3}$, and $T_{in4}$. As described above, if an unsafe condition, such as a grid-outage, overvoltage, undervoltage, a problem with the inverter (such as, but not limited to, the inverter described above with reference to power converter 900), or any other problem which may result in a potentially unsafe condition, or a failure in the single photovoltaic generator, is detected, controller 1605 may turn on switch S16, short-circuiting the two of the terminals of the single photovoltaic generator in order to protect, reduce the risk for, and so forth, power converter 1600 and/or personnel in the physical proximity of PV power device 1603. When switch S16 is OFF, the output terminals of the single photovoltaic generator may be connected in series to the input terminals of power converter 1600, (i.e., "normal operation") as described herein above.

In illustrative embodiments disclosed herein, photovoltaic generators are used as examples of power sources which may make use of the novel features disclosed. Each PV generator may comprise one or more solar cells, one or more solar cell strings, one or more solar panels, one or more solar shingles, or combinations thereof. In some embodiments, the power sources may include batteries, flywheels, wind or hydroelectric turbines, fuel cells or other energy sources in addition to or instead of photovoltaic panels. Systems, apparatuses and methods disclosed herein which use PV generators may be equally applicable to alternative systems using additional power sources, and these alternative systems are included in embodiments disclosed herein.

It is noted that various connections are set forth between elements herein. These connections are described in general and, unless specified otherwise, may be direct or indirect; this specification is not intended to be limiting in this respect. Further, elements of one embodiment may be combined with elements from other embodiments in appropriate combinations or subcombinations. For example, PV power device circuitry of one embodiments may be combined with and/or exchanged for power device circuitry of a different embodiment. For example, transistor Q9 of PV power device 903 may be disposed between electrical connections 512 and 513 of junction box 511 and operated to short-circuit the input to PV generator 101 of FIG. 5A.

What is claimed is:

1. An apparatus comprising:

first and second connectors;

a switch comprising a transistor connected, via an emitter or source terminal, and a collector or drain terminal, between the first and the second connectors, and a control terminal comprising a base or a gate terminal;

an auxiliary power supply circuit having an output connected to the control terminal, and an input coupled between the first connector and the second connector, wherein the auxiliary power supply circuit is configured to convert a first direct current (DC) voltage at a first amplitude received at the input to a second DC voltage at a second amplitude at the output, wherein the second amplitude is greater than the first amplitude when the switch is in an ON state, and wherein the first DC voltage is a drain-to-source voltage across the drain and the source terminals or an emitter-to-collector voltage across the emitter and the collector terminals, and the second DC voltage is a gate-to-source voltage or a base-to-emitter voltage applied to the gate terminal.

2. The apparatus of claim 1, wherein the switch is configurable into:

in response to the control terminal receiving the second DC voltage, the ON state that connects a switchable DC serial path between the first connector and the second connector, and in response to the control terminal not receiving the second DC voltage, an OFF state that disconnects the switchable DC serial path.

3. The apparatus of claim 2, wherein the auxiliary power supply circuit is configured to:

receive communication signals; and based on the communication signals, enable and disable the second DC voltage to control the switch into the ON state and the OFF state.

4. The apparatus of claim 3, wherein the communication signals are received as power line communication signals via the first connector or the second connector.

5. The apparatus of claim 4, wherein the power line communication signals comprise alternating-current signals over the first connector or the second connector.

6. The apparatus of claim 2, wherein the auxiliary power supply circuit is configured to:

convert the first direct current (DC) voltage at the first amplitude of between 15-200 millivolts when the switch is in the ON state.

7. The apparatus of claim 2, wherein, when in the ON state, the switch has a current-voltage relationship that causes the first amplitude to be between 15-200 millivolts when 10 amperes pass through the switchable DC serial path.

8. The apparatus of claim 2, wherein the auxiliary power supply circuit is configured to generate the second DC voltage at the second amplitude sufficient to maintain the switch in the ON state, while the first DC voltage at the first amplitude is between 15-90 millivolts.

9. The apparatus of claim 2, wherein the auxiliary power supply circuit is configured to:

receive a keep alive signal via the first connector or the second connector;

maintain the switch in the ON state based on receiving the keep alive signal; and control the switch into the OFF state based on an absence of the keep alive signal.

10. The apparatus of claim 2, wherein the auxiliary power supply circuit is configured to cease generating the second DC voltage based on a serial current flowing between the first and the second connectors through the switchable DC serial path falling below a threshold level.

11. The apparatus of claim 1, wherein the auxiliary power supply circuit comprises:

a communication circuit configured to receive power line communication signals on the first connector or the second connector; and a controller circuit configured to, based on the power line communication signals, control the second amplitude to control the transistor into the ON state and into an OFF state.

12. The apparatus of claim 11, wherein the controller circuit is configured to, in response to the power line communication signals, vary the second amplitude between a first value of less than 2 volts and a second value of greater than 5 volts.

13. The apparatus of claim 1, further comprising a diode having a cathode connected to the first connector and an anode connected to the second connector.

14. The apparatus of claim 1, wherein the first and the second connectors are designed to mate with third, and fourth connectors, respectively, which are designed to connect to each other.

15. An apparatus comprising:

first and second connectors;

an auxiliary power supply circuit having an output, and an input coupled between the first connector and the second connector, wherein the auxiliary power supply circuit is configured to convert a first direct current (DC) voltage at a first amplitude received at the input to a second DC voltage at a second amplitude at the output, wherein the second amplitude is greater than the first amplitude;

a switch comprising a switchable DC serial path connected between the first and the second connectors, and a control terminal connected to the output of the auxiliary power supply circuit; and a resistor connected between the first connector and the second connector and in parallel with the switch.

16. A system comprising:

a photovoltaic string comprising a pair of photovoltaic generators and a safety switch coupled in series;

wherein the safety switch comprises:

first and second connectors connecting the safety switch inline between the pair of photovoltaic generators;

an auxiliary power supply circuit configured to convert a first direct current (DC) voltage at a first amplitude between the first and the second connectors to a second DC voltage at a second amplitude on an output terminal; and a switch circuit comprising a switchable DC serial path connected between the first and the second connectors, and a control terminal connected to the output terminal of the auxiliary power supply circuit, wherein the second amplitude of the second DC voltage applied to the control terminal is greater than the first amplitude of the first DC voltage while the switchable DC serial path connects the first connector to the second connector; and a power device comprising:

a power converter having inputs connected across the photovoltaic string, and a control circuit configured to control photovoltaic power generated by the photovoltaic string.

17. A method comprising:

receiving, between first and second connectors of a safety switch, power;

converting, with an auxiliary power supply circuit in the safety switch, a first direct current (DC) voltage at a first amplitude received between the first and the second connectors to a second DC voltage at a second amplitude; and applying, with the auxiliary power supply circuit, the second DC voltage to a control terminal of a switch comprising a switchable DC serial path connected between the first and the second connectors, wherein the second amplitude of the second DC voltage applied to the control terminal is greater than the first amplitude of the first DC voltage while the switchable DC serial path connects the first connector to the second connector.

* * * * *